United States Patent
Rav-Acha et al.

(10) Patent No.: US 9,554,111 B2
(45) Date of Patent: Jan. 24, 2017

(54) SYSTEM AND METHOD FOR SEMI-AUTOMATIC VIDEO EDITING

(71) Applicant: MAGISTO LTD., Nes-Ziona (IL)

(72) Inventors: Alex Rav-Acha, Rehovot (IL); Oren Boiman, Givat Brener (IL)

(73) Assignee: MAGISTO LTD., Nes-Ziona (IL)

( * ) Notice: Subject to any disclaimer, the term of this patent is extended or adjusted under 35 U.S.C. 154(b) by 533 days.

(21) Appl. No.: 13/706,358

(22) Filed: Dec. 6, 2012

(65) Prior Publication Data

US 2013/0343729 A1    Dec. 26, 2013

Related U.S. Application Data

(63) Continuation-in-part of application No. 13/041,457, filed on Mar. 7, 2011.

(60) Provisional application No. 61/567,841, filed on Dec. 7, 2011, provisional application No. 61/311,524, filed on Mar. 8, 2010.

(51) Int. Cl.
| | | |
|---|---|---|
| G06F 7/00 | (2006.01) | |
| G06F 17/30 | (2006.01) | |
| H04N 9/87 | (2006.01) | |
| G11B 27/28 | (2006.01) | |
| G11B 27/32 | (2006.01) | |
| G11B 27/34 | (2006.01) | |

(52) U.S. Cl.
CPC .......... *H04N 9/87* (2013.01); *G06F 17/30017* (2013.01); *G06F 17/3074* (2013.01); *G06F 17/30244* (2013.01); *G06F 17/30781* (2013.01); *G11B 27/28* (2013.01); *G11B 27/329* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 7,383,508 B2 | 6/2008 | Toyama et al. | |
| 8,775,480 B2 * | 7/2014 | Carson et al. | 707/803 |
| 2002/0039446 A1 | 4/2002 | Santoni | |
| 2002/0159630 A1 | 10/2002 | Buzuloiu et al. | |
| 2003/0033347 A1 | 2/2003 | Bolle et al. | |
| 2003/0095684 A1 * | 5/2003 | Gordon | 382/100 |
| 2004/0208361 A1 | 10/2004 | Buzuloiu et al. | |

(Continued)

OTHER PUBLICATIONS

G. Mori, S. Belongie, and J. Malik, "Efficient Shape Matching Using Shape Contexts", Pattern Analysis and Machine Intelligence, IEEE Transactions, vol. 27, Issue 11, Nov. 2005.

(Continued)

*Primary Examiner* — Uyen Le

(74) *Attorney, Agent, or Firm* — Pearl Cohen Zedek Latzer Baratz LLP

(57) ABSTRACT

A non-transitory computer readable medium that stores instructions that cause a computerized system to: acquire at least one picture; analyze the at least one picture to provide analysis result; suggest to a user to acquire at least one other picture, if the analysis result indicates that there is a need to acquire at least one other picture; acquire the at least one other picture if instructed by the user; receive from the user metadata related to an acquired picture, the acquired picture is selected out of the at least one picture and the at least one other picture; and process the acquired picture in response to the metadata.

16 Claims, 40 Drawing Sheets

(56) References Cited

U.S. PATENT DOCUMENTS

| | | |
|---|---|---|
| 2005/0078172 A1 | 4/2005 | Harville et al. |
| 2005/0105780 A1 | 5/2005 | Ioffe |
| 2005/0160258 A1 | 7/2005 | O'Shea et al. |
| 2005/0192924 A1* | 9/2005 | Drucker et al. ............. 707/1 |
| 2005/0219665 A1* | 10/2005 | Mino ..................... 358/537 |
| 2005/0232480 A1 | 10/2005 | Swift |
| 2006/0015904 A1* | 1/2006 | Marcus ..................... 725/46 |
| 2006/0126093 A1* | 6/2006 | Fedorovskaya .... G06K 9/00255 358/1.14 |
| 2006/0187305 A1* | 8/2006 | Trivedi et al. ............ 348/169 |
| 2007/0136671 A1 | 6/2007 | Buhrke |
| 2007/0183741 A1 | 8/2007 | Lerman et al. |
| 2007/0223871 A1 | 9/2007 | Thelen |
| 2007/0252898 A1* | 11/2007 | Delean ................ 348/211.99 |
| 2008/0159624 A1 | 7/2008 | Sathish et al. |
| 2008/0208599 A1 | 8/2008 | Rosec et al. |
| 2009/0060458 A1 | 3/2009 | Bauchot et al. |
| 2009/0123064 A1 | 5/2009 | Gibbs |
| 2009/0180713 A1* | 7/2009 | Bucha et al. ............. 382/300 |
| 2010/0005078 A1 | 1/2010 | Bayliss |
| 2010/0026842 A1 | 2/2010 | Ishizaka |
| 2010/0194998 A1 | 8/2010 | Lee et al. |
| 2010/0205177 A1 | 8/2010 | Sato et al. |
| 2010/0226582 A1* | 9/2010 | Luo et al. ................ 382/224 |
| 2011/0029463 A1 | 2/2011 | Forman et al. |
| 2011/0103695 A1 | 5/2011 | Sato et al. |
| 2011/0142420 A1 | 6/2011 | Singer |
| 2011/0184950 A1 | 7/2011 | Skaff et al. |
| 2012/0195459 A1 | 8/2012 | Schmidt et al. |
| 2012/0281969 A1* | 11/2012 | Jiang et al. ............... 386/278 |

OTHER PUBLICATIONS

Andrew Y. Ng, Michael I. Jordan, and Yair Weiss, "On Spectral Clustering: Analysis and an algorithm", Advances in Neural Information Processing Systems, p. 849-856. MIT Press, 2001.

J.R Bergen P. Anandan, K.J. Hanna, and R. Hingorani, "Heirarchical Model-Based Motion Estimation", Second European Conference on Computer Vision, pp. 237-252, David Sarnoff Research Center, Princeton, NJ. 1992.

Office Action for U.S. Appl. No. 13/041,457 mailed Dec. 12, 2012.

Final Office Action for U.S. Appl. No. 13/041,457 mailed Aug. 26, 2013.

Notice of Allowance for U.S. Appl. No. 13/212,215 mailed Jul. 9, 2014.

Elgammal et al., "Background and Foreground Modeling Using Nonparametric Kernel Density Estimation for Visual Surveillance", Proceedings of the IEEE, vol. 90, No. 7, Jul. 2002, 1151-1163.

Notice of Allowance of U.S. Appl. No. 13/041,457 dated Mar. 3, 2015.

Non final Office Action of U.S. Appl. No. 13/706,440 dated Mar. 4, 2015.

Office Action for U.S. Appl. No. 14/752,942 dated Aug. 20, 2015.

Office Action for U.S. Appl. No. 14/249,565 dated Jul. 7, 2016.

Final Office Action for U.S. Appl. No. 14/752,942 dated Apr. 1, 2016.

* cited by examiner

SYSTEM AND METHOD FOR SEMI-AUTOMATIC VIDEO EDITING

RELATED APPLICATIONS

This patent application (1) is a continuation in part of U.S. patent application Ser. No. 13/041,457, filing date Mar. 7, 2011, now U.S. Pat. No. 9,189,137, issued on Nov. 17, 2015, which claims priority from U.S. provisional patent application Ser. No. 61/311,524, filing date Mar. 8, 2010, and (2) claims the benefit of U.S. provisional patent application Ser. No. 61/567,841, filing date Dec. 7, 2011, all applications being incorporated herein by reference.

BACKGROUND OF THE INVENTION

The main problem with manual video editing today is that it requires a huge amount of work from the user: the user must manually go over the entire input raw videos, mark starting and ending points for each portion of the video that he would like to select. Then, in order to get a pleasing edited video the user also needs to synchronize the selected clips with the soundtrack, and create graphical effects and transitions that fit the content of the video.

This process highly time consuming—it can take hours or even days. The resulting video clip, in many cases, doesn't have a professional look: The videos are not stable, the effects are amateurish and the synchronization with the soundtrack is not perfect.

SUMMARY OF THE INVENTION

According to various embodiments of the invention there may be provided methods, non-transitory computer readable media and computerized systems. Any reference to a non-transitory computer readable media should be also regarded as a reference to a method to be executed by a computerized system and should be regarded as a reference to the computerized system.

According to an embodiment of the invention there is provided a non-transitory computer readable medium may store instructions that may cause a computerized system such as but not limited to a mobile device that has a touch screen to: acquire at least one picture; analyze the at least one picture to provide analysis result; suggest to a user to acquire at least one other picture, if the analysis result indicates that there is a need to acquire at least one other picture; acquire the at least one other picture if instructed by the user; receive from the user metadata related to an acquired picture, the acquired picture is selected out of the at least one picture and the at least one other picture; and process the acquired picture in response to the metadata.

According to an embodiment of the invention there is provided a method that may include: acquiring at least one picture; analyze the at least one picture to provide analysis result; suggesting to a user to acquire at least one other picture, if the analysis result indicates that there is a need to acquire at least one other picture; acquiring the at least one other picture if instructed by the user; receiving from the user metadata related to an acquired picture, the acquired picture is selected out of the at least one picture and the at least one other picture; and processing the acquired picture in response to the metadata.

According to an embodiment of the invention the acquiring, suggesting, acquiring and receiving are executed by a mobile phone while each of the processing stages can be executed by the mobile phone, a cloud based computer in communication with the mobile device and the like.

According to an embodiment of the invention there is provided a computerized system that comprises at least one hardware component. The computerized system may be arranged to: acquire at least one picture; analyze the at least one picture to provide analysis result; suggest to a user to acquire at least one other picture, if the analysis result indicates that there is a need to acquire at least one other picture; acquire the at least one other picture if instructed by the user; receive from the user metadata related to an acquired picture, the acquired picture is selected out of the at least one picture and the at least one other picture; and process the acquired picture in response to the metadata.

The non-transitory computer readable medium may store instructions that may cause the computerized system to display the acquired picture to the user; and to receive from the user the metadata in response to the display of the acquired image.

The non-transitory computer readable medium may store instructions that may cause the computerized system to display information about the acquired picture to the user; and to receive from the user the metadata in response to the display of the information.

The non-transitory computer readable medium may store instructions that may cause the computerized system to receive the metadata during an acquisition of the acquired picture.

The non-transitory computer readable medium may store instructions that may cause the computerized system to process speech of the user that is sensed in proximity to the acquisition of the acquired picture to extract the metadata.

The speech may not include instructions aimed to the computerized system.

The non-transitory computer readable medium may store instructions that may cause the computerized system to process computerized system movements made in proximity to the acquisition of the acquired picture to extract the metadata.

The non-transitory computer readable medium may store instructions that may cause the computerized system to detect gestures made by the user to extract the metadata.

The non-transitory computer readable medium may store instructions that may cause the computerized system to suggest acquiring at least one other picture of a person if an amount of pictures of the person is below a predetermined threshold.

The non-transitory computer readable medium may store instructions that may cause the computerized system to suggest acquiring at least one other picture if an amount of pictures is below a predetermined threshold.

The non-transitory computer readable medium may store instructions that may cause the computerized system to suggest acquiring at least one other picture if the at least one picture is of a quality that is below a predetermined threshold.

The non-transitory computer readable medium may store instructions that may cause the computerized system to suggest acquiring at least one other picture if the at least one picture is out of focus.

The non-transitory computer readable medium may store instructions that may cause the computerized system to suggest acquiring at least one other picture if the at least one picture comprise a partial image of a person and lacks a full image of the person.

The non-transitory computer readable medium may store instructions that may cause the computerized system to suggest acquiring at least one additional image to be processed and provide a panoramic view of a scenery.

The non-transitory computer readable medium may store instructions that may cause the computerized system to display instructions about an optimal manner to obtain the panoramic view.

The non-transitory computer readable medium may store instructions that may cause the computerized system to obtain metadata from the user by allowing the user to mark objects in the acquired image.

According to an embodiment of the invention there may be provided a non-transitory computer readable medium that may store instructions that may cause a computerized system such as a mobile phone with a touch screen to: acquire at least one picture; receive from the user metadata related to a picture of the at least one picture; and process the at least one picture in response to the metadata.

According to an embodiment of the invention there may be provided a computerized system such as a mobile phone with a touch screen that may be arranged to: acquire at least one picture; receive from the user metadata related to a picture of the at least one picture; and process the at least one picture in response to the metadata.

According to an embodiment of the invention there may be provided a method that may include acquiring at least one picture; receive from the user metadata related to a picture of the at least one picture; and processing the at least one picture in response to the metadata.

The metadata may be indicative of an importance level of an object of the picture.

The metadata may be indicative of an existence of a face included in the picture.

The metadata may be indicative of an importance level of a face included in the picture.

The non-transitory computer readable medium may store instructions that may cause the computerized system to process the at least one picture and determine that an object of a picture is of importance.

The at least one picture may belong to a media stream; wherein the non-transitory computer stores instructions that may cause the computerized system to: acquire the media stream; receive from the user metadata related to at least one video frame of the media stream; and process the media stream to provide a shortened media stream that is shorter than the media stream, in response to the metadata.

The non-transitory computer readable medium may store instructions that may cause the computerized system to process computerized system movements made during an acquisition of the media stream to extract the metadata.

The non-transitory computer readable medium may store instructions that may cause the computerized system to detect gestures made by the user to extract the metadata.

The non-transitory computer readable medium may store instructions that may cause the computerized system to detect gestures made by a person that appears in the media stream to extract the metadata.

The non-transitory computer readable medium may store instructions that may cause the computerized system to extract an image of a person from the media stream; and add the image of the person to video frames of the media stream that lacked the image of the person.

The non-transitory computer readable medium may store instructions that may cause the computerized system to detect faces of multiple persons in the media stream and to generate, for at least two of the multiple persons, a modified media stream that is generated by assigning to the person higher importance than an importance of the other persons of the multiple persons.

The non-transitory computer readable medium may store instructions that may cause the computerized system to detect faces of persons in the media stream; to display the faces and information about the modified media stream to the user; receive an instruction to share the modified media stream with a certain person that is identified by a certain face out of the faces; to share the modified media with the certain person if contact information required for the sharing with the certain person is available.

The non-transitory computer readable medium may store instructions that may cause the computerized system to request from the user the contact information required for the sharing with the certain person if the contact information required for the sharing with the certain person is unavailable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
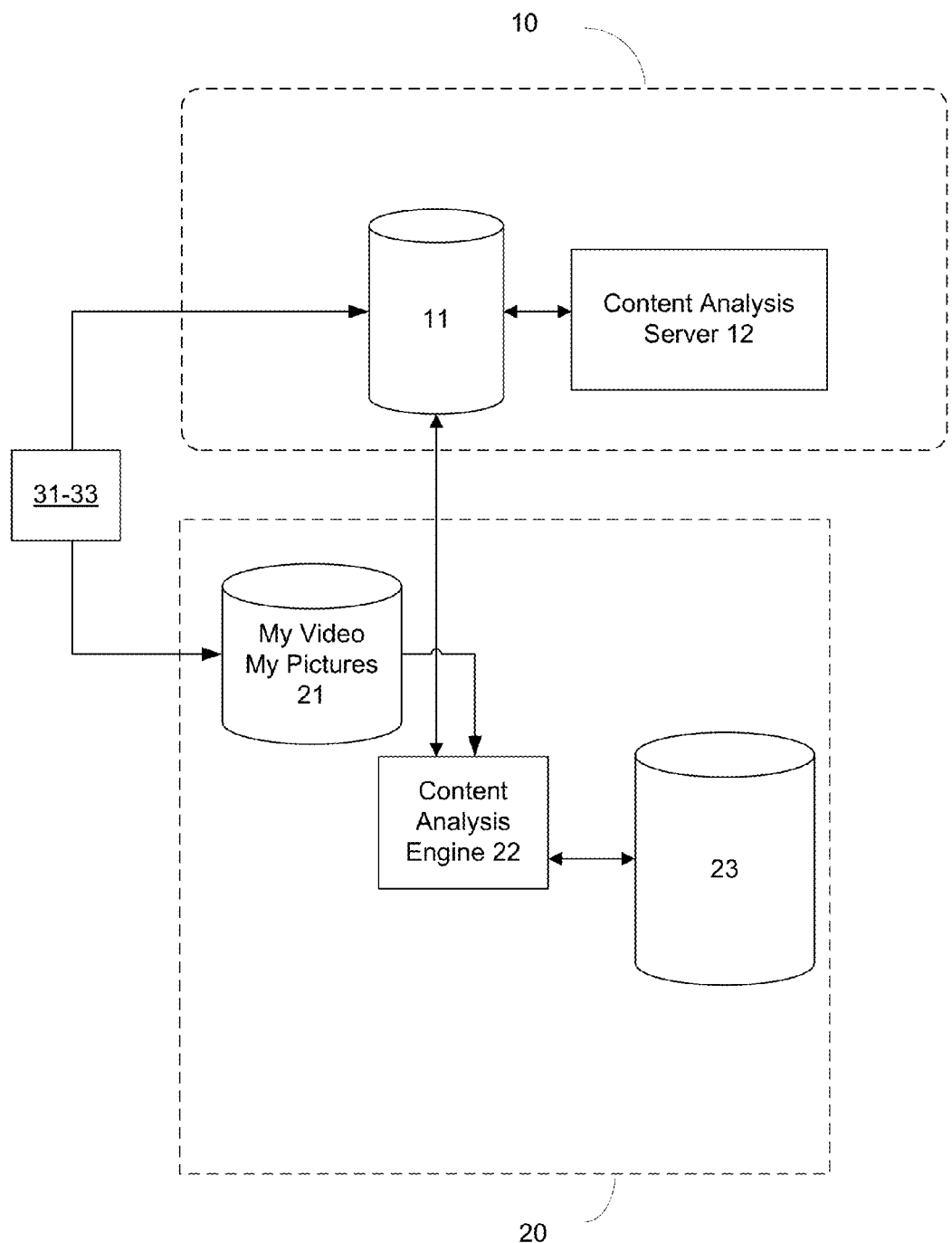
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

Various references are made to a system, a device and a mobile device. These terms can be used in an interchangeable manner.

There is provided a semi-automatic video editing application for a mobile phone.

There is provided a semi-automatic video editing process. Unlike manual video editing, the user is the "Director" and not the "Editor". He gives guides and directions to the system and selects his preferred scenes, but most of the labor and the technical work is done by the system: The system automatically selects a pool of good scenes from the video, from which the user can choose his preferred ones, it automatically finds the optimal cuts for these scenes, synchronizes the selected scenes with the soundtrack, and finally selects the graphical assets that best fit the video's content. The system also stabilizes the videos, and improves its quality by color correction and noise reduction.

In each step of the editing process, the user can direct the system by giving his preferences, general guides and by making subjective decisions. The system produces a set of editing suggestions that the user can accept, modify or reject. This process can be cyclic: In each step, the system can produce new suggestions based on the user input.

This semi-automatic process can produce a professional looking edited video while requiring minimal effort from the user.

The problem of video editing becomes even more critical today, when most of the cameras are actually mounted on mobile phones. In this case, the screen is small compared to a personal computer. As a result, it is impractical to insert all the functionality required from fully manual editing software into a single small screen. On the other hand, since the camera is available at all times, the amount of casual videos, documenting daily events, is rapidly increasing. Most of the videos are no longer videos of important events but of daily activities. Therefore, it is no longer practical for the user to spend a lot of time on each video—he would agree to spend only a few seconds on the editing and would prefer to leave the dirty work to the automatic system.

Due to the small screen of mobile devices, the common user interaction is via a touch screen, requiring minimal interface. This environment fits well to the proposed semi-automatic video editing framework: The user only gives his preferences and makes a few selections, while most of the work is done automatically by the system.

In addition, in mobile phones the camera and the screen reside on the same device. Therefore, the entire creation process, from the video capture to the video editing and even the viewing of the resulting video can all be done on the same device.

There are provided a system and application that implements this semi-automatic video editing. Various example included in the following text illustrate various ways in which the user can express his taste via the mobile phone.

It should be noted that this system can be a mobile device such as a mobile phone or be any other type of device, in particular a device that has both a camera and a display screen such as tablets, or computers with a very small screen.

Figure 18:
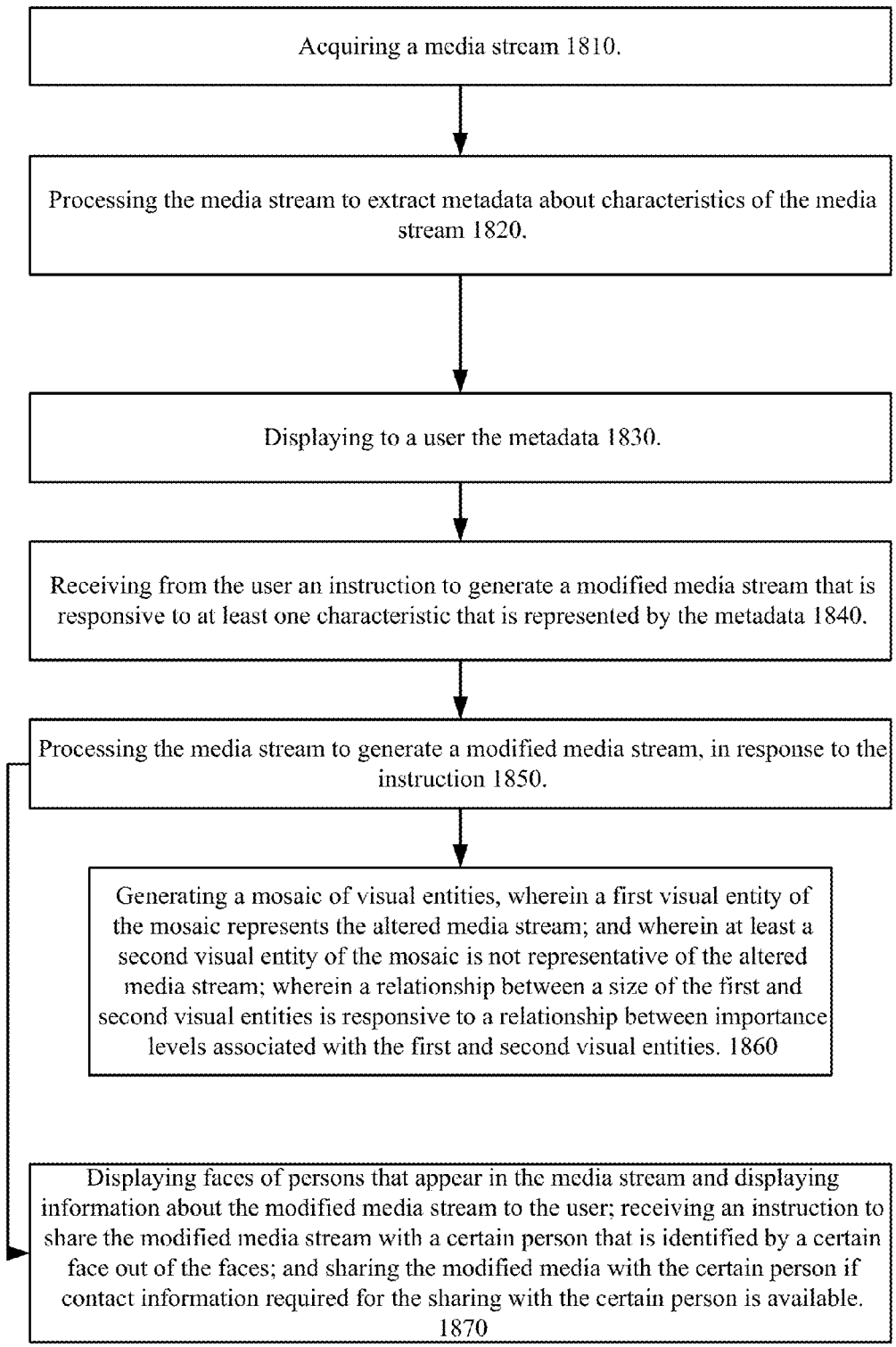

FIG. 18 illustrates method 1800 according to an embodiment of the invention.

Method 1800 may include:
 a. Acquiring a media stream 1810.
 b. Processing the media stream to extract metadata about characteristics of the media stream 1820.
 c. Displaying to a user the metadata 1830.
 d. Receiving from the user an instruction to generate a modified media stream that is responsive to at least one characteristic that is represented by the metadata 1840.
 e. Processing the media stream to generate a modified media stream, in response to the instruction 1850.

Stage 1850 may include generating a modified media stream that is shorter than the media stream.

Stage 1850 may include generating the modified media stream by applying a non-parametric method (as illustrated below).

Figure 24:
Figure 25:
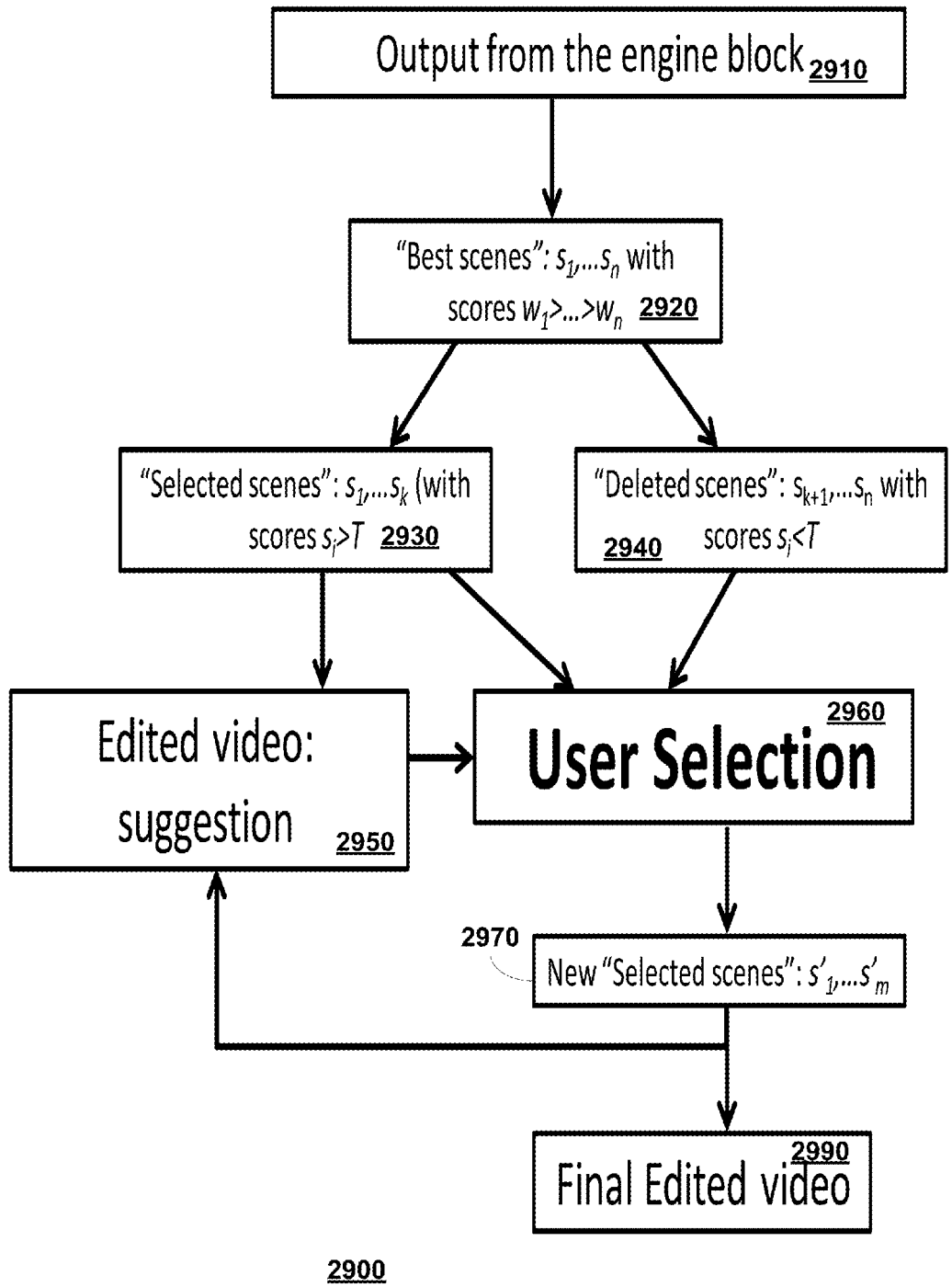

Stage 1850 may include generating the modified media stream in response to a speech attribute that is indicative of an importance level of media frames that are associated with speech (see, for example, FIG. 24).

Figure 23:

The characteristic of the media stream may be an importance of a certain person, wherein a face of the certain person appears in the media stream (see, for example, FIGS. 23 and 24).

The characteristic of the media stream may be an importance of a scene in the media stream Stage 1850 may include generating the modified media stream in response to a face attribute that is indicative of an importance level of media frames that comprise faces (see, for example, FIG. 24).

Stage 1850 may include generating the modified media stream in response to an action attribute that is indicative of an importance level of media frames that are associated with action (see, for example, FIG. 24).

Stage 1830 may include displaying to a user metadata relating to a portion of the media stream and may be executed while acquiring (1810) another portion of the media stream.

Stage 1850 may be followed by stage 1860 of generating a mosaic of visual entities, wherein a first visual entity of the mosaic represents the altered media stream; and wherein at least a second visual entity of the mosaic is not representative of the altered media stream; wherein a relationship between a size of the first and second visual entities is responsive to a relationship between importance levels associated with the first and second visual entities. The visual entities may include still pictures and video streams. A type of a visual entity can change over time—thus a still picture can replace a media stream and vise verse.

Figure 31:
FIG. 31 illustrate an album according to an embodiment of the invention.

FIG. 31 illustrates a screen according to an embodiment of the invention. Screen 3600 displays a mosaic of visual entities such as visual entities 3610-3620. Each visual entity can be a still image, a media stream or a graphical entity. A visual entity such as an image or a media stream can be associated with text that can be included within the visual entity or located in another visual entity. The shapes of the visual entities may differ from each other. The orientation of the visual entities can fit their original orientation but this is not necessarily so.

Referring back to FIG. 18-method 1800 (or one or more stages of method 1800) may be triggered in response to a detection of camera activity, when the user is located at a predetermined location, in response to an activity of another user that is associated with the user.

Stage 1850 may include detecting faces of multiple persons in the media stream and generating, for at least two of the multiple persons, a modified media stream that is generated by assigning to the person higher importance than an importance of the other persons of the multiple persons.

Figure 33:
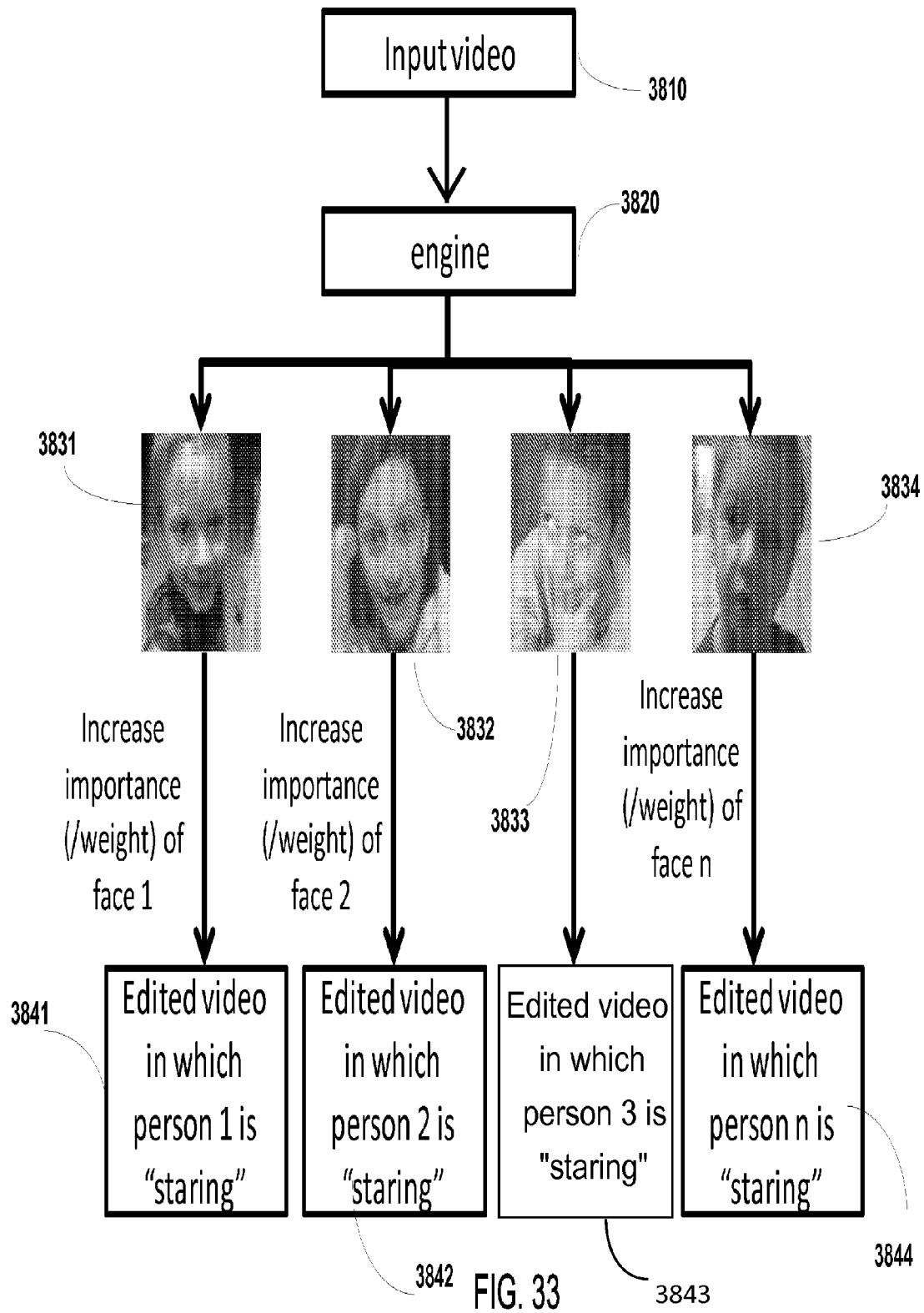

Referring to FIG. 33—input video (media stream) is analyzed by engine module 3820 to extract n faces of n persons such as four faces 3831-3834 of four, and for each face of each person the importance of the face is increased and a unique media stream is created per person 3841-3844.

Referring back to FIG. 18—stage 1850 may be followed by stage 1870 of displaying faces of persons that appear in the media stream and displaying information about the modified media stream to the user; receiving an instruction to share the modified media stream with a certain person that is identified by a certain face out of the faces; and sharing the modified media with the certain person if contact information required for the sharing with the certain person is available. Stage 1870 may also include requesting from the user the contact information required for the sharing with the certain person if the contact information required for the sharing with the certain person is unavailable.

Figure 32:
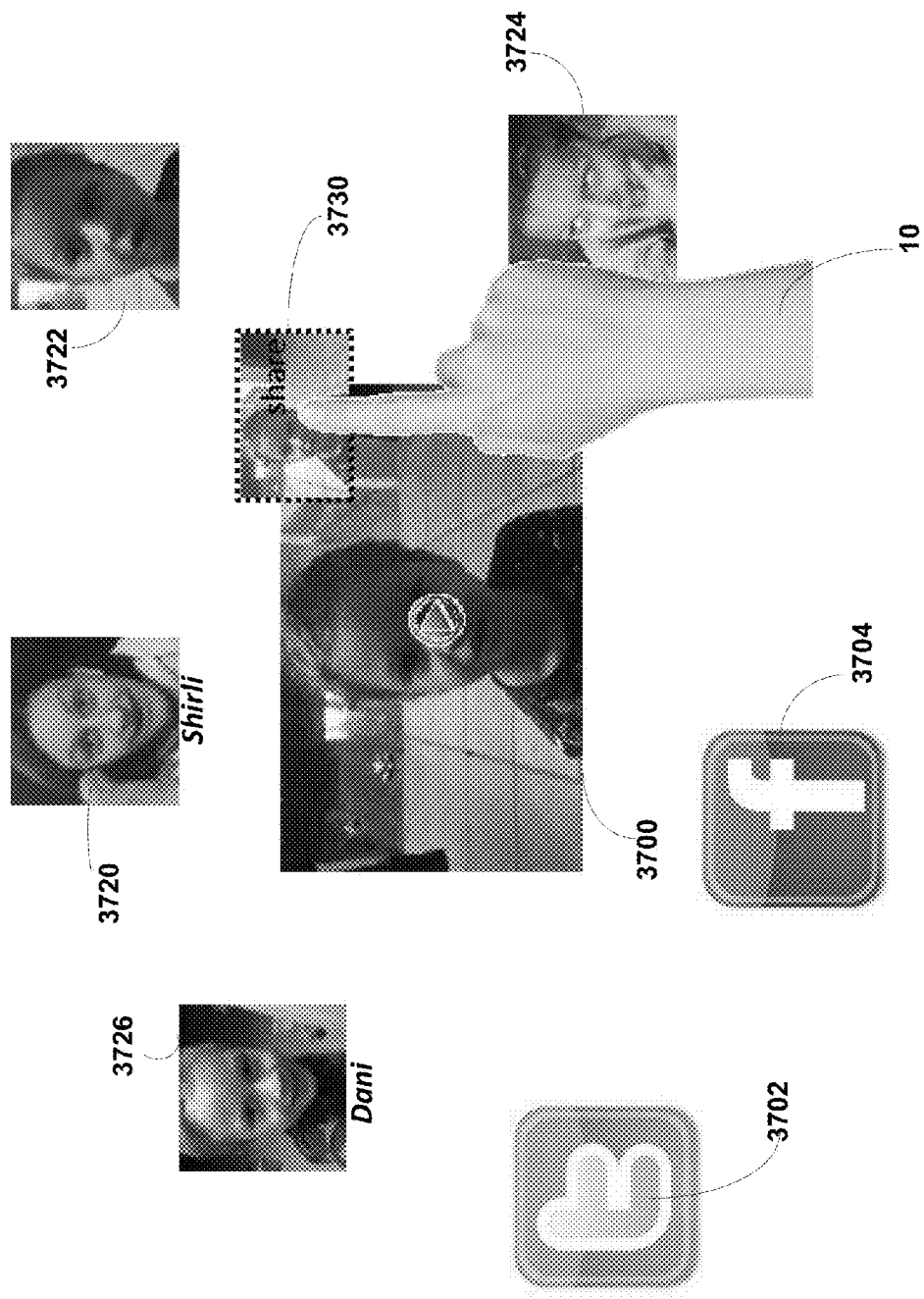
FIG. 32 illustrate face based sharing according to an embodiment of the invention.

FIG. 32 illustrates a screen that displays a media stream to be shared 3700, identified (previously associated or previously tagged) faces of users 3726 (Danny), 3720 (Shirli) and untagged (unidentified) faces of users 3722, 3724 and 3730. The media stream 3700 should be shared with untagged user 3730 (the image of untagged user 3730 is dragged to partially overlap the media stream 3700). In case of an untagged face—the person can be requested to provide information that may facilitate the sharing—by email, twitter 3702 or facebook 3704—on any other social network of communication manner.

Referring back to FIG. 18—the media stream may include audio frames that are synchronized with video stream; and stage 1850 may include generating a modified audio stream that comprises selected audio frames and a modified video stream; wherein the modified video stream comprises video frames synchronized with selected audio frames and additional video content; wherein the modified video stream and the modified audio stream are synchronized.

Figure 34:
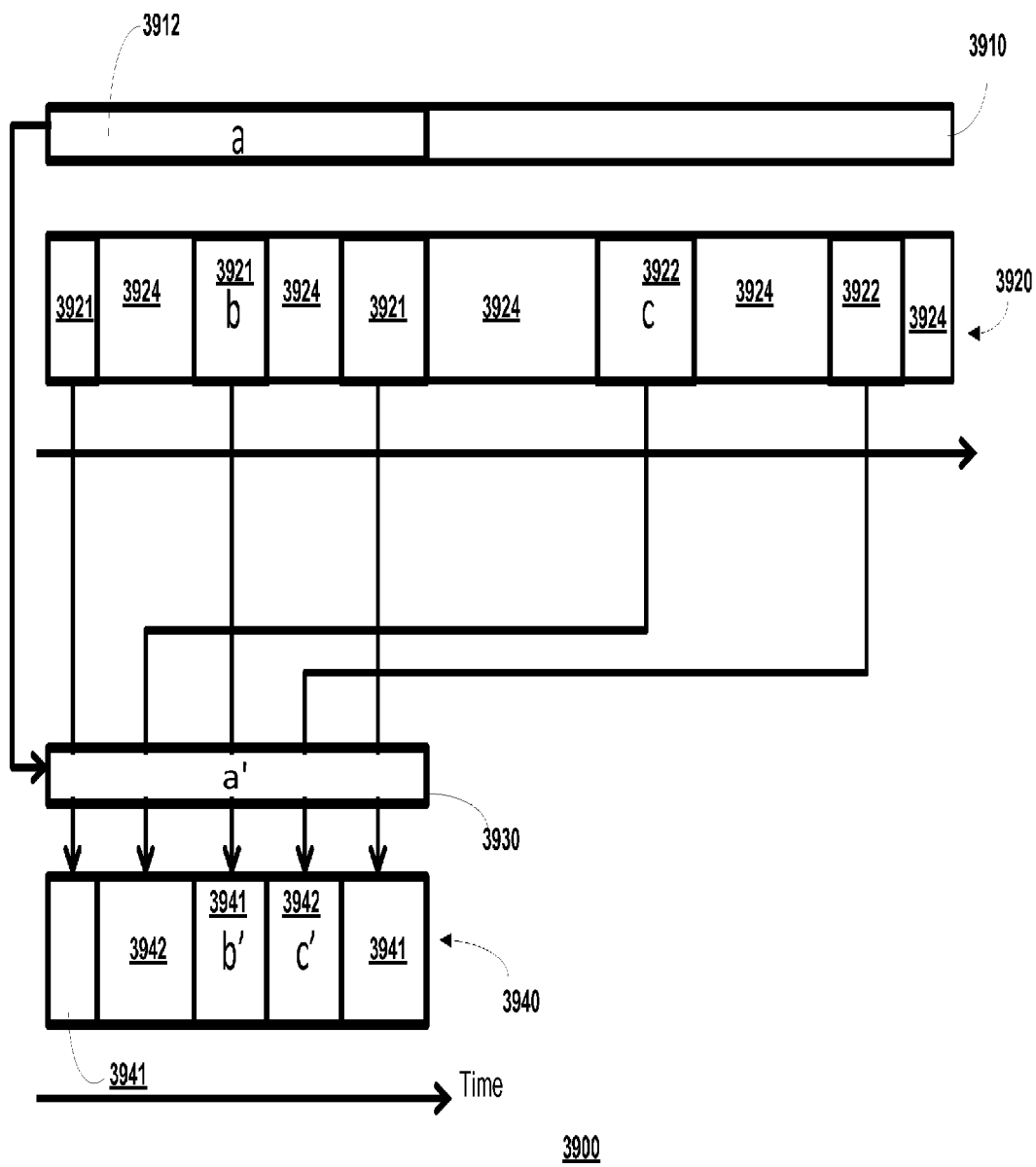
FIG. 34 illustrate an editing of video and audio according to an embodiment of the invention.

FIG. 34 illustrates an input audio component 3910 having a selected portion 3912 that may be processed (or provided "as is") to provide edited audio component 3930 to be synchronized with edited video component 3940. Edited video components include portions 3491 that are located at the same points in time in the edited video component 3940 as their corresponding video portions 3921 in the input video component as well as additional portions 3492 that are located at different time points (and even out of order) in relation to the video portions 3922 in the input video component 3920.

Figure 19:
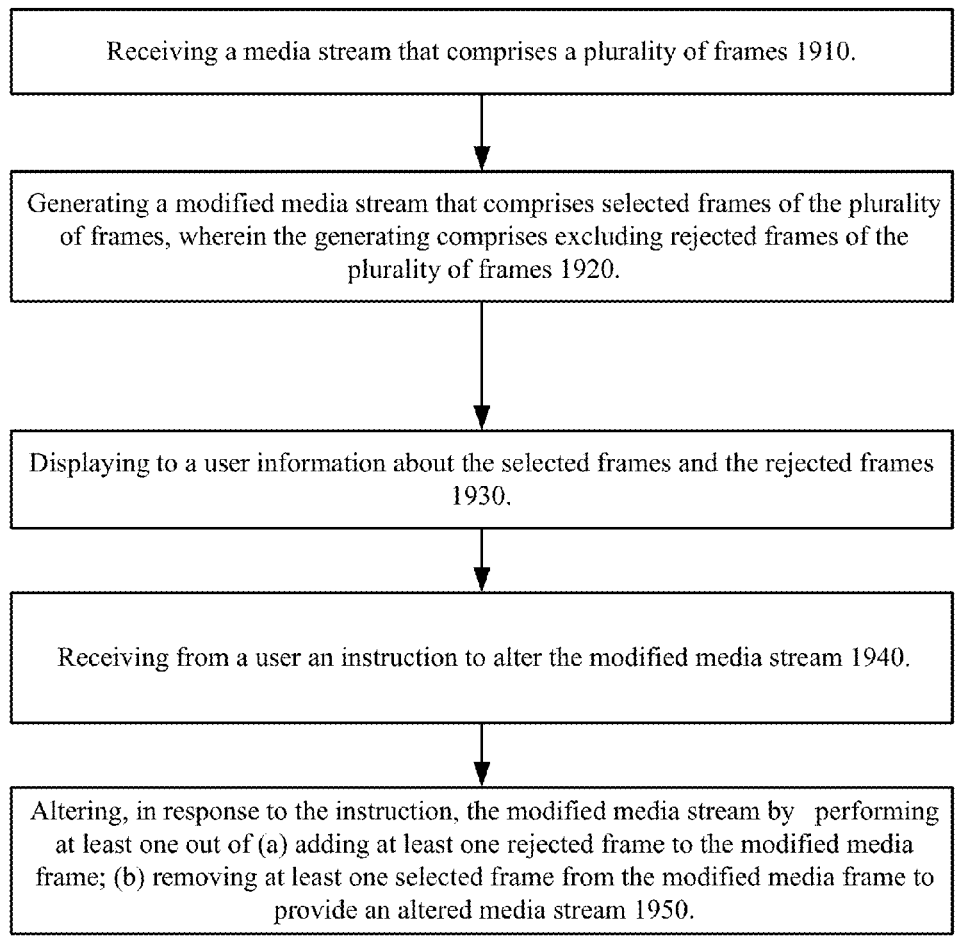

FIG. 19 illustrates method 1900 according to an embodiment of the invention.

Method 1900 may include:
a. Receiving a media stream that comprises a plurality of frames 1910.
b. Generating a modified media stream that comprises selected frames of the plurality of frames, wherein the generating comprises excluding rejected frames of the plurality of frames 1920.
c. Displaying to a user information about the selected frames and the rejected frames 1930.
d. Receiving from a user an instruction to alter the modified media stream 1940.
e. Altering, in response to the instruction, the modified media stream by performing at least one out of (a) adding at least one rejected frame to the modified media frame; (b) removing at least one selected frame from the modified media frame to provide an altered media stream 1950.

Stage 1930 may include displaying to the user information on a touch screen of a mobile device and stage 1940 may include receiving the instruction from the touch screen.

Stage 1920 may include generating the modified media stream in response to a type of soundtrack associated with the media stream.

Stage 1920 may include obtaining media streams from multiple users and to generate the modified media stream from frames of the media streams.

Stage 1940 may include receiving from multiple users instructions to alter the modified media streams and stage 1950 may include generating the modified media stream in response to the instructions.

Stage 1940 of receiving an instruction can include at least one of the following:
a. Processing speech of the user that is sensed in proximity to the acquisition of the acquired picture to extract the instruction. The speech may include an explicit instruction aimed to the mobile device but may be, alternatively, speech that does not include an explicit instruction aimed to the mobile device.
b. Processing mobile device movements made in proximity to the acquisition of the acquired picture to extract the instruction.
c. Detecting gestures made by the user (or by a person being imaged) to extract the instruction. Predetermined gestures can be associated with certain instructions.

Figure 20A:
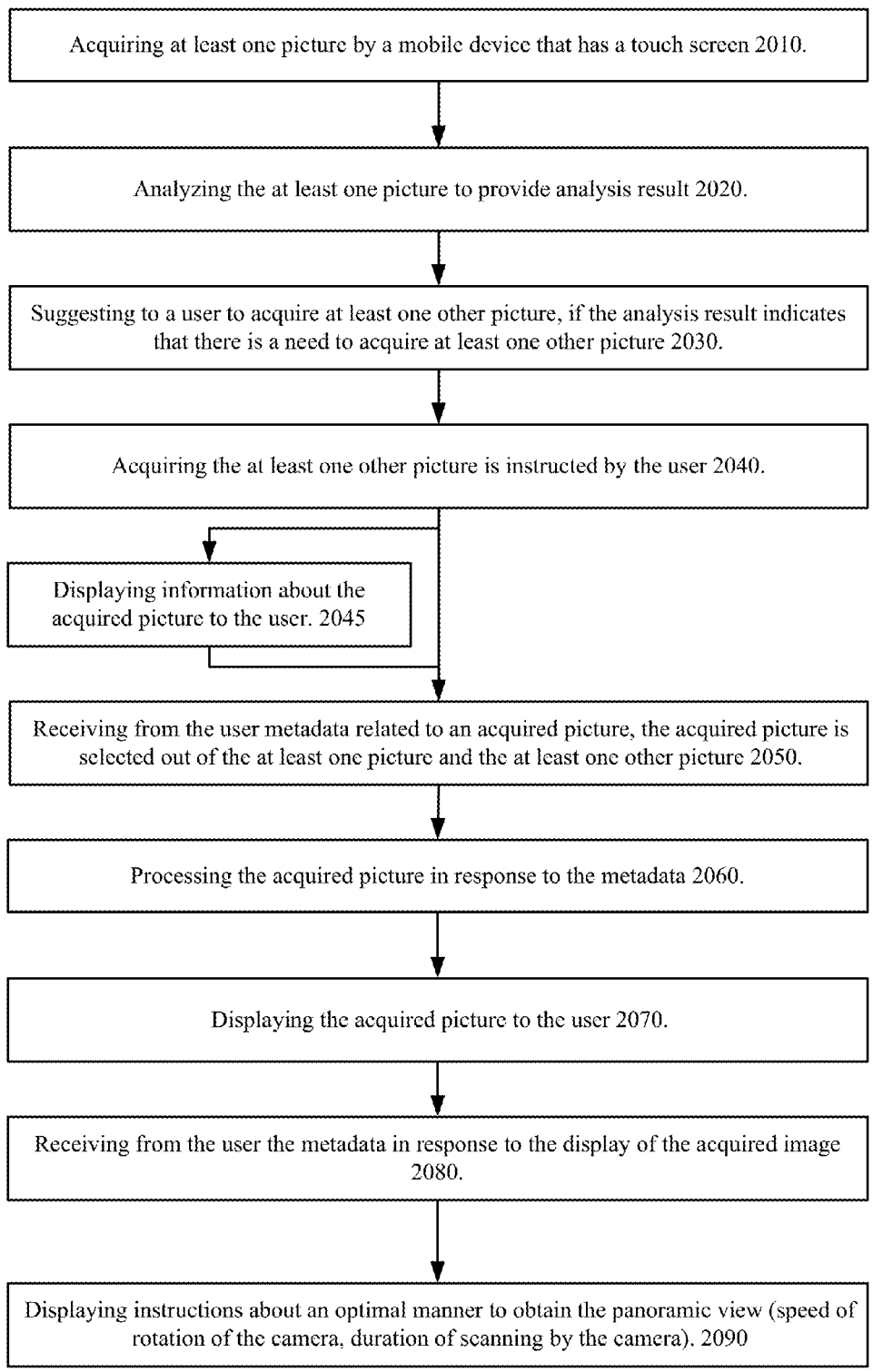

FIG. 20A illustrates method 2000 according to an embodiment of the invention.

Method 2000 may include:
a. Acquiring at least one picture by a mobile device that has a touch screen 2010.
b. Analyzing the at least one picture to provide analysis result 2020.
c. Suggesting to a user to acquire at least one other picture, if the analysis result indicates that there is a need to acquire at least one other picture 2030.
d. Acquiring the at least one other picture is instructed by the user 2040.
e. Receiving from the user metadata related to an acquired picture, the acquired picture is selected out of the at least one picture and the at least one other picture 2050.
f. Processing the acquired picture in response to the metadata 2060.
g. Displaying the acquired picture to the user 2070.
h. Receiving from the user the metadata in response to the display of the acquired image 2080.

Stage 2050 can be preceded by stage 2045 of displaying information about the acquired picture to the user and stage 205 may include receiving from the user the metadata in response to the display of the information.

Stage 2050 of receiving the metadata can be executed during the acquisition of the acquired picture.

Stage 2050 may include processing speech of the user that is sensed in proximity to the acquisition of the acquired picture to extract the metadata.

The speech may include an instruction aimed to the mobile device but may be, alternatively, speech that does not include an explicit instruction aimed to the mobile device.

Stage 2050 may include processing mobile device movements made in proximity to the acquisition of the acquired picture to extract the metadata.

Stage 2050 may include detecting gestures made by the user (or a person being imaged) to extract the metadata.

Stage 2030 may include suggesting acquiring at least one other picture of a person if an amount of pictures of the person is below a predetermined threshold.

Stage 2030 may include suggesting acquiring at least one other picture if an amount of pictures is below a predetermined threshold.

Stage 2030 may include suggesting acquiring at least one other picture if the at least one picture is of a quality that is below a predetermined threshold.

Stage 2030 may include suggesting acquiring at least one other picture if the at least one picture is out of focus.

Stage 2030 may include suggesting acquiring at least one other picture if the at least one picture comprise a partial image of a person and lacks a full image of the person.

Stage 2030 may include suggesting acquiring at least one additional image to be processed and provide a panoramic view of a scenery.

Method 2000 may include stage 2090 of displaying instructions about an optimal manner to obtain the panoramic view (speed of rotation of the camera, duration of scanning by the camera, avoiding camera shakes).

Stage 2050 may include obtaining metadata from the user by allowing the user to mark objects in the acquired image.

Figure 28:
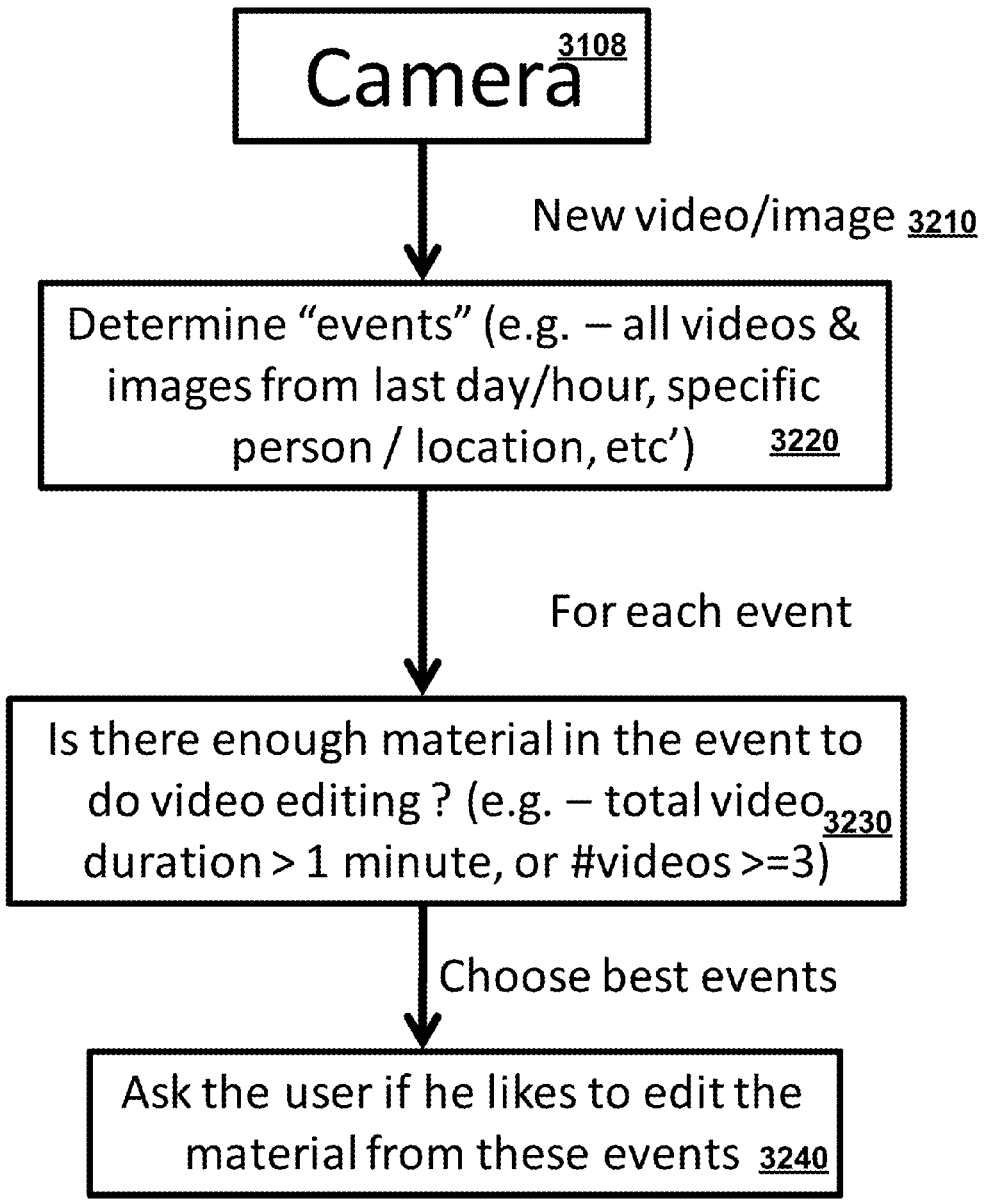

FIG. 28 illustrates method 3200 according to an embodiment of the invention.

Method 3200 may include:
a. Receiving from a camera (3108) a video stream or one or more pictures (3210).
b. Determining events 3220.
c. For each event:
  1. Checking if there are enough materials for the event (3230).
  2. Assuming that enough materials are present—asking (2340) the user if he wishes to edit the materials from the event—editing can be done automatically, semi-automatically and in any method illustrated in the specification. If so—an editing is performed (not shown).

Figure 20B:
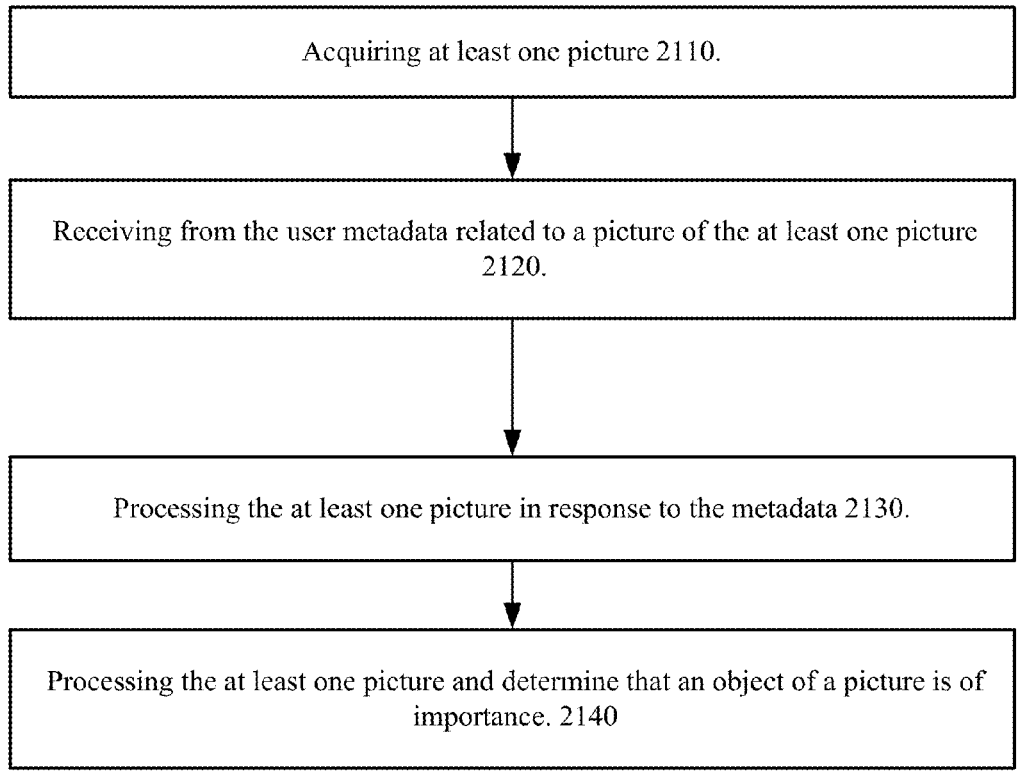

FIG. 20B illustrates method 2100 according to an embodiment of the invention.

Method 2100 may include:
a. Acquiring at least one picture 2110.
b. Receiving from the user metadata related to a picture of the at least one picture 2120.
c. Processing the at least one picture in response to the metadata 2130.

The metadata may be indicative of an importance level of an object of the picture.

The metadata may be indicative of an importance level of a face included in the picture.

Method 2100 may include stage 2140 of processing the at least one picture and determine that an object of a picture is of importance.

According to an embodiment of the invention the at least one picture may belong to a media stream. The processing of such a media stream is illustrated in FIG. 20C.

Figure 20C:
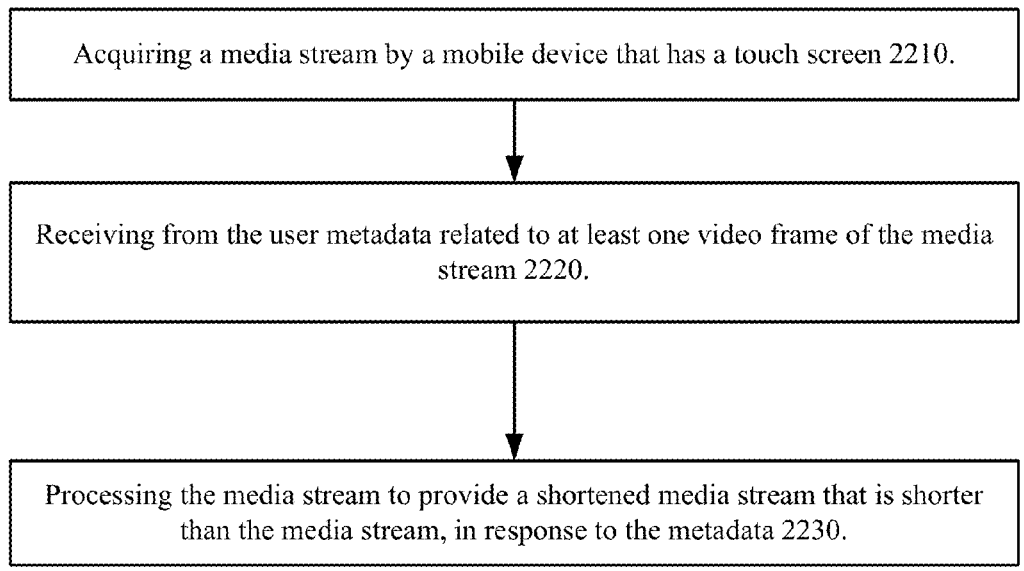

FIG. 20C illustrates method 2200 according to an embodiment of the invention.

Method 2200 may include
a. Acquiring a media stream by a mobile device that has a touch screen 2210.
b. Receiving from the user metadata related to at least one video frame of the media stream 2220.
c. Processing the media stream to provide a shortened media stream that is shorter than the media stream, in response to the metadata 2230.

Stage 2220 can include:
a. Receiving from the user the metadata in response to a display of at least a portion of the media stream.
b. Receive from the user the metadata in response to a display of an automatically extracted meta-data from a media stream.
c. Receiving the metadata during an acquisition of the media stream.
d. Processing speech of the user that is sensed during an acquisition of media stream to extract the metadata. The speech may include explicit instruction aimed to the mobile device but, alternatively, does not include an explicit instruction aimed to the mobile device.
e. Processing mobile device movements made during an acquisition of the media stream to extract the metadata.
f. Detecting gestures made by the user to extract the metadata.
g. Detecting gestures made by a person that appears in the media stream to extract the metadata.

Stage 2230 may include extracting an image of a person from the media stream; and adding the image of the person to video frames of the media stream that lacked the image of the person.

Figure 21:
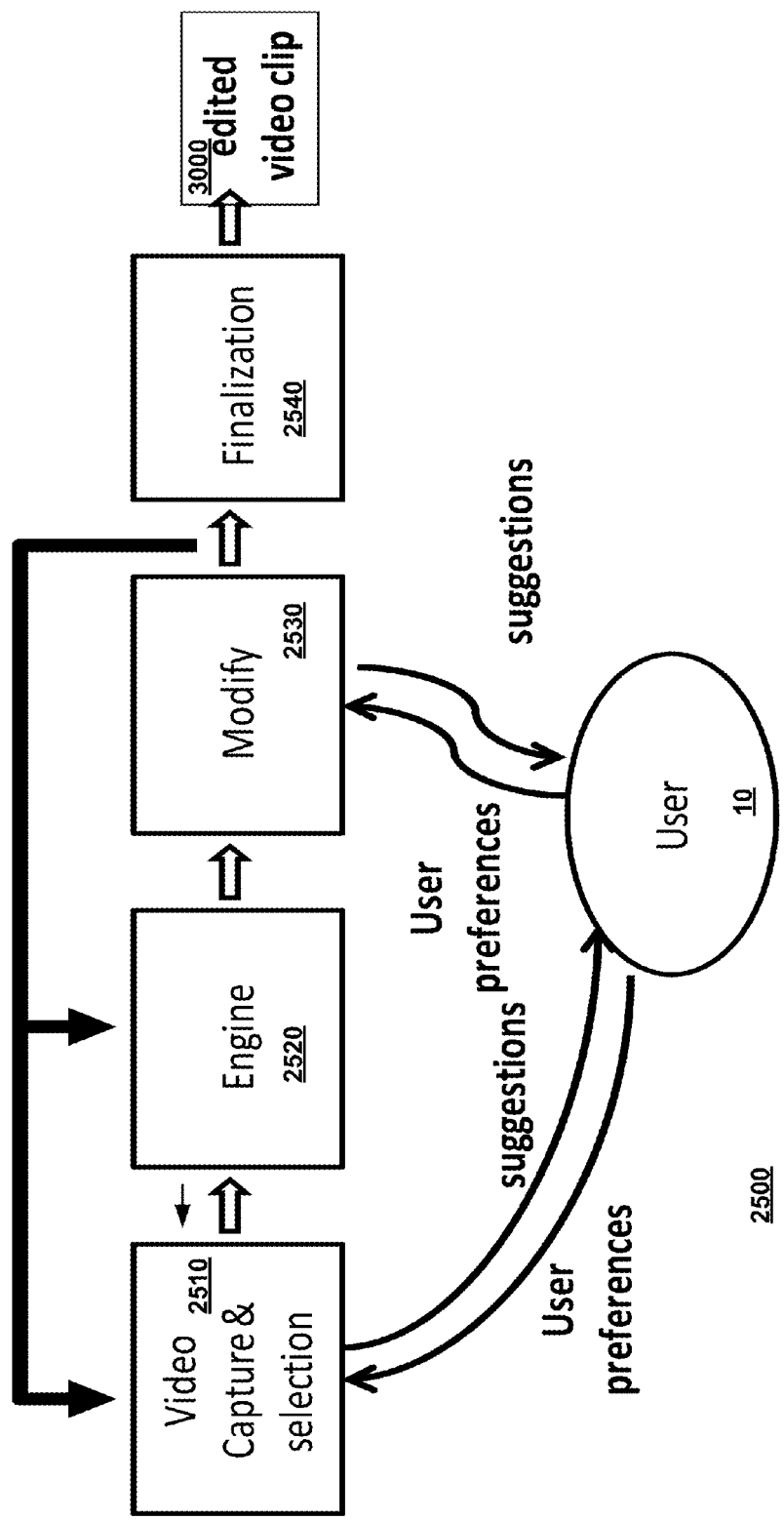
FIG. 21 illustrates a computerized system mobile device according to an embodiment of the invention.

FIG. 21 is a schematic diagram of a computerized system 2500 according to an embodiment of the invention.

The computerized system 2500 may include the following blocks/modules: video capture and creation block 2510, engine block 2520, modify block 2530 and finalization block 2540. The mobile device 2500 interacts with user 10 and outputs an edited video clip 3000.

The computerized system 2500 can be a mobile device such as a mobile phone. Alternatively, the computerized system 2500 can differ from the mobile device. It can be, for example, a server that can receive the pictures and/or media stream over a network. It can be a cloud-based computer. Alternatively—the computerized system may include a combination of a mobile device and another computer—each can implement one or more of the mentioned blocks.

Figure 38:
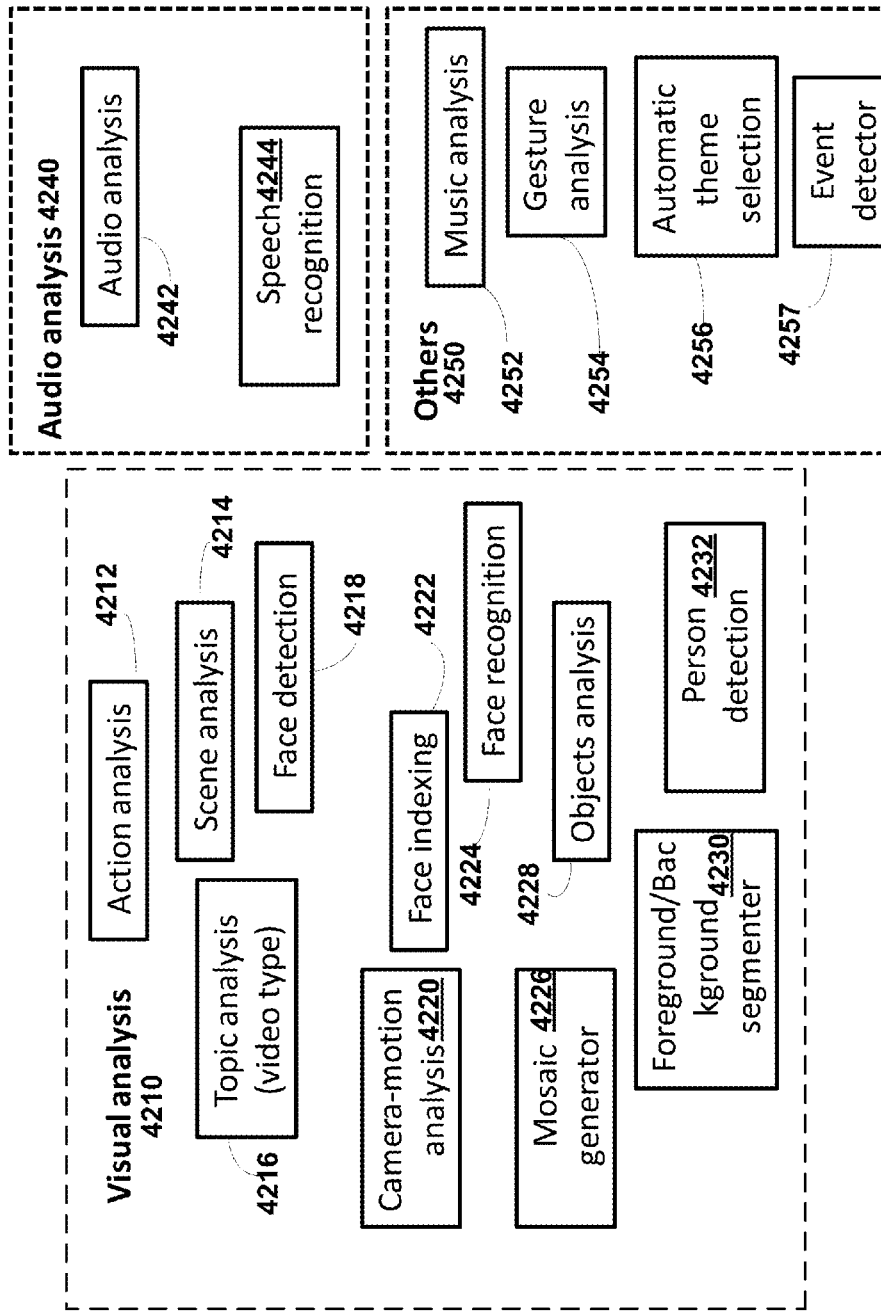
FIG. 38 illustrates various building blocks of a computerized system according to an embodiment of the invention.

FIG. 38 illustrates some building blocks of the system 4200 according to various embodiments of the invention. The blocks of mobile device 2500 can include some, all or none of the following building blocks:
a. Visual analysis module 4210 that may include at least one out of: action analysis module 4121 (can detect action in pictures, can receive action importance information—see item 2836), scene analysis module 4214, topic analysis module 4216 (can determine or receive a topic of a media stream), face detection module 4218 (can detect faces—see, for example, box 3310 of FIG. 29), camera motion analysis module 4220 (camera motion analysis, can detect camera motion and interpret certain motions as commands), face indexing module 4222 (face indexing), face recognition module 4224, mosaic generator module 4226 (can generate mosaics such as mosaic 3600), objects analysis module 4228, foreground/background segmenter module 4320 and person detector module 4232.
b. Audio analysis module 4240 that may include audio analysis module 4242 and speech recognition module 4244.

c. Another module 4250 that may include music analysis module 4252, gesture analysis module 4254 (can detect gestures and map them to predetermined gestures representative of instructions), automatic theme selection module 4256 and event detector module 4257.

Referring back to FIG. 21—a brief description of the various blocks is provided.

It is noted that the modules may interact and that the blocks can operate in a sequential or non-sequential manner. For example, the computerized system 2500 can decide to perform additional video acquisitions if the outcome of the modify block 2520 indicates that there is a need to acquire additional footage. This is represents by an arrow from module 2520 to 2510.

Video Capture & Selection block 2510. In this block the user can capture videos (and images) that will be used as input footage for the editing. The user can optionally view and add meta-data and preferences during the capture (for example—by marking significant moments), or get instructions from the system (for example: "Make a long shot for establish", "Take more footage of person A", etc'). In addition, the user can add external footage, such as videos taken outside the application, videos and images of himself or of others, music files, etc'. In the most trivial case, the user can simply choose videos and images from the camera-roll on the device.

According to an embodiment of the invention the triggering to the camera-editing session is done automatically by the system: for example, using a "camera listener" that is triggered by an action of the camera.

Engine block 2520. This block include the analysis engine (in which the input footage is analyzed automatically, extracting meta-data for all the input footage and selecting the best portions of the video) and a production engine (that adds visual assets, synchronizes the video to the soundtrack, and finally produces the edited video).

The video analysis can be done according to a non-parametric approach (described below). The meta-data includes, among others, a clustering of the scenes, camera-motion analysis, face-indexing, action analysis, salient activity detection, etc'. Based on the extracted meta-data, the best portions of the input videos are selected (denoted as the "Selected Scenes"), and are joint together to generate a suggestion for an edited video clip. The video analysis can be done either on the server or on the device (or both).

Modify block 2530. The user can view a suggestion for the edited video; he can accept or reject these suggestions. In addition, he can modify the edited clip by removing some of the selected scenes (i.e.—selected portions of the input videos) that were used to generate the suggested clip or he can add some deleted scenes—i.e.—video portions that were not included in the original suggestion.

The user may also be guided by the system for improving the input footage to the editing, e.g.—get tips such as: "The video footage is too short or boring", or "Take more videos of a person A, etc'.

The user also change his preferences (for example—"Person A is very important", while "Person B is not important", etc').

Finalization block 2540. FIG. 21 illustrates a module in which the production engine is running given the meta-data, the selection of portions from the video, and the user preferences. In this module, the selected clips, together with the soundtrack and the production elements (transitions, effects, themes, etc') are rendered in some resolution (predefined, or selected by the user) to get the final edited clip.

This module is used, for example, if the user confirms the system suggestions, but wishes to get it in a better resolution or using a different theme (or different visual assets).

This module may be technically the same as the production part of the engine block it receives the scenes selections, and the soundtrack, adds visual assets (such as effects and transitions), and produces the edited video. The final production can be done using various of commercial tools such as "Motion" of Apple.

FIGS. 22, 23, 24, 29, 30, 31, 32, 36 and 37 illustrate various screenshots of a user interface (UI) according to various embodiments of the invention.

Figure 22:
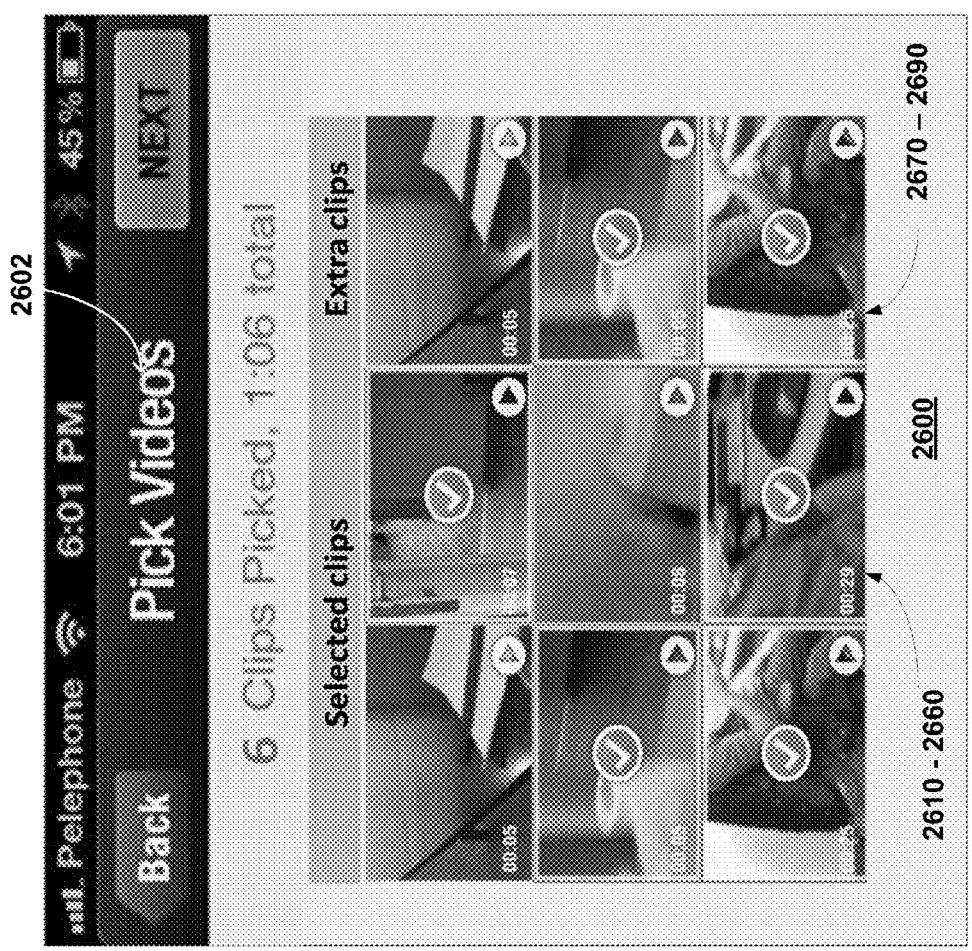
FIGS. 22, 23, 24, 29, 30, 36 and 37 illustrate different screens of various user interfaces according to various embodiments of the invention.

FIG. 22 illustrates screen 2600 that displays information (images) that represents a. Different selected video frames—each image out of images 2610-2660 represent a selected portion of a media stream, and b. Different non-selected (rejected) video frames—each image out if images 2670-2690 represents a rejected portion of a media stream.

FIG. 22 also illustrate metadata (or feedback) provided by the user—which selects (marked by an acceptance sign) images 2620, 2630, 2640, 2660, 2680 and 2690 to be included in a new (modifier or altered) media stream.

Screen 2600 include title 2602 "pick videos".

FIG. 23 illustrates screen 2700 that is titled "important people" 2750, and displays faces 2710, 2720 and 2730 of three persons, wherein the user selected the faces of two persons 2710 and 2730 to be important. Screen 2700 also includes a status field indicating the number of important people that were selected—"2 important people were picked".

FIG. 24 illustrates screen 2800 that is titled "user preferences" 2810, and displays faces 2812, 2814 and 2816 of three persons, wherein the user can selected the importance of each of these persons by people importance bars 2822, 2824 and 2826 respectively. Other user preferences can be selected by respective bars 2832 (speech), 2834 (faces), actions (2836), length (2838), tempo (2840) and effects (2842). It is noted that the bars are just one graphical embodiment of receiving inputs from a user.

Figure 29:
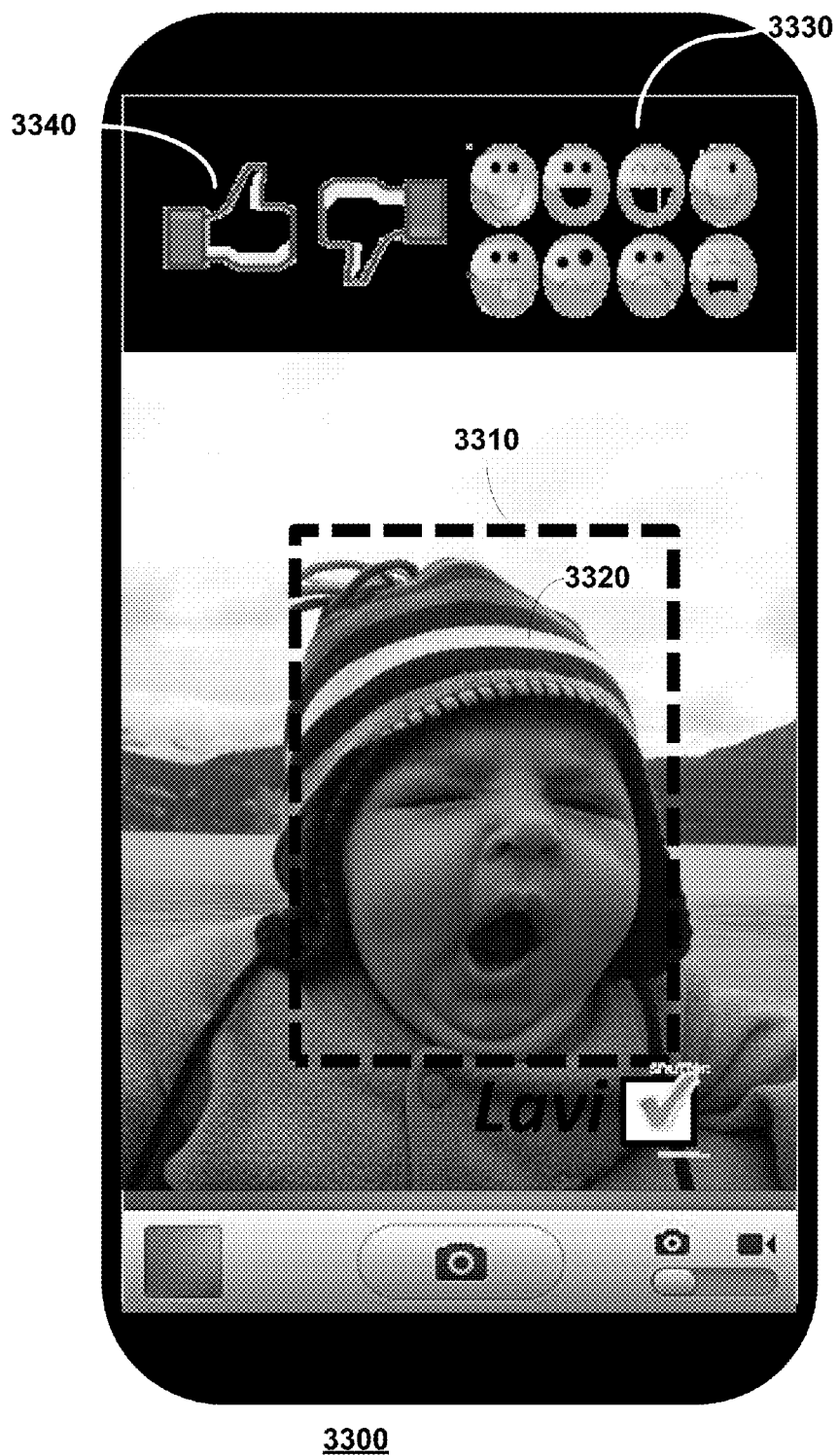

FIG. 29 illustrates screen 3300 that is displays an image 3320 of a person. The mobile device detects a face (it is surrounded by box 3310), and the user can provide metadata relating to the importance of the person by selecting icons such as like, dislike (3340) or any one out of multiple faces 3330—each associated with a different mood.

Figure 30:
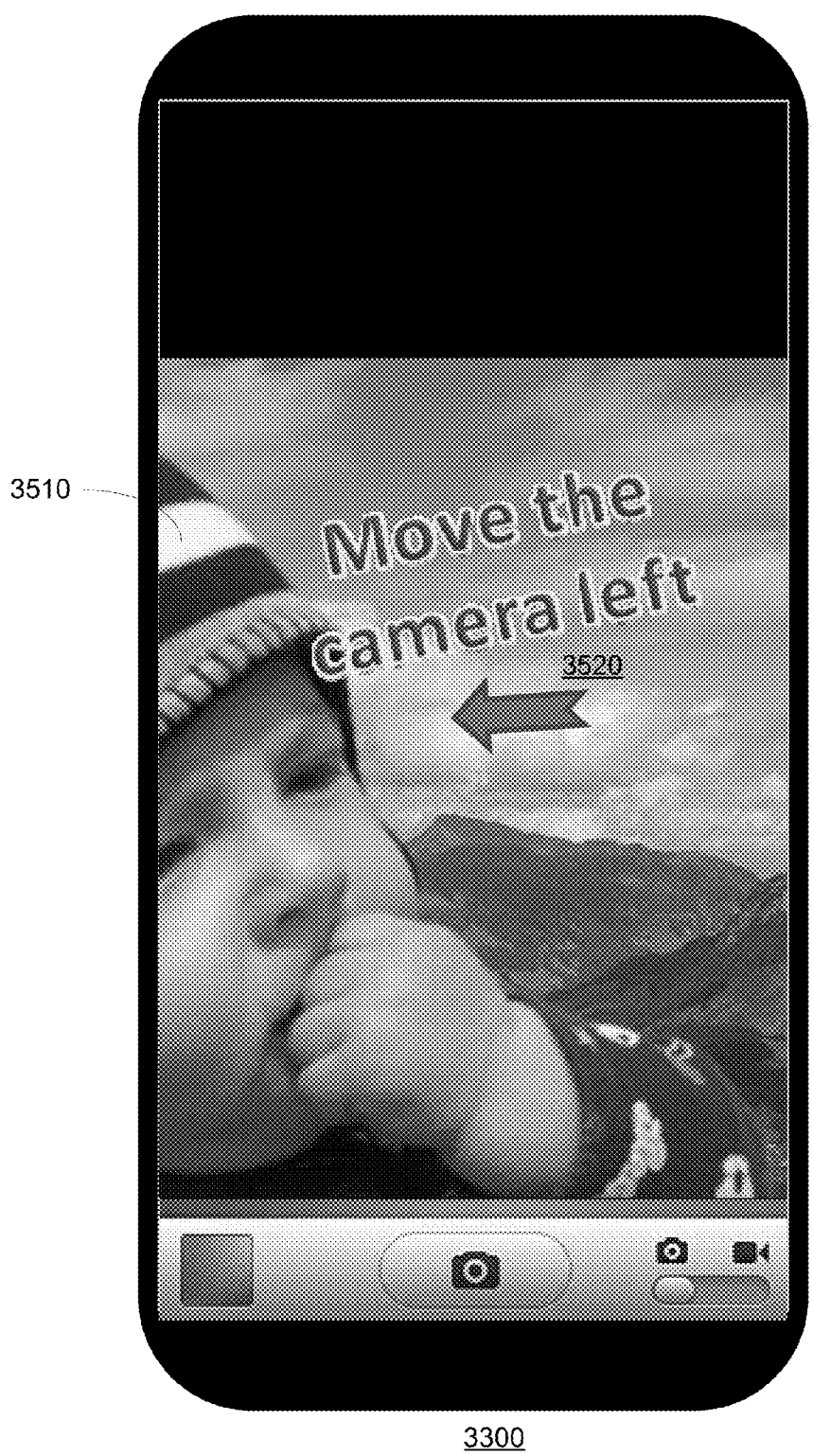

FIG. 30 illustrates screen 3300 that displays a partial (and not full) image 3510 of a person in which only a parts out of a desired part of the person is shown (for example only a part of the face of the person is shown) and the mobile device displays instruction to the user such as "move the camera left" 3520 and an arrow the points to the left.

Figure 36:
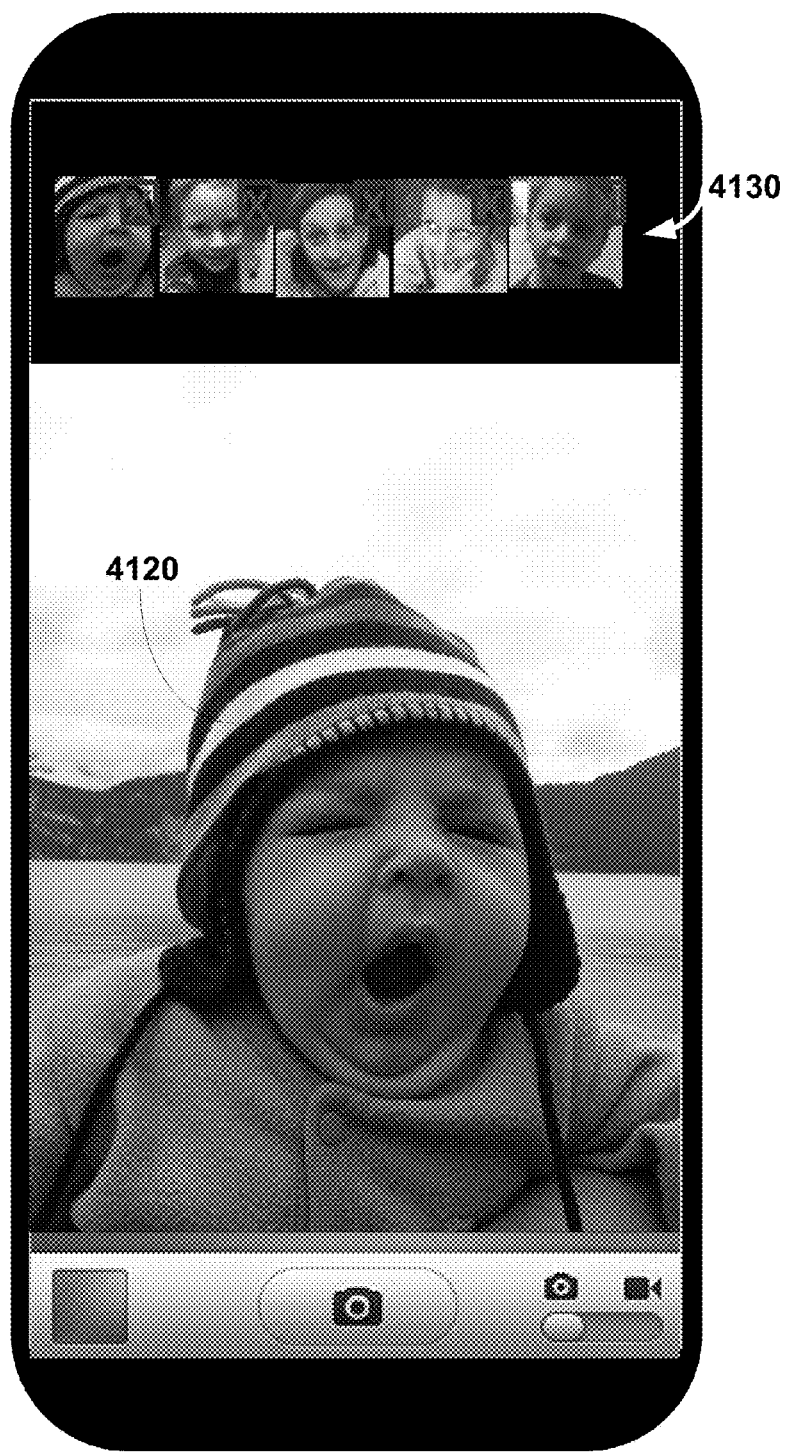

FIG. 36 illustrates screen 4100 that displays an image of a person 4120 and multiple faces 4130 of other people that were detected in the past, according to an embodiment of the invention. Alternatively—only faces of persons that were defined as important are marked.

Important faces 4130 from previous and current video/picture in this session (or event) are extracted and displayed to the user during the video/image capture.

The user can remove a face from the list 4130, indicating that this face is not important.

Figure 37:

FIG. 37 illustrates screen 4150 that displays an image of three persons 4180, 4170 and 4160, out of which the faces of persons 4170 and 4160 are detected and surrounded by dashed boxes and the user can select one or more of these faces (for example the face of person 4160) to indicate their importance. Alternatively—only faces of persons that were defined as important are marked.

Accordingly—the mobile device may automatically determine the important faces based on automatic analysis of faces, and the user can select/reject faces as being important or less important.

The Video Capturing & Selection Block ("Smart Camera") 2510.

In this block the user can capture and select videos (and images) that will be used as an input footage for the editing. In the proposed semi-automatic framework, the system can guide the user how to improve the captured videos even during the video capture. It should be noted that the features described next are optional extensions—in the simplest case, the user selects footage from the camera-roll.

System guides & suggestions. The application can guide the user for better video capturing and selection, based on earlier preferences of the user and based on the meta-data extracted from the videos during the video capture. For example—assume that the system detects a user intention to create a panorama of the scene (this intention can be detected easily using camera analysis—detecting that the camera is panning)—in this case the system may advise the user to pan the camera slowly in order to avoid motion blur and stability problems. In another example, the system detects that the camera is zooming on a person (which can be detected automatically using face & zoom detections), and advises the user to improve the image framing by positioning the person in the middle of the frame. Other examples for system guides are:

a. Shoot more videos, if the footage is not enough.
b. Add an "Establish" for the video or for a scene, for example, by shooting a "long shot" video clip, that is, a shot of the scene taken from a distance.
c. Take more photos or videos of person A.
d. Hold the camera more stable (if it is shaky).
e. Take a panorama of the scene (by scanning the scene with the camera)
f. Zoom-in or zoom-out.
g. Use certain themes or soundtracks for the video editing.
h. Move the camera to the left to better capture a person or an object.

When computerized system 2500 applies a smart camera process the system automatically detects the face, and suggest to the user to place the camera differently in order to bring the face to be fully inside the frame (or be in the center of the frame).

User preferences & Meta-data: The user can optionally add his own preferences, either during, before or after the video capture. Examples for such preferences can be:

a. Marking good/significant moments ("like"): such button can affect the video editing by increasing the score of scene selections that includes this moment in time, and thus making it more likely to be selected (in an extreme case—it can enforce selecting a video portion that includes this moment).
b. Marking bad/boring moments ("dislike"): making this moment less likely to be selected (E.g.—by adding a penalty to "scene selections" including this moment).
c. Marking important persons in the video. These persons will get more weight in the edited video: this marking can be done either by tapping on top of a figure in the video (during video capture), or by confirming faces detected automatically by the system (as shown in the Figure bellow). Equation 1 and Equation 2 demonstrates the ways in which such preferences can influence the editing.
d. Marking less important characters (Which will get a smaller weight in the edited video, or will be entirely omitted).
e. Marking important places, scenes, pets and other objects.

In addition, the user can add general meta-data to help the editing. For example:
a. A shooting mode (panorama, long shot, close up).
b. The type of scene or video (singing or dancing, party, travel, etc').
c. Notifying the user's mood (sad, happy, sleepy, etc')

In FIG. 30 the user can express his mood and like/dislike a moment in time. This figure also shows how the user can confirm a system meta-data (in this case—a detected face).

As indicated above the system automatically detects the face, and marks it on top of the camera during the video capture (If the system recognizes an already tagged face, it can display its name). The user can confirm (see, for example FIG. 29) that the meta-data (face, tag) is correct, or indicate that this is an important person, etc'. In addition, the user can press the "like" or "dislike" buttons, to indicate good (/important) or bad portions in the video. Finally, different user preferences can be given by the user, for example "telling" his mood (in the example this is done be tapping on top of one of the emotion faces in the top of the screen).

User preferences by gestures: The user can use gestures during the video capture to add his own preferences, or add other meta-data that will later be used for the video editing. The user gesturing can be done using hand movements in front of the camera, or using signs (e.g. —by shaking the camera, doing pre-define hand movements, predetermined gestures of the person being pictures, or facial expressions (smiling, sad face, etc')).

User preferences by voice recognition: The system can use voice recognition to receive user preferences. The system can process speech that does not include explicit instructions aimed to the mobile device to extract instructions—for example—a "Wow" shout may be used as an indication for an important moment, while "Ooooch" might be used to indicate a bad shot.

User preferences by Graphical UI: The user can give inputs and preferences through a user interface on the screen. For example—having screen buttons such as "Like" (The user likes the current part being shot, "Dislike", "Zoom", "Zoom Out", "Close-up", "Important Person", "Scenery", etc'. An example with some user preferences buttons is shown in FIG. 24.

Displaying meta-data: Optionally, some analysis of the video can be done during the video capture. This include, for example, face detection, face-tracking, body detection, tracking of moving objects, camera-motion analysis, etc'. Some of this meta-data (or a driven information) can be displayed to the user on the screen, and the user may give a feedback to this information, for example, accepting or rejecting the system suggestions. As an example, detected faces can be display on the screen, and the user can select only the important ones, while rejecting others. The system may ask the user to position the camera differently to improve the framing of the scene.

Mixture of multiple visual assets: The user can choose to combine multiple visual assets (videos, images, animations). For example, the user can take an animation video, and combine it with the video just being captured. Consider, for example, an animation video of fishes. Combining it with an indoor scene will seem as if the fishes are floating inside the room. Optionally, the merged video can be modified according to the video being shot: for example, the fish is "trying" to avoid occlusions with objects in the room Implementing this feature requires video analysis—for example, extracting 3D information of the scene and fitting it to the know 3D structure of the animation.

Combining a person and a new scene: A specific case of combining multiple visual assets, is "pasting" a person into a different scene.

In many cases, people want to take a video or a photo of a scenery, but wish to see themselves inside the video. A trivial way to do so is by standing with the back to the scene and capturing both the scenery and the people. However, a more convent way is to shoot the scenery, and add the user in an artificial way.

Another usage is "pasting" an acting person into a different scene—for example—letting the person shoot himself dancing at home, and get an edited video in which its seems as if he was dancing in a show or in a professional music clip.

Figure 35:
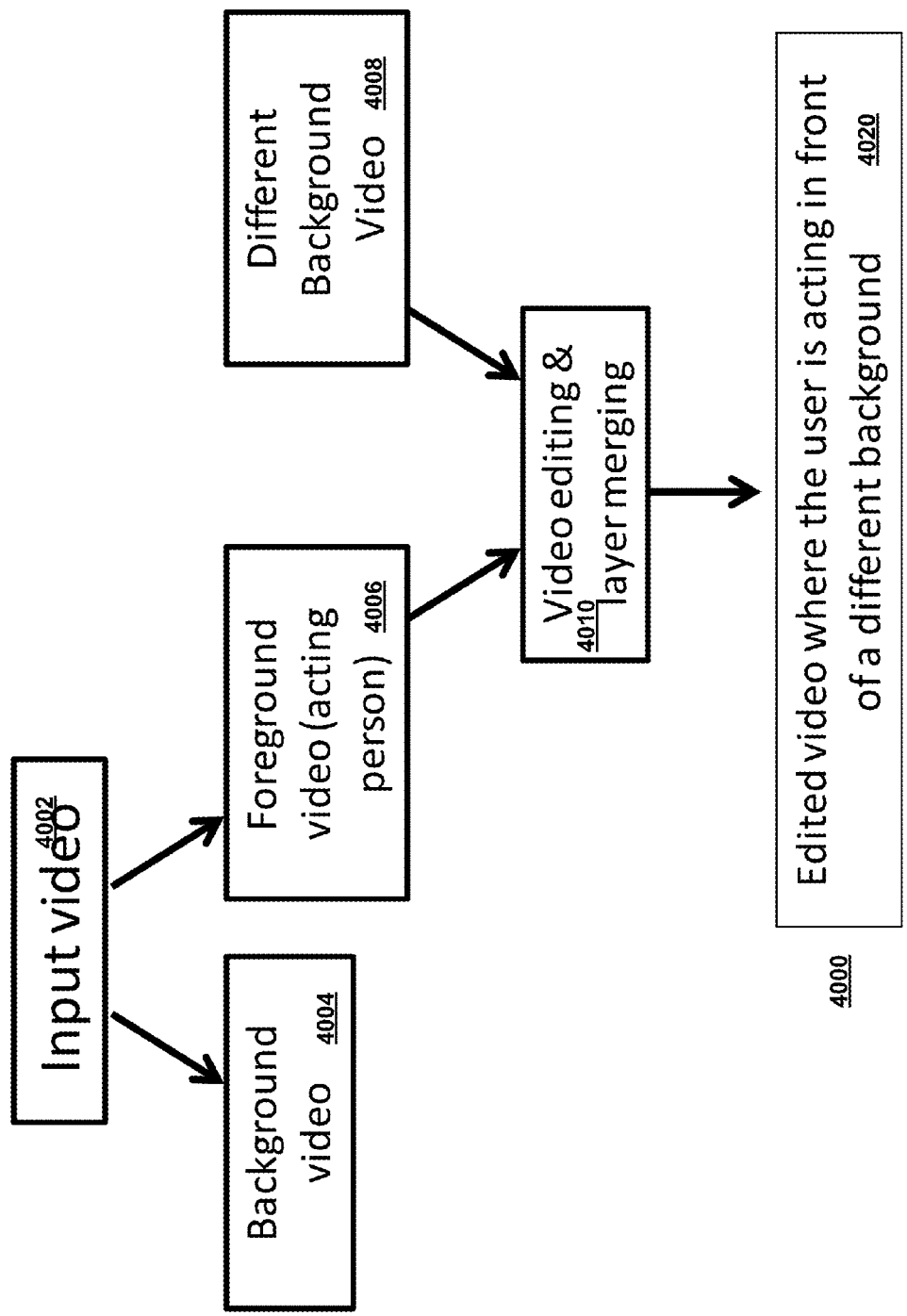

This can be done in the following way (a flow diagram is shown in FIG. 35):

Extract from input video (4002)—a person (foreground video—of a person) from a background (4004) using one out of numerous known algorithms for foreground-background separation).

If the person is shot in front of a uniform background such as a blue screen, this becomes a trivial task which is a common know-how in the literature. Keep the alpha channel that stores the (dynamic) mask of the foreground.

Edit (4010) the foreground video (and optionally the background video): select best portions, using methods such as the ones described below and especially the non-parametric approach illustrated below and "Paste" the actor (foreground video) on top of a different background video (4008) using the corresponding alpha channel.

This flow may include a video editing stage before merging the foreground with the background.

Soundtrack pre-play: The application can let the user play a pre-selected soundtrack during the video shooting. This may help him synchronize the video with the soundtrack (for example—for creating a "dance" video clip). Besides the simple UI component that lets the user record a video while playing the soundtrack, the rest of the process is identical to the "music-clip" mode.

Combining external materials: In addition to (or instead of) shooting videos, the user can also select a set of assets (videos, images, music) taken outside the application and use them as an additional material for the video editing.

The Engine Block

This block includes the analysis engine (in which the input footage is analyzed automatically, extracting meta-data for all the input footage and selecting the best portions of the video) and a production engine (that adds visual assets, synchronizes the video to the soundtrack, and finally produces the edited video). The video analysis can be done according to the non-parametric approach detailed below. The meta-data is used to save work for the user—by automatically analyzing the videos, the system can make decisions that are otherwise (as in the manual editing case) done by the user: The system uses the meta-data to automatically select a pool of clips ("Selected Scenes"), chose starting and ending points for each clip, synchronize the soundtrack and the video, mix the audio and the soundtrack, stabilize the video, etc'. It also generates a full suggestion for an edited video that can be later modified by the user.

The meta-data includes, among others, a clustering of the scenes, camera-motion analysis, face-indexing, action analysis, salient activity detection, etc'. Based on the extracted meta-data, the best portions of the input videos are selected (denoted as the "Selected Scenes"), and are joint together to generate a suggestion for an edited video clip. The video analysis can be done either on the server or on the device.

Pre-processing & uploading: The analysis of the raw footage can be done either in the server or on the device. Alternative, some pre-processing is done on the device (such as downscaling the videos to a smaller scale) and the rest is done on the server.

For the server option, the application has to upload the footage (or parts of it) to the server. Optionally, the upload can be done not directly from the mobile device but indirectly from a storage location, such as using the iCloud or GoogleDrive.

To save upload time, the videos can be down-sampled and/or compressed before the upload. The video analysis runs on the low-res videos, determining the selected video portions (selected scenes) to be used in the final production (edited video). Then, either a low resolution result is produced (from the low-resolution uploaded videos), or alternatively, after selecting the best video portions, the system can upload only the selected portions in a higher resolution to obtain an HD edited vide without uploading the full videos.

Another optimization can be achieved by doing some computation inside the mobile device (for example—face detection, camera-motion computation, etc'), and using these computations to reduce the amount of video being uploaded, either by doing a rough selection already on the mobile device, or by uploading different portions of the videos in different resolutions according to some importance or quality score (e.g.—face regions might be important).

The Modify Block

The engine block automatically generates a suggestion (or several suggestions) for the edited video. This suggestion is displayed to the user, and if he likes the result (or is very lazy), he can decide to use this suggestion as is.

In additional, the user may receive guides from the system, such as: "More footage is needed", "Shoot more videos or shoot more videos of parson A", etc').

The user can edit the video in a semi-automatic way. Instead of doing all the editing work, now the user is the "Director": he gives guides and directions to the system for example by selecting his preferred scenes, but most of the labor and the technical work is still by the system. The main block for user modifications is through the "Modify" block: The system's suggestion is displayed to the user, together with the "selected scenes" (selected portions of the input videos) and "deleted scenes" (video portions that were not selected for the initial suggestion but can be used for a modified version based on the user preferences). The user can add or delete scenes, and in this way to control the video editing with a minimal work.

An example of such a modification screen is shown FIG. 22. The user can receive an output from the engine block (2910), the mobile device may find the best scenes (2920) and display to the user rejected and selected scenes (2930, 2940), the user can provide input/instructions (2960) and in response a modified media stream is generated (2970) by removing "Selected scenes", or adding some "Deleted scenes" (right figure). These modifications are sent back to the system, which can either finalize the result (2990), or go back to the analysis stage (suggesting an edited video stream 2950), generating a new suggestion.

As an example, a typical number of selected scenes ranges between 7-20 scenes, and the number of rejected scene ranges between 1-15 scenes. A typical ratio between the number of selected and rejected scenes is 2:1 or 3:1. Optionally, the number of rejected scenes can be larger, but only some of them will be shown to the user by default, and the rest are shown only per user request. The number of rejected scene might also depend on the duration of the input videos.

Here we describe a simple 'modify' flow, where the user only chooses from a set of selected and deleted scenes:

The engine block outputs a set of "best scenes" $s_1, \ldots, s_n$ (each is a selected portion of the original videos): each one of the "best scenes" comes with a score (computed by the engine): $w_1, \ldots, w_n$. This score estimates the importance of each selection to the final editing. For simplicity assume that these scores are sorted ($w_1 >= w_2, \ldots, >= w_n$).

The system takes the k best selections from this set (denoted as "selected scenes"), and automatically produces an edited video.

The users gets the produced video, together with the sets of "selected scenes" (used in the editing) and "deleted scenes" (not used in the editing). He can choose to remove some of the selected scene, or add ones from the deleted scenes (He might also be able to change the order of the selections).

The user selections, denoted as the "new selected scenes" $s'_1, \ldots s'_m$ are used to create a new edited video.

This process might repeat iteratively (letting the user re-select the scenes).

In is noted that the user may choose a set of "scenes" (or clip-selections) from a pre-determined set that were automatically selected by the system.

Modify flow by changing user preferences (see user preferences diagram).

The user can also add/modify his own preferences. For example, the user can select the people that are important and that will appear in the output video (Examples are shown in FIG. 23). In addition, he can select important scenes, locations, objects, etc' All these assets are created from the meta-data, using the video analysis block, and are displayed to the user in the Modify screens.

The user can select important people, locations and scenes (see, for example, FIG. 24).

The user may decide to manipulate the output video in several other ways. For example, he can add or change the titles, change the sound track, select themes and styles, etc'.

An example to how this user preferences feature be implemented is described below.

Assume that the scene selection module (part of the video editing engine) is done by optimizing the following score (Eq. Equation 1):

$$E(s) = \alpha E_{faces} + \beta E_{scenes} + \chi E_{actions} + \delta E_{other\text{-}scores} \quad \text{Equation 1:}$$

Where $S=(s_1, \ldots, s_k)$ is a scene selection (i.e.—a set of selected portions from the input videos), E is the score, $E_{faces}$ is a representatives score for faces (measuring how well we represent faces), and in a similar way, $E_{scenes}$ and $E_{actions}$ measure how well we represent scenes and actions, and finally $E_{other\text{-}scores}$ includes all other measures for selection (e.g.—speech representatives, avoiding moments when the camera is shaking, etc'). The multipliers $\alpha$, $\beta$, etc' comes from the relative importance of each component.

Each component can be written as a weighted sum of specific face representatives (i.e.—how well do we represent a specific face/person in the video. The weights can be determined by the importance of each face in the video, and be determined from factors such as: the size of the face, its frequency (in the input video), or whether it was tagged by the user, etc':

$$E_{faces} = a_1 E_{face_1} + a_2 E_{face_2} + a_3 E_{face_3} + \ldots + a_n E_{face_n} \quad \text{Equation 2:}$$

Similarly, the other components (such as the scenes and actions) can also be written as a weighted some of representatives of specific scenes/actions.

Coming back to the modify block, the user can influence the video editing by changing the importance of entire components (e.g.—faces are important in this video session) or the importance of specific objects (e.g.—the importance of a specific face).

The user can also set general attributes of the output video (length, tempo, the amount of visual effects in the production, etc'). These attributes might affect the scene selection (e.g.—the length of the output will affect the number of scenes being selected).

An example for a UI which enables the user to directly control the importance of visual assets such as faces, the importance of different aspects of the videos on the video editing, and some general restrictions and preferences is shown in FIG. 28.

The user can directly controls the importance of different objects or video aspects in the editing (see FIGS. 23 and 24). For example—setting the importance of specific persons, or changing the general importance of "faces" (or people) in the editing. Making this weight larger might say that in the edited videos we will show more people, and might give away other scenes such as a nice scenery with no people in it.

If the user decides to add more footage, he can go back to the video capture block. Alternatively, the user's preferences are sent back to the engine block, generating a new suggestion based on the updated user preferences.

When the user is happy with the result, a final step of finalization may be applied. In this step an edited video in a desired resolution is produced (for example—a video clip in HD resolution).

Automatic theme selection.

A theme is (1) a set of rules and parameters for the video editing. (2) A set of visual assets. For example, the theme "Energetic" includes a set of parameters that encourages using many short video portions (instead of a few longer ones), using many transitions & effects, etc'. The Energetic theme also consists of a set of corresponding visual assets such as effects and transitions (These effects are relatively vivacious, for example, a "Brush Strokes" effect). In contrary, the "Soft" theme encourages choosing few long clips, and using simple and soft transitions.

The theme can be chosen automatically using the platform. This choice may be based on at least one of the following:

a. The sound-track—the type of soundtrack has a large influence on the mood" or type of the video clip, which obviously has an important role in choosing the theme. For example, a quiet song will not fit well to a vivacious theme, but rather to a "Soft" one. On the contrary, a user which choose a sound track of heavy metal song will be more likely to prefer vivacious themes over soft ones. The type of the song can be determined in advance for pre-selected library of soundtracks, or it can be determined automatically according to the tempo of the songs (there are various music analysis libraries that includes an estimation of a song's tempo).

b. The activity in the video—videos with a lot of action (jumping people, running, etc') are more likely to fit into a vivacious themes. The activity in the video can be determined, for example, using motion analysis in the video, detecting large motions. One way to detect activity is by computing optical flow (the motion of each pixel in each frame), and measuring the average amount of the motion in the video. Alternatively, frame with high Saliensee are defined as having high amount of activity.

c. Object detection—there are objects whose existence may indicate on the content of the videos uploaded, and thus infer for the preferred theme. For example, video with kids or babies are more likely to fit into a "soft" theme or even a special theme for kids. Existence of many people may indicate a party (together with a large sound). Existence of mountains or lakes may indicate a travel video, etc'.

d. Video type classification: The user input videos can be classified by their content: For example, saying that the video is a travel video, kids, a video documenting a talking person, etc'. The type of video can determined using the meta-data extracted as in the non-parametric processing.

e. User habits: for returning users, the choice of the theme can be effected by their previous video sessions, either from their old choices—user tend to have a consistent taste (if they always selected a 'soft' theme, it might be better to use this theme as a default choice), and continuing with the meta-data extracted from the earlier sessions. For example, some users always takes videos of their babies. The next video will be, in high probability, another video of the baby. Another example—detecting a lot of activity in user's video will increase the probability that the next video will have a lot of action (favoring more vivacious themes)

f. Time and location of the video. E.g.—if the user lives in one country, and the videos are taken in another county (especially if the location changes frequently), it may be a good indication for a "Traveling" theme (In this case the system might also add assets that are specific to the location of the user: e.g. Italian music and a map showing the route of the trip.

g. Layer-Based effects: Foreground/Background segmentation can be done using various known methods. This segmentation can be used to improve the production of the edited videos, by applying effects only to one of the layers, such as: fast forward (creating a time lapse only on the background), applying some image filters, adding animations, etc'.

Events

Event-Driven video capturing: The input materials for the video editing can all relate to a specific event. For example—videos of a trip, or of a party. Optionally, the videos can be uploaded not by a single user, but by multiple people that participate in this event: For example, the participants of a party, or all the people that are shooting a video in a certain place (a pub, a public location, etc').

Figure 26:
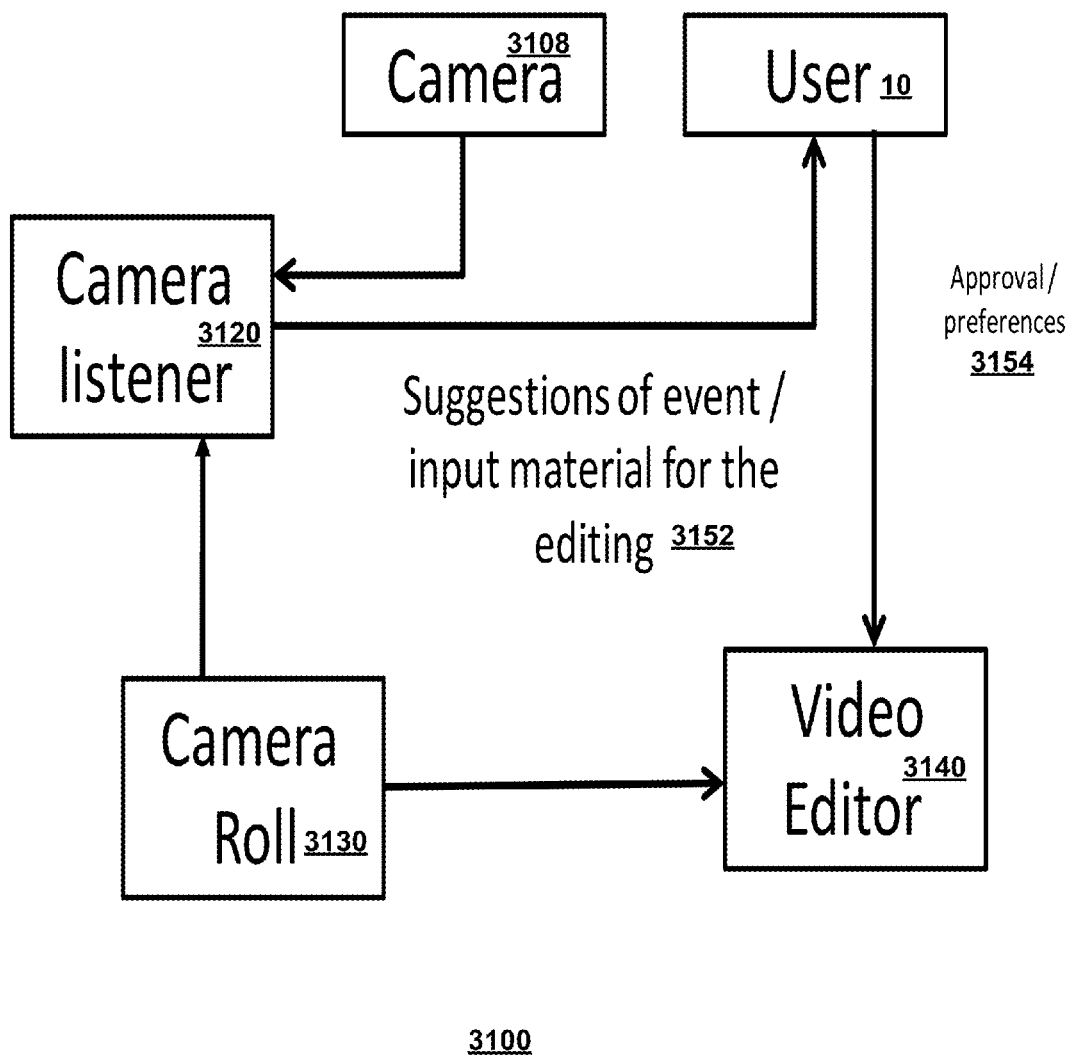
FIGS. 26 and 27 illustrate event detections according to various embodiments of the invention.
Figure 27:
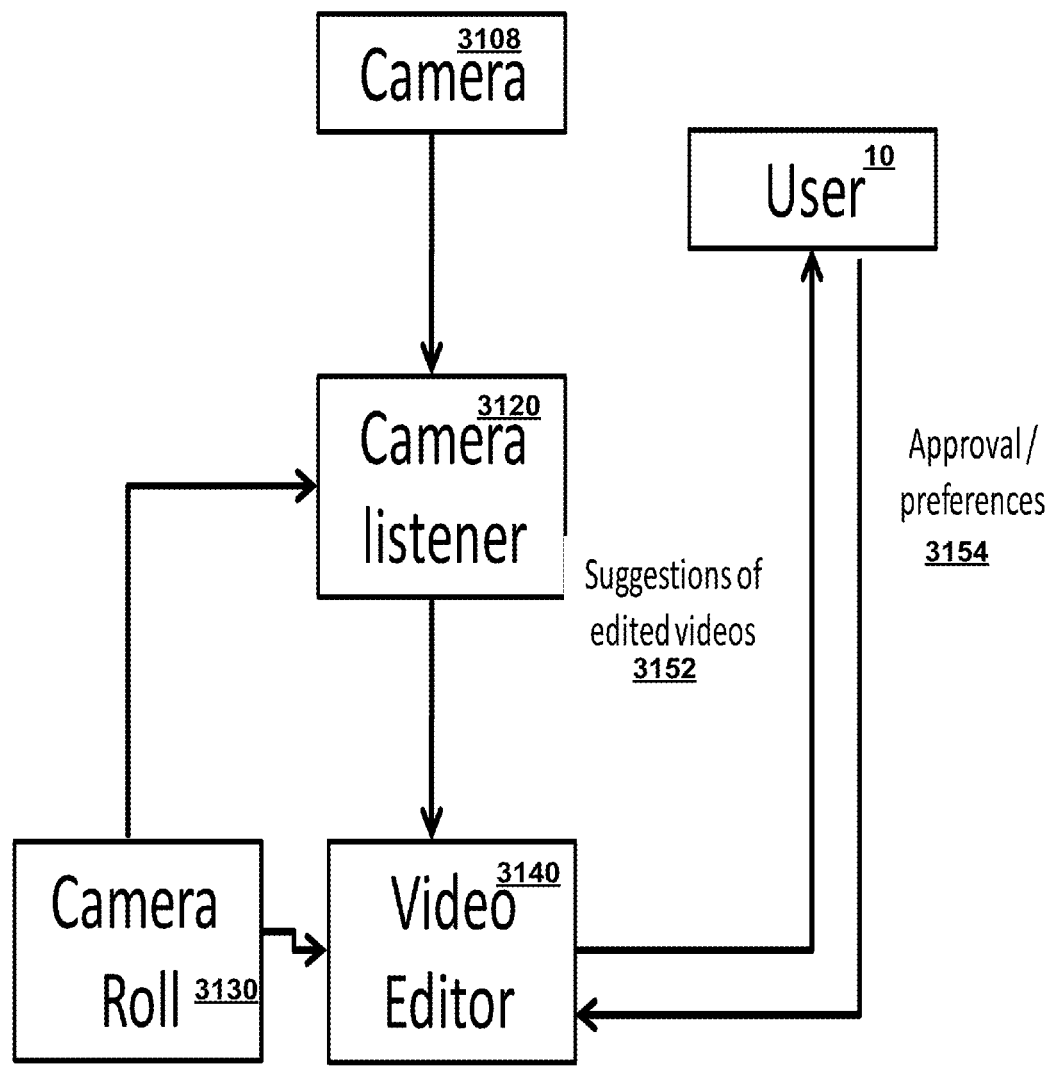

FIGS. 26 and 27 illustrate triggering event according to various embodiment of the invention.

A camera listener 3102 in a mobile device 3100 may be coupled to camera 3108 and may trigger a video editing sessions.

A database of users (or just his friends) is searched for users in the vicinity (according to their GPS) or which might be interested in this event.

Those users are asked if they would like to join the session: either as creators (adding footage of their own) or viewers (can only watch videos and photos).

An event-driven video session is created, which can process raw material from multiple users, and have multiple viewers.

To improve the user experience, an optional mode of the application is an online mode: After uploading some materials, an edited video is produced, and it can be seen by other users. Then, these users may add videos of their own, and create a new edited video (which includes parts of their materials). This mode encourages "social" use of the application.

Time line: When a user creates a set of edited videos using the application (it can be over time), these videos can be used as a "Time line": A short summary of his life, or periods of his life (e.g.—last week, last month, etc'). The user can choose to create a presentation of his life (or parts of them) by combining together multiple earlier results of the application from different time periods. The earlier results can be either video clips, or sessions created by the system, in which case the meta-data of these sessions can be used again to save computations.

Another way to display the time-line of a user is inside a window which shows the best/last video clips that were created using the application. This model can fit nicely into the "time-line" interface of facebook, which allows facebook applications to be integrated into the main "wall" or "time-line" of the user.

According to an embodiment of the invention video editing sessions can be triggered automatically by the system. Such a triggering can be based on two sources of information:

a. "Camera Listener 3120": One type of event is triggered by a "camera listener": a component in the mobile application that "listens" to the camera 3108 (i.e.—gets interrupts whenever there is an activity in the camera, for example when the user captures a new video), or checks for changes in user's storage of pictures and videos on the device) from time to time (e.g.—every hour) and decide on the best events that can be used as an input for a video editing session. The user can approve or decline these event suggestions, or give his preferences for the approved sessions.

This component uses the information of the media assets (videos and images) in the camera roll (3130)—the times and, if available, the GPS information, to decide on "events". For example: detecting a set of media assets that were taken in an isolated time portion, or in a certain location (or some criteria combining both location and time information).

An event can also be triggered by external information (e.g.—the birthday of the user). In this case, the camera-listener 3120 can offer an event that summarize a certain period of time for the user (e.g.—a summary of the last year). This kind of automatic triggering is demonstrated using the diagrams bellow:

According to an embodiment of the invention the camera listener 3120 may initiate a video editing session: In one option (a) the system asks the user 10 if he would like to edit (by video editor) the videos (images) from this event. In the second option, the system automatically runs a video editing for this event, and "approaches" the user already with the resulting edited video. The user 10 can be provided with suggestions of events and/or input material to be edited 3152 and provide approval/disapproval/user preferences 3154.

The camera listener samples the camera roll from time to time (or is triggered by camera activity) and decide on the best events that can be used as an input for a video editing session. The user can approve or decline these event suggestions, or give his preferences for the approved sessions.

Another option for trigger video editing sessions is using material that are stored by a editing system itself (i.e.—based on video sessions that were done in the past): in this case, the system can trigger to do a new session in which the material uploaded to the system are re-organized. For example—creating a summary of all videos of the user, or of all videos from a certain period of time (week, year, etc'). The system may also suggest to do a re-editing of the same materials in a different way (e.g.—using different graphical assets or editing style). In addition, the system can use the meta-data extracted from the media assets to trigger an event—for example—create a video from material in which a certain person was detected. (This triggering is based on face recognition that can be implemented, for example, using the method described in the "non-parametric approach" section below).

This can be implemented using the following scheme:
 a. For each analyzed video/image—detect faces in it, and cluster them to groups (faces of the same person will go to a single group)
 b. Determining the important faces (e.g. —the ones which appear in several videos)
 c. If a important face is detected in a new video/image—finding all the media in which this face appears (optionally—limited to a range of time), and trigger a video session that will use all these media assets.

Collaborative editing: in a "social mode", the automatic triggering might be based on activities of other users. The system detects an event of another user which has some relations with this user (for example—they are both in the same location, or they are recognized as friends—e.g.—friends in facebook) and triggers a video editing session for both users (or it can be multiple users). In this case, the session will have input materials from both users (i.e.—both can upload videos) and the edited video will contain materials from multiple users. In the more simple case, the editing itself can be done in the same way as it is done for a single user—just the input material is changed.

Personal Editing: It was shown how the user can control the video editing by giving his preferences, for example, by increasing or decreasing the importance of a certain face (/person). The same framework can be used to create multiple edited video, each best fitting to a different viewer or user: a simple way to do it is demonstrated in FIG. 33: each one of the face tags extracted from the video is used to create a "personal" edited video—its weight in the editing is significantly increased in the editing (See Equations 1-2), resulting in a video in which he appears many times, feeling as if he is "staring" in the video (other tools can help to increase this feeling, for example using visual effects that highlight this person).

As indicated above—FIG. 32 illustrates the generation of multiple edited videos based on different face tags: in each video, this person is "staring". This is done by increasing the selection weight of the corresponding face.

Sharing

Video sharing is an important part of the system: unlike the original long and boring videos, the edited videos are short and visually appealing—they are now worth sharing. The meta-data computed by the engine can be used to encourage sharing.

The faces extracted automatically by the engine, together with previously tagged faces are shown to the user, (optionally) together with other sharing options (such as facebook, twitter, etc'). The user can share a video or an image with one of the persons corresponding to the faces. If the face is attached with a sharing information (e.g. email) the sharing can done automatically. Otherwise, the user is asked to tag the face and/or give sharing information such as an email.

This information can be saved for future sharing actions.

An example UI is shown in FIG. 32.

Sharing based on face tags can allow the user to share a video or image to different people by simply dragging it on top of one of the face images. More details can be found in the body of the text.

Other Extensions

Music clip editing mode. One mode of work of the system can be a creation of "edited music clip". In this mode, the user uploads a music clip, instead of a sound track. This music clip can be either the user's own clip (for example—a guy doing lapsing or dancing) or it can be an external music clip (for example—MTV music clip). In additional, the user can upload additional material (videos and images). Both the music clip and the additional material are edited together. The difference from the regular mode is:
a. The audio of the music clip is used as a sound track.
b. The synchronization of the video and audio are better kept: the edited video clip alternate between parts of the original music clip itself (in which the audio and video are obviously fully synced), and moments where the audio of the music clip is played, but different visual assets are shown to make the edited music clip more interesting (a common thing in music clips). Periods of both the music clip and the additional materials can be combined simultaneously using a split screen.

An example of such editing is illustrated in FIG. 34. A Typical input video has both a video component and audio component. In the music clip mode the synchronization of the audio and the video is important—for example, if the user is singing or dancing in front of the camera. In order to preserve the synchronization (at least in parts), we keep the original audio component untouched (a→a' box)—but only shortened according to the duration of the edited video. Regarding the video part—we take some parts of the video and keep their original timing (b→b' boxes) in order to keep the video and audio synchronized. Gaps between these parts are taken from other locations in the input video (for these parts, the video and audio are not synchronized)—this type of video manipulation is known in the video editing literature as a B-roll.

Optionally, this mode can be used to create a music clip in the format such as "American Idol": A user uploads a clip in which he sings, dances or play music, and this clip is automatically edited together with material related to this "theme", for example—clips of the crowd, the show, etc'.

Browsing, Searching and Sharing of Personal Video by a Non-Parametric Approach

The term media entity refers to information representative of visual information, information representative of audio information or a combination thereof. Non-limiting examples of a media entity may include an image, a video stream, an access unit, multiple images, a portion of an image, a portion of a video stream, a transport packet, a elementary stream, a packetized elementary stream, an audio stream, an audio frame, and any combination of audio representative information.

Any reference to a method should be interpreted as a reference to a system and additionally or alternatively as a reference to a computer program product. Thus, when describing a method is it noted that the method can be executed by a system or by a computer that executes instructions of the computer program product.

Any reference to a system should be interpreted as a reference to a method executed by the system and additionally or alternatively as a reference to a computer program product. Thus, when describing a system is it noted that the system can execute a method or can execute instructions of the computer program product.

Any reference to a block can include a reference to a hardware block, a software block or a stage of a method. Thus, for example, any of the blocks illustrated in FIG. 4-9 can be regarded as method stages.

The methods, systems and computer program products may provide a unified and generic approach—the media predictability framework—for handling the numerous capabilities required for a comprehensive solution.

Thus, instead of multiple ad hoc modules and partial solutions, the methods, systems and computer program products may provide a single coherent approach to tackle the entire problem.

The methods, systems and computer program products can be applied in diverse technological environments.

Methods, systems and computer program products may provide a comprehensive solution for using personal video as they enables browsing, searching editing and production of personal video.

The methods, systems and computer program products may rely on a unified automated media content analysis method, instead of relying on numerous methods for implementing the long list of features required for 'media understanding'. The proposed method relies on a unified content analysis platform that is based on the Media Predictability Framework (discussed in the next section), which forms the technological foundation of the product.

In this section we discuss the various type of meta-data (and their use) obtained using analysis with the media predictability framework.

The processing of media entities may involve running software components on various hardware components and the processing of data files in several internet locations. We use the following entities in the text below:

User Computer: A computer with general computing capabilities such as Desktop, Laptop, Tablet, Media Center, Smartphone.

Personal Media: Images and Video of any common format (e.g., for images: Jpeg, Tiff, Gif, Jpeg2000 etc. For Video: Avi, wmv, mpeg-4, QuickTime etc.)

Private Data and Meta-Data Database: Binary and Textual data and meta-data kept in tables and files either as a flat database organization or as a relational database (e.g., MySq1).

Interaction Server: An online server (either dedicated or in a computing cloud) which handles at least one of: uploading of user media, streaming, recording usage and viewing analytics, handling user and visitor interaction and registration, handling online payment, storage of online data and meta-data, selecting ads per viewed video and per user/visitor.

Content Analysis Server: A server which performs content analysis for uploaded user media (user video including audio, user images, user selected soundtrack)

Production Server: A server, which utilizes the original footage and the analyzed meta-data to create various personalized and stylized video productions. This server may utilize professional video creative software such as Adobe After Effects, Sony Vegas etc. to render the video production (e.g., video effects and transitions).

Online Data and Meta-Data Database: An online database, which contains Binary and Textual data and meta-data kept in tables and files either as a flat database organization or as a relational database (e.g., MySq1).

User Interface Application: A standalone application or web application (runs inside a web browser) or a software widget or software gadget which enables the user to (at least one of) play, view, browse, search, produce, upload, broadcast and share his personal media.

Mobile Application: An application designed for a mobile device (e.g., Cellular application, iPad application etc.). This application is a specialized user interface application for the respective mobile device.

Local Player—A mini-version of the User Interface Application with reduced capabilities, which runs locally on the user/visitor computing device using a playing platform (e.g., Flash, Silverlight, HTML5).

Electronic Media Capturing Device—An electronic device which can capture personal image and/or video such as: Camcorder, Still Camera, Camera-phone, Internet Camera, Network Camera, Camera embedded in User Computer (e.g., Laptop) etc.

'My Video; My Pictures' any set of file directories or libraries which reside on the user computer (e.g, on a Hard drive, or any electro-magnetic or optical media such as DVD, CD, Blue-Ray disk, Flash-Memory etc.) or on the user online folders (e.g., DropBox) and which stores the user personal media or shared media.

FIG. 1 illustrates a interaction server 10, a user computer 20 and image acquisition devices 31-33 according to an embodiment of the invention.

The user provides acquired media from image acquisition devices such as camcorder 31, camera-phones 32, digital still camera 33 etc. The media can be stored in a private database 21 of the user computer 20 and/or be loaded to the interaction server 10.

If the user stores the media on the user computer 20, the content analysis engine 22 of the user computer 20 analyzes the media using database accesses to a database 23 of the user computer 20. The data base 23 can store private data and private meta-data of the user. Another database 11 (also referred to as on-line database) can store data and meta-data shared by multiple users. The other database 11 and a content analysis server 12 belong to the interaction server 10.

The analysis results of the content analysis engine 22 or of the content analysis server 12 can be stored in either one of the databases 11 and 23—based on, at least, a selection of a user.

The user can directly upload media to the interaction server 10. In this case, the media is stored on the online database 11 and be analyzed by the content analysis server 12. The resulting data and meta-data can be stored on the Online database 11. Another option for the user is to use a combination of the approaches above: Uploading to the Interaction server, downloading and synchronizing to the user computer and processing in the Content Analysis Engine.

Figure 2:
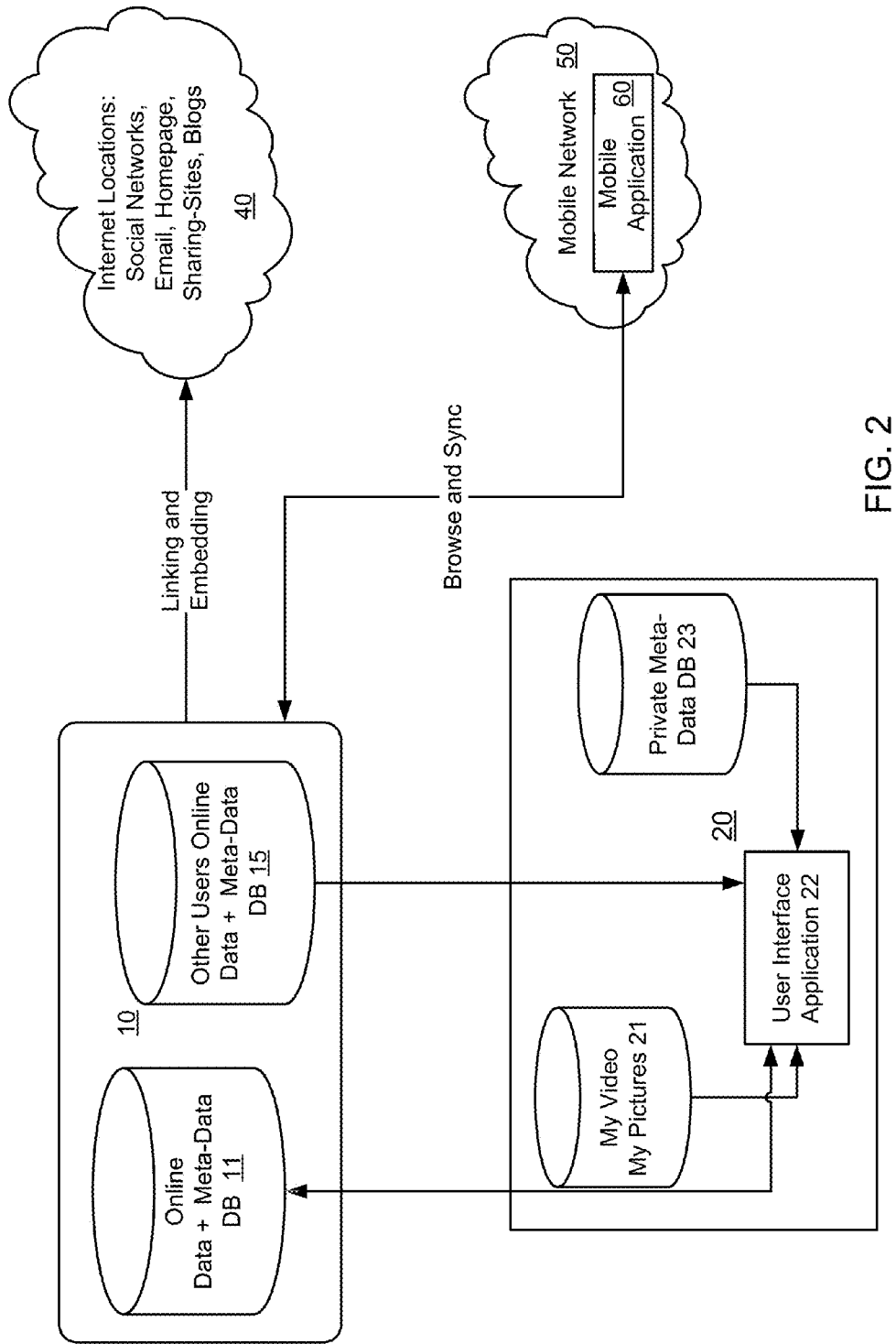
FIG. 2 illustrates a system and its environment according to an embodiment of the invention.

FIG. 2 illustrates an interaction between a interaction server 10, the user computer 20, a mobile network 50 and the Internet 60 according to an embodiment of the invention.

The user can interact using a User Interface (UI) Application which might be a standalone application or a web application in a web browser. Using this UI the user can search, browse, produce and broadcast his personal media (stored on the user computer 30). The UI may get input from the original user media (e.g., on 'My Video/My Pictures or other user media locations) with the extracted data and meta-data from the private and online databases 11, 15, 21 and 23. For instance, even if the user computer 20 has no private database, the user can still search and browse the online databases 11 and 13 using the UI. Using the Mobile Application UI 60 the user can search and browse the data on the interaction server 10 (according to his user privacy settings) from mobile platform (e.g., Cellular phones, iPad). Users as well as Visitors can view, browse and search media on the Interaction server using the 'Local Player' (e.g., Flash Player embedded in HTML pages) which can be embedded in other web content.

Browsing

Browsing enables users to quickly find interesting information, when the users cannot easily describe what they are seeking. For this mode of associative discovery, it should be easy to understand the content of a video and to quickly navigate inside video and between semantically related video clips.

In order to support browsing the invention enables automatically generation of a table of content, of intelligent preview and thumbnails, of links to "similar" video, content based fast-forwarding and spatial video browsing.

Table of content may be a table-of-visual content (optionally hierarchical), which segments a video (or any other set of visual entities) to scenes with similar visual content. Note that these scenes usually cannot be separated by detecting different shots and they might overlap in time (e.g., the cameraman zooms in on a first context then moves on to a second context, then returns to the first context).

Intelligent preview and thumbnails may include a very short (e.g., 5-10 seconds long) summary of the most representative portions of the video. This condensed summary enables the user to get a quick impression of the content in the video. It could comprise frames (storyboard), short clips or a combination of both. Such short representation can be even used as an intelligent thumbnail that plays the video preview when the user selects it (e.g., mouse hovers over thumbnail).

Link to "similar" video—may include a list of related video and images, where relatedness is determined according to direct visual similarity as well as semantic similarity of the visual content: similar persons, similar objects, similar place, similar event, similar scene, similar time. The link can either point to an entire clip or to a time frame in it. Such links enable associative browsing when the user in not seeking a specific content.

Content-based fast forward. Viewing personal video may become a boring task very quickly, as real-life activity tends to repeat itself. Content-based fast-forward enables the user to fast forward to the next novel activity (with different actions, behavior, etc'). This capability is executed either by adapting the speedup to the (automatically determined) degree of interest or by jumping to the next interesting segment in the video.

Spatial Video Browsing. In many video shots, the camera wanders around while scanning the area of interest. Spatial Browsing enables the user to freeze time and simulate spatial browsing with the camera. Namely, in response to a request from the user to move the camera (via keyboard, mouse or touch screen) the viewed image will change to an image with the proper camera point of view.

Searching

The Search engine enables the users to quickly retrieve information according to a given criterion. Searching can be done using a visual or textual query. In order to enable searching the method enables deep, frame-based indexing, automatic tagging and keywords and criterion based search.

Deep, frame-based indexing—The method creates an index of objects, actions, faces, facial expressions, type of sound, places and people. Objects includes among many possible options pets, cars, computers, cellular phones, books, paintings, TV, tables, chairs etc. The indexing includes the extraction of new entities, comparing them to known entities (e.g., a known face) and keeping an index item for them. The index can be associated with a frame, a video segment or with the entire video clip.

Automatic Tagging and Keywords—The method clusters repeating entities (e.g., a repeating face) and generates a tag from it. A tag has a visual representation (e.g., image of a face) and a textual tag (e.g., name of a person). The user can name a visual tag. Each frame has a list of tags and each video has a list of the most important (frequent) tags. The user can add his own tags to the automatically generated tags. When a tag has a semantic meaning (e.g., 'dog' as opposed to 'Rexy') the method relates the semantic meaning of the tag to other synonym keywords enabling easier textual search.

Criterion based Search—The user can search by a query combining free text, visual and textual tags. The method finds the video or the images that are most relevant to the query. For instance, the user can select a picture of a person's face, select the textual tag 'living-room' and add free text 'birthday party' (which is used as a keyword).

Automatic Editing and Production—In order to support sharing and broadcasting of personal video the raw video should be edited and produced automatically (or with minimal user interaction). The method may enable at least one of the following: (a) Automatic Editing of Video and Images; (b) Semi-Automatic Editing of Video and Images; (c) Automatic Video production of selected clips; (d) Automatic Interpretation of user directives; (e) Manual Post Production; (f) Personalized Production; (g) Professional Production; (h) Automatic Movie "Trailer"; (i) Automatic Content Suggestions; (j) Automatic News and Updates; (k) Automatic Group and Event Suggestions; (l) Graphics-Video interaction; (m) Return to original video; (n) Uploading and Broadcasting: and (o) Documentary web-pages.

Automatic Editing of Video and Images—The method automatically selects and edits clips and images from raw video and images input, in order to create a shorter video summary. The automatic editing relies on various factors for choosing the most important parts: Faces, known persons/objects, camera motion/zoom, video and image quality, action saliency, photo-artistic quality, type of voice/sound, facial expression (e.g., smile).

As a part of the editing process, the image quality is improved using de-noising, video stabilization and super-resolution. The automatic editing can change the speed of a video (e.g., slow motion/fast motion) or even convert a video clip to an image if, for instance, the clip is too short. Another case for converting video clip to image, is when the camera pans and the automatic editing decides to create a mosaic image from the clip.

The user can select a sound track to add to the edited video. Prior meta-data and analysis on the audio track might affect the automatic editing decisions (e.g., fast pace, short clips for high tempo audio track). The automatic editing is generating the selected clips (and images) to fit a video length specified by the user (e.g., 45 seconds).

Semi-Automatic Editing of Video and Images—The user can modify the resulting automatic editing by the following operations:

Removing an unwanted clip

Adding a suggested clip (from an automatically prepared candidate list)

Selecting one of more faces to be emphasized or excluded from the edited video. This lists of faces is automatically extracted from the video and can be displayed to the user using a graphical user interface similar to the figure below.

Other types of object or tagged entities can be similarly removed or emphasized (e.g. emphasizing a certain location).

Figure 11:
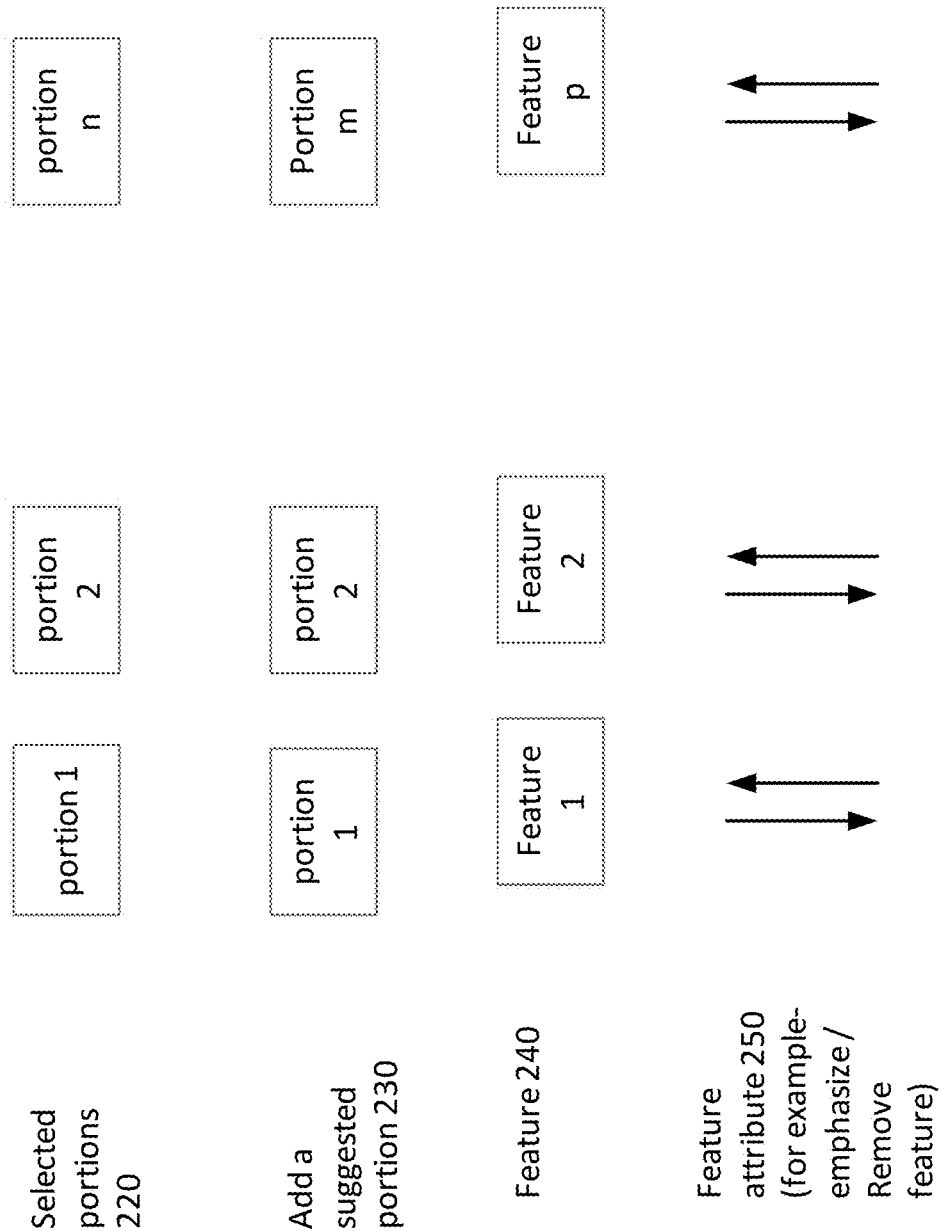
FIG. 11 illustrates an editing process according to an embodiment of the invention.

FIG. 11 illustrates a process of editing a video entity.

Symbols representing media entity portions of interest 220, media entity portions that may be of interest 230 (but may have a lower importance level), features 240 (such as faces of persons) and feature attributes 250 can be displayed to the user. The user can select which media entity portions to include in an edited media entity and can, additionally or alternatively, indicate an attribute such as an importance level of features. An attribute can reflect a preference of a user—for example—whether the feature is important or not, a level of importance of the feature, or any other attribute that may affect an editing that is responsive to the attribute.

According to an embodiment of the invention an editing process can include one or more iterations. The user can be presented with media entity portions of interest, features, and even an edited media entity and receive feedback from the user (whether to alter the edited media entity, which features are more important or less important, adding media entity portions of interest, defining a level of interest that should allow an media entity of interest to be considered as a candidate to be included in an edited media entity, and the like.

These inputs are provided to any of the mentioned above blocks or system that may edit the edited media entity in response. The importance level provided by the user is taken into account during the editing—as images that may include features that were requested by the user will be more likely be included in the edited media entity.

Automatic Video production of selected clips—The selected clips and images can be used in a straightforward manner to create a video clip summary. However, the method can also provide a much more compelling automatically produced video clip. The automatic production makes use of a library of effects, transitions, graphic assets and sound tracks, which are determined according to the video and the extracted meta-data. For instance, an algorithm can choose to use a face-morphing transition effect between two clips, where the first clip ends in a face and the second clip starts in a different face. Another example is to use an effect where the frame is moving in the direction of the camera motion.

Automatic Interpretation of user directives—The user can act as a director during the filming of the video and perform various predefined gestures, in order to guide the later automatic editing and production stage. For instance, a user can indicate that he would like to create a mosaic by passing a finger from one side of the camera to the other and then panning slowly. Another example is that a user signals that he has just captured an important clip that should pop up in any editing by a special gesture (e.g. making 'V' with the fingers). In this manner, the system can identify user gestures and enables the user to act as the director of the automatic summarization in vivo.

Manual Post Production—The user can watch the resulting production and can intervene to override automatic decision. For instance, the user can remove or add clips from a candidate list of clips using a simple checkbox interface. In addition, the user can change the starting point and end point of each selected clip. Moreover, user can change the transitions if he likes, in a post production stage.

Personalized Production—besides manual post editing, the user can affect the automatic production and editing stages using a search query, which emphasizes the parts in the video, which are important to the user. The query can take the form of a full search query (text+tags+keywords). For instance, a query of the form 'Danny jumping in the living room' would put more emphasize in the editing and the production stages on parts which fit the query. Another example is of a query which uses a visual tag describing a pet dog and a location tag with an image of the back yard. Another option for the user to affect the editing stage is by directly marking a sub-clip in the video which must appear in the production. Yet another example is that the user marks several people (resulting from Face Clustering and Recognition) and gets several productions, each production with the selected person highlighted in the resulting clip, suitable for sharing with that respective person.

Professional Production—The method allows an additional, professional human editing and production. The method delivers the raw video, the extracted meta-data and the automatically produced video to professional producers (via internet or via a delivery service using DVDs etc.). After the professional editing, the user receives a final product (e.g., produced DVD) via mail or delivery. Such a professional production can complement the automatic production when professional quality is needed (e.g., for souvenirs, presents). Alternatively, the method can export the automatic editing and the respective meta-data to common video editing formats (e.g., Adobe Premiere, Apple Final Cut).

Automatic Movie "Trailer"—The method described above for editing and production of video can be used to create an automatic movie trailer for every video in the user library. This is a produced version of the video preview, which can be served as the default version for sharing a single video. This "Trailer" can also be used as a short version for various kinds of user generated content (even if not personal), for instance for automatic "Trailers" of popular YouTube videos for users who prefer to view the highlight before viewing the entire video.

Automatic Content Suggestions—The method automatically suggests to the user edited video clips which are suitable for sharing. For instance, after the video from a recent trip was loaded to the user computer, the method automatically produces the relevant data and suggests it to the user, who can decide to share the suggestion by a simple approval of the suggestion.

Automatic News and Updates—The method uses the extracted meta-data to automatically find shared video and images which might interest the user. For instance, the method can suggest to the user to view a video in one of his friend's shared content in which he participates. In this manner, a user can be informed of visual information, which may be of interest to him, even if he did not upload the video by himself.

Automatic Group and Event Suggestions—The method uses the extracted meta-data and discovered similarities between user data and shared data to propose formation of groups of people (e.g., close family, trip friends) and event suggestions (e.g., trip, party, birthday). In this manner, shared media entities, which can be clustered with other media, can be grouped in a semi-automatic manner (with user approval). In addition, the method can suggest producing personalized summaries of events—for instance, generating a different summary for each chosen participant in which this participant is highlighted in the generated synopsis. Such personalized summaries can encourage event and group participants to add their own media from the event, remix the results and so on. This can promote the building a large media pool of an event or a group.

Graphics-Video interaction—The method enables to add a layer of graphic-video interaction, based on the extracted meta-data. For instance, a conversation bubble can track a person's head or face. Another example is of a graphic sprite interacting with the video (e.g., a fly added as a graphic layer to the video and which avoids a person as he moves in the clip). This added layer can be disabled by the user.

Return to original video—The method enables the user to return to the original video clip from any point in the produced video by double-clicking (or tapping in touch screen) the display in that point.

Uploading and Broadcasting—The method enables the user to upload the produced video and related meta-data to a video storage site, which enables to embed the video to be streamed via a video player (e.g., Flash Player) in various internet locations including: email, social networks, blog sites, home pages, content management systems, image and video sharing sites.

Documentary web-pages—The method enables the user to create documentary web pages, which are dedicated for a certain entity such as event, person, group and object. For example, creating a web page of a child, where video clips and images of the child are kept, documenting the child at different stages of his life. Another example is a page documenting a party where all participating users are invited to view current productions, upload their footage of the party, invite further participants and use all uploaded footage to create new productions (and so on). A different example is a web page documenting a user's trips in the world. Yet another important example is a memorial page dedicated to the memory of a deceased person. The system can automatically detect new videos or images that are relevant to the documentary page, and add them to the page via approval of the user. This web page can be organized as an album or as a storyboard, and can be accompanied with annotations and text that was inserted automatically (using the meta-data) or by the user.

Figure 3:
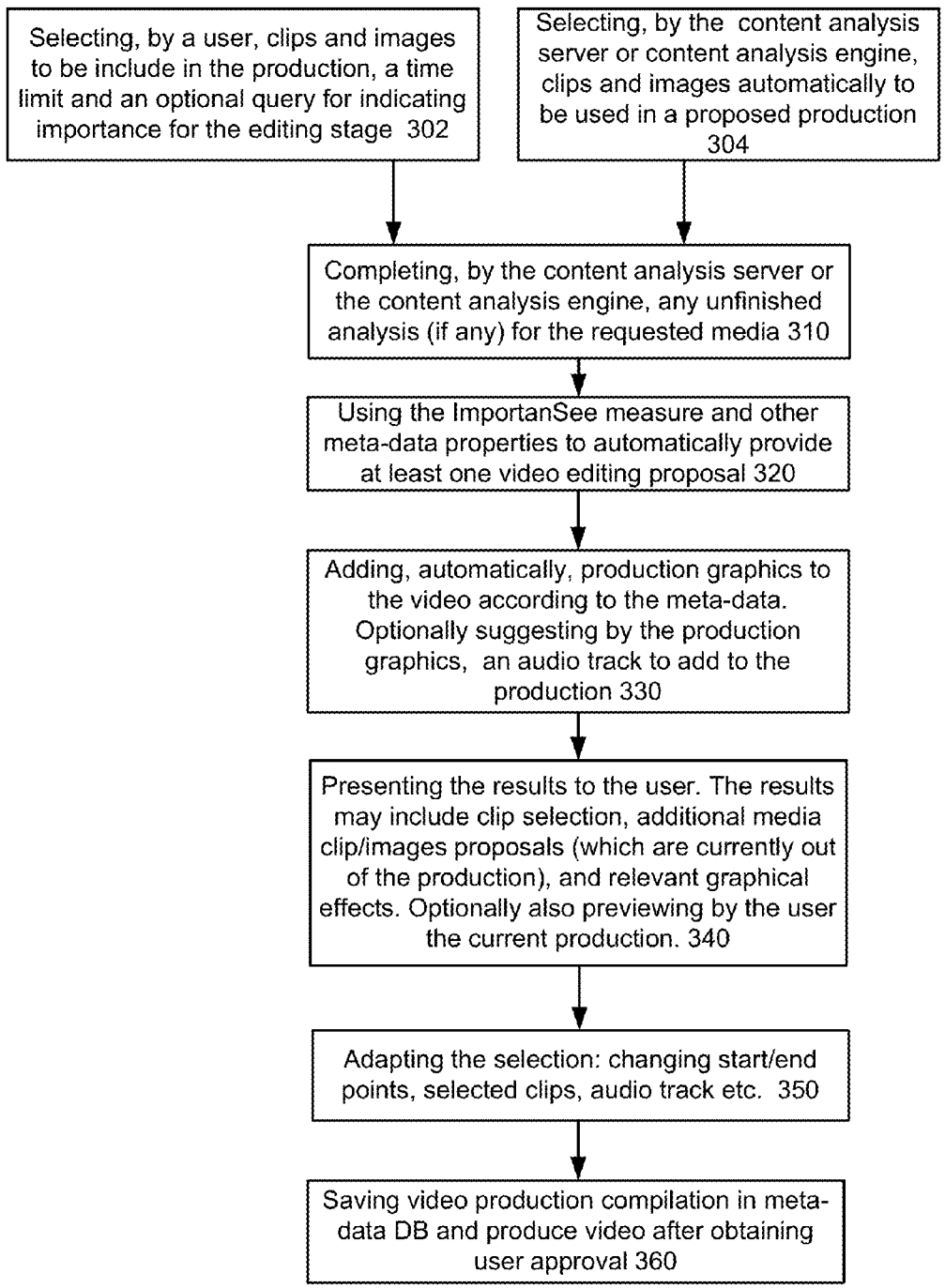
FIG. 3 illustrates a method according to an embodiment of the invention.

FIG. 3 illustrates a method 300 according to an embodiment of the invention.

Method 300 may start by stage 302 or 304. These stages are followed by a sequence of stages 310, 320, 330, 340, 350 and 360.

Stage 302 includes selecting, by a user, clips and images to be included in the production, a time limit and an optional query for indicating importance for the editing stage.

Stage 304 includes selecting, by the content analysis server or content analysis engine, clips and images automatically to be used in a proposed production Stage 310 includes completing, by the content analysis server or the content analysis engine, any unfinished analysis (if any) for the requested media Stage 320 includes using the ImportanSee measure and other meta-data properties to automatically provide at least one video editing proposal Stage 330 includes adding, automatically, production graphics to the video according to the meta-data. Optionally suggesting by the production graphics, an audio track to add to the production Stage 340 includes presenting the results to the user. The results may include clip selection, additional media clip/images proposals (which are currently out of the production), and relevant graphical effects. Optionally also previewing by the user the current production.

Stage 350 includes adapting the selection: changing start/end points, selected clips, audio track etc.

Stage 360 includes saving video production compilation in meta-data DB and produce video after obtaining user approval.

The Media Predictability Framework

The long list of features above is very difficult to implement in an ad hoc manner Instead, the proposed method relies on a unified media content analysis platform, which we denote as the media predictability framework. In this framework, we measure to what extent a query media (visual or audio) entity is predictable from other reference media entities and use it to derive meta-data on this query entity: For instance, if a query media is un-predictable given the reference media, we might say that this media entity is interesting or surprising. We can utilize this measurement, for example, to detect interesting parts in a movie by seeking for video segments that are unpredictable in this manner from the rest of the video. In addition, we can use the media predictability framework to associate between related media entities. For example, we can associate a photo of a face with a specific person if this photo is highly predictable from other photos of that person.

In the sections below we first describe the theoretical foundations of the media predictability framework, then detail the implementation of the media analysis building blocks using this framework. Lastly, we describe how to implement the diverse features above, providing a comprehensive solution for personal video using the media analysis building blocks.

A Non Parametric Approach for Determining Media Predictability

The predictability framework is a non-parametric probabilistic approach for media analysis, which is used by our method as a unified framework for all the basic building blocks that require high-level media analysis: Recognition, Clustering, Classification, Saliensee Detection, etc'. We will first describe in detail the predictability framework and then show how to derive from it the different building blocks.

Generally speaking, the predictability measure is defined as follows: Given a query media entity d and a reference media entity C (e.g. —portions of images, videos or audio) we say that d is predictable from C if the likelihood $P(d|C)$ is high, and un-predictable if it is low. In this section we describe how to actually compute this predictability score in a unified manner, regardless of the application.

Descriptor Extraction

In this subsection we describe how to extract descriptors for a media entity.

A specific case of media descriptors is image descriptors. Each image descriptor describes a patch or region of interest or arbitrarily shaped region in the image (this can also be the entire image). One of the most informative image descriptors is the Daisy descriptor (Fua 2008) which computes a gradient image, and then, for each sample point, produces a log-polar sampling (of size 200) of the gradient image around this point (a detailed description is given in (Fua 2008)). Video descriptors describe space-time regions (e.g. x-y-t cube in a video). Examples of video descriptors include, raw space-time patches or concatenating Daisy descriptors applied on several consecutive frames (e.g. —3 frames, yielding a descriptor of length 200×3=600 around each sample point). However, there are many types of descriptors, known in the literature, that capture different aspects of the media, such as—simple image patches, shape descriptors (See for example (G. Mori, S. Belongie, and J. Malik 2005)), color descriptors, motion descriptors, etc. Information from different types of descriptors can be fused to produce better predictability estimation.

Similar to visual descriptors, audio can also be analyzed using audio descriptors. Some audio descriptors that are popular in the literature are MFCC, PLP, or the short-time spectrum. Audio descriptors can be specialized for speech representation, music representation, or general sound analysis. These descriptors can be computed, for example, using open source tools such as the CMU sphinx (http://cmusphinx.sourceforge.net/). Although each media has its own very different descriptor type, our predictability framework is applicable to all descriptor and media types.

Figure 4:
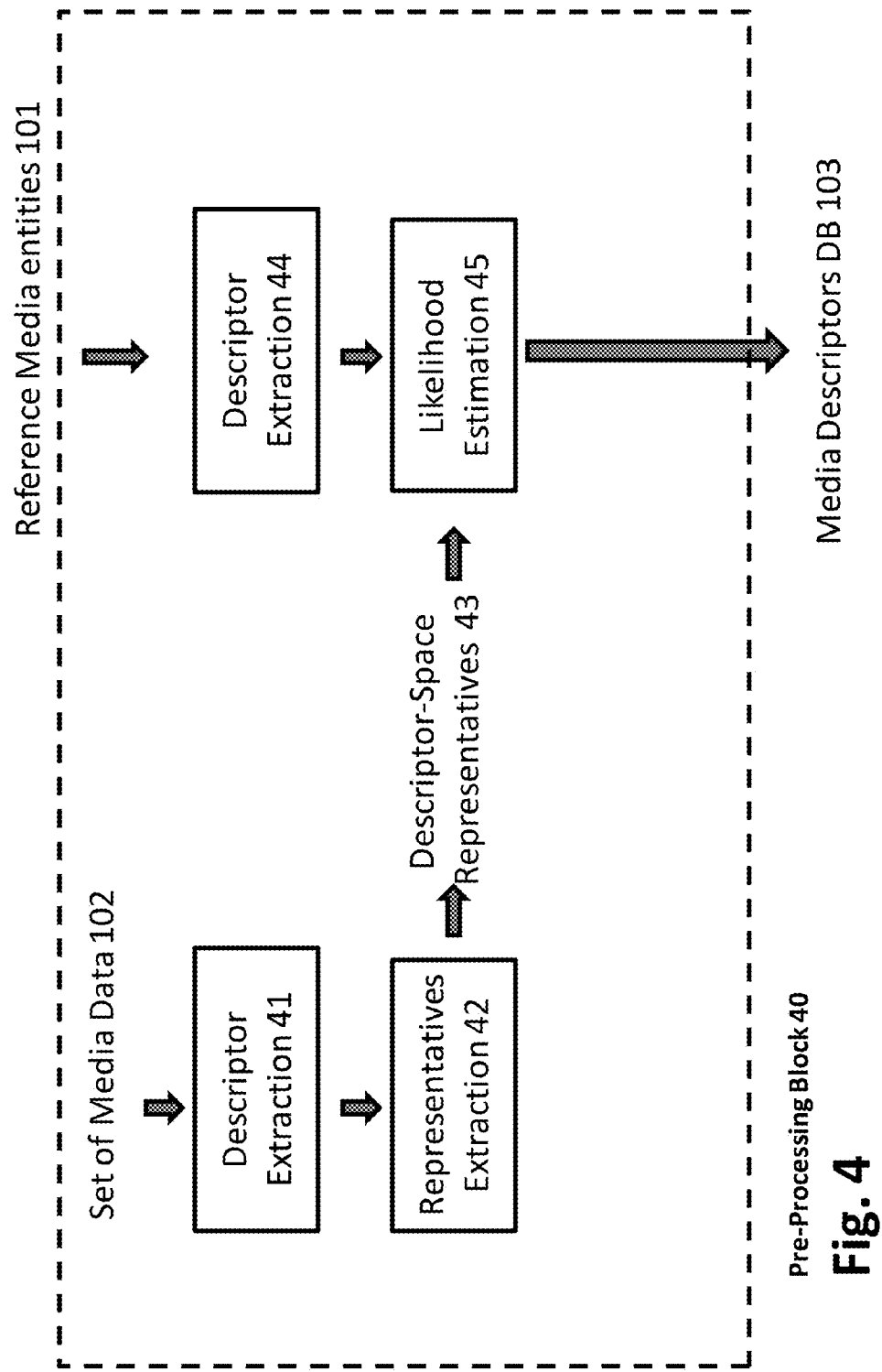
FIG. 4 illustrates a pre-processing block according to an embodiment of the invention.

FIG. 4 illustrates a pre-processing block 40 according to an embodiment of the invention.

The pre-processing block 40 receives reference media entities 101 and a set of media data and outputs reference media descriptors 103 that can be stored in a media descriptors database.

The pre-processing block 40 processes the reference media entities 101 by a descriptor extractor 44 to provide a descriptor set of the reference media entities. The pro-processing block 40 generates (by description extractor 41 and representative extractor 42) a descriptor space representatives of the set of media data 102. The descriptor set of the reference media entities and the descriptor space representative are fed to a likelihood estimator 45 that outputs the reference media descriptors 103.

Descriptor Extraction: Given a reference set of media entities C, we first compute a set of descriptors over a set of sampling points. The sampling points can be a uniform dense sampling of the media (for example, a grid in an image) or only at points of interest (e.g.—corners in image). Let $\{f_1^c, \ldots, f_K^c\}$ denote the set of descriptors computed for the media reference C.

Descriptor-Space Representatives: Given a set of media entities (can be the reference media itself), the descriptors for these entities are extracted. Next, the representative set is extracted from the full descriptor set in the following manner. A random sampling of the descriptor can be used to generate representative, but vector-quantization might also be used (for example—using mean-shift or k-means quantization, etc').

Figure 5:
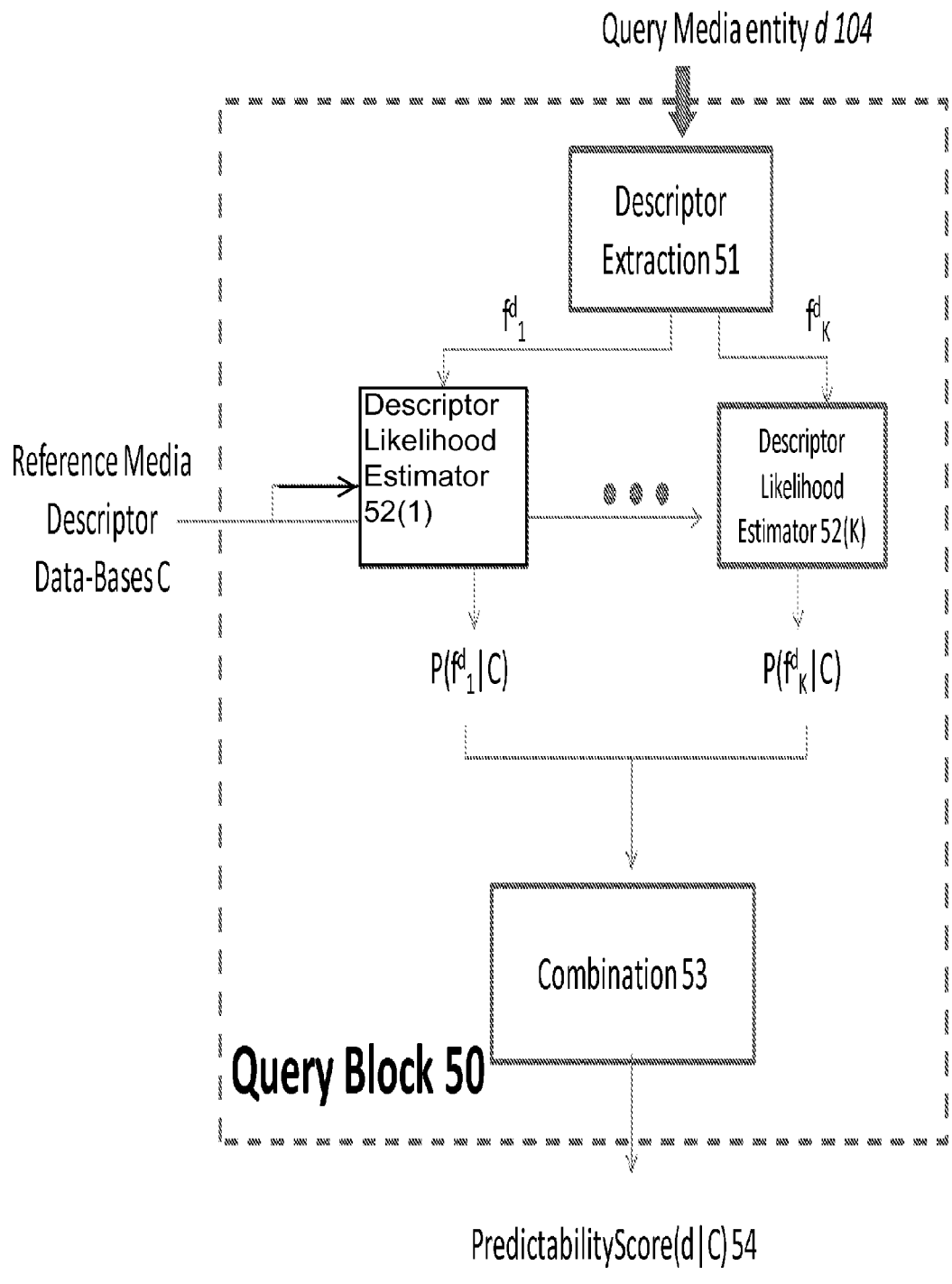
FIG. 5 illustrates a query block according to an embodiment of the invention.

Density Estimation: Given both the descriptor-space representatives $\{q_1, \ldots, q_L\}$, and the descriptor set extracted from the reference C-$\{f_1^c, \ldots, f_K^c\}$, the next step is likelihood estimation. $\{f_1^c, \ldots, f_K^c\}$ is an empirical sampling from the underlying probability distribution of the reference. In this step, we estimate the log likelihood log $P(q_i)$ of each representative $q_i$ in this empirical distribution. Several non-parametric probability density estimation methods exist in the literature. The Parzen estimation of the likelihood is given by:

$$\hat{p}(q_i | f_1^C, \ldots, f_K^C) = \frac{1}{K} \sum_{j=1}^{K} K(q_i, f_j^C)$$

where K(.) is the Parzen kernel function (which is a non-negative operator and integrates to 1;

A common kernel is the Gaussian kernel: $(q_i, f_i^C)$=exp $(s\|q_i-f_j^C\|^2))$ with s representing a fixed kernel width. The set of descriptor-representatives $\{q_1, \ldots, q_L\}$ together with their corresponding likelihoods $\{P(q_1), \ldots, P(q_L)\}$ and the original descriptors $\{f_1^c, \ldots, f_K^c\}$ are used to construct the Media Descriptors Data-base, which is used in the query block FIG. 5 illustrates a query block 50 according to an embodiment of the invention.

The query block 50 receives a query media entity (d) 104, reference media descriptors from reference descriptor database and outputs a predictability score P(d|C) 54. The query block 50 includes a description extractor 51, a set (1 to K) of descriptor likelihood estimators 52(1)-52(k) and a combination unit 53.

Descriptor Extraction 51: Given a query media entity d, we first compute a set of descriptors $\{f_1^d, \ldots, f_N^d\}$ over a set of sampling points (similar to the descriptor extraction step of the pre-processing block).

In addition, each descriptor is attached with a weight $m_i$ of its sample point, which can be user defined. Commonly, we use uniform weights, but other weighting schemes can be used: for example, giving a larger weight to a region of interest (e.g. a ROI in an image which gives a weight of 1 to all descriptors inside the ROI, and zero outside).

Media likelihood Estimation 52(1)-52(K): For each descriptor $f_i^d$, the log-likelihood log $P(f_i^d|C)$ is estimated, where C is the reference media. The log-likelihood of each descriptor can be estimated in the following way:

log $P(f_i^d|C)=w_1$ log $P(q_1)+ \ldots +w_L$ log $P(q_L)$,
$(\Sigma w_k=1)$

Where $P(q_k)$ are pre-computed values extracted from the reference media descriptor database, $w_k$ are interpolation weights which are determined as a function of the distance of $f_i^d$ from $q_k$. The simplest weighting scheme is linear, by setting $w_k \propto \|f_i^d-q_k\|^{-1}$. This estimation can be approximated by taking only the first few nearest neighbors representatives, and setting $w_k$ to zero for the rest of the representatives.

More generally, the log-likelihood log $P(f_i^d|C)$ can be estimated using a non-linear function of the representative log-likelihood values and the distances from them:

log $P(f_i^d|C)=F(\{$log $P(q_1), \ldots,$ log $P(q_L), \|f_i^d-q_1\|, \ldots, \|f_i^d-q_L\|\})$ Combination: All the likelihoods of the different descriptors are combined to a predictability score of the entire query media entity d. The simplest combination is a weighed sum of the log-likelihood estimations:

PredictabilityScore$(d|C)=\Sigma m_i \cdot$log $P(f_i^d|C)$.

Where $m_i$ are the sample point weights mentioned above. If we have multiple types of descriptors (referred below as aspects), $\{f_{11}^d, \ldots, f_{N1}^d\}, \ldots, \{f_{1R}^d, \ldots, f_{NR}^d\}$ (I.e.—R different descriptor types or R aspects), the combined score becomes:

PredictabilityScore$(d|C)=\Sigma_{r=1}^{R} \alpha_r \Sigma_{i=1}^{N} m_i \cdot$log $P(f_{ir}^d|C)$ Where $\alpha_r$ are weights of each aspect (they can be determined manually or automatically from a training set).

More generally, dependencies between the different descriptor types can be taken into account by setting:

$$F_Q = [(\Sigma_{i=1}^N m_i \cdot \log P(f_{i1}{}^d | C))^{0.5}, \ldots, (\Sigma_{i=1}^N m_i \cdot F(f_{iR}{}^d | C))^{0.5}]$$

And:

$$\text{PredictabilityScore}(d|C) = F_Q{}^T * A * F_Q$$

Where A encapsulates the dependencies between the different descriptor types (a diagonal matrix A will yield the previous formula, while taking the covariance matrix estimated empirically will yield the general formula).

Empirical Predictability Improvement.

The predictability score can be further improved using empirical post-processing.

Specifically, given a single media entity d, sometimes the predictability scores for several media references PredictabilityScore(d|$C_1$), . . . , PredictabilityScore(d|$C_S$) are dependent.

As a result, comparing between different reference media sets can be improved by empirically estimating the distribution of the predictability score over a "training" set. This training set aims to represent the set of queries, so it is best (if possible) to draw it randomly from the query set. Note that the distribution that we are trying to estimate now is simply the distribution of the predictability scores of a media entity given a set of references $C_1$, . . . $C_S$ (note that this generated a new "feature" vector of dimension S for representing the query media). A straightforward approach is to use the non-parametric Parzen estimation, which has been described earlier, or recursively using our non-parametric likelihood estimation.

Media Analysis Building Blocks

In this section we describe how to derive each building block using the media predictability framework. The text below refers to the case of using a single aspect but the same approach holds for multiple aspects.

Figure 6:
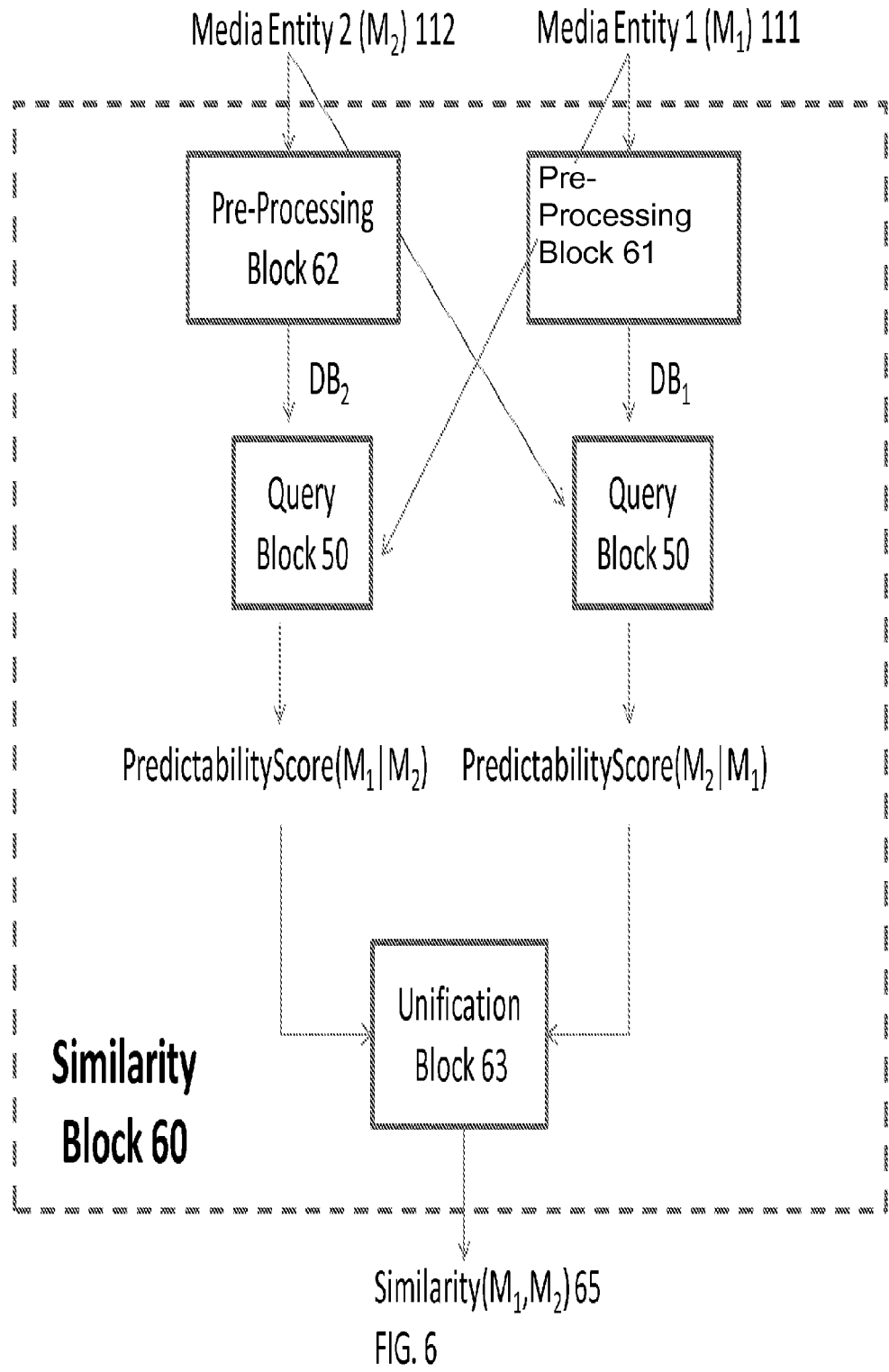
FIG. 6 illustrates a similarity block according to an embodiment of the invention.

FIG. 6 illustrates a similarity block 60 according to an embodiment of the invention.

The similarity block 60 (also referred to as a similarity building block) is used to quantify the similarity between two media entities M1, M2. To do so, we use each media entity twice: once as a reference, and once as a query.

Referring to FIG. 6, the similarity block 60 receives a first media entity 111 and a second media entity 112. The first media entity is provided to a pre-processing block 61 (when used as a reference) that extracts first media entity descriptor space representatives that are fed (in addition to the second media entity) to a query block 50. The query block 50 outputs a predictability score of the second media entity given the first media entity.

The second media entity is provided to a pre-processing block 61 (when used as a reference) that extracts second media entity descriptor space representatives that are fed (in addition to the first media entity) to another query block 50. The other query block 50 outputs a predictability score of the first media entity given the second media entity.

Both predictability scores are fed to a unification unit 53 that outputs similarity(M1, M2) 65.

In more details:

A descriptor database is constructed from each media entity (using the pre-processing block—as was shown in the pre-processing section of the predictability framework).

The predictability PredictabilityScore($M_1|M_2$) of media entity $M_1$ given the media entity $M_2$ as a reference is computed using the query block (as shown in the query section of the predictability framework).

Similarly, the predictability PredictabilityScore($M_2|M_1$) of media entity $M_2$ given the media entity $M_1$ as a reference is computed.

The two predictability scores are combined to produce a single similarity measure. As a combination function, one can use any bimodal operator according to the specific application, such as the 'average' or the 'max' operators.

The "Classification" Building Block

Figure 7:
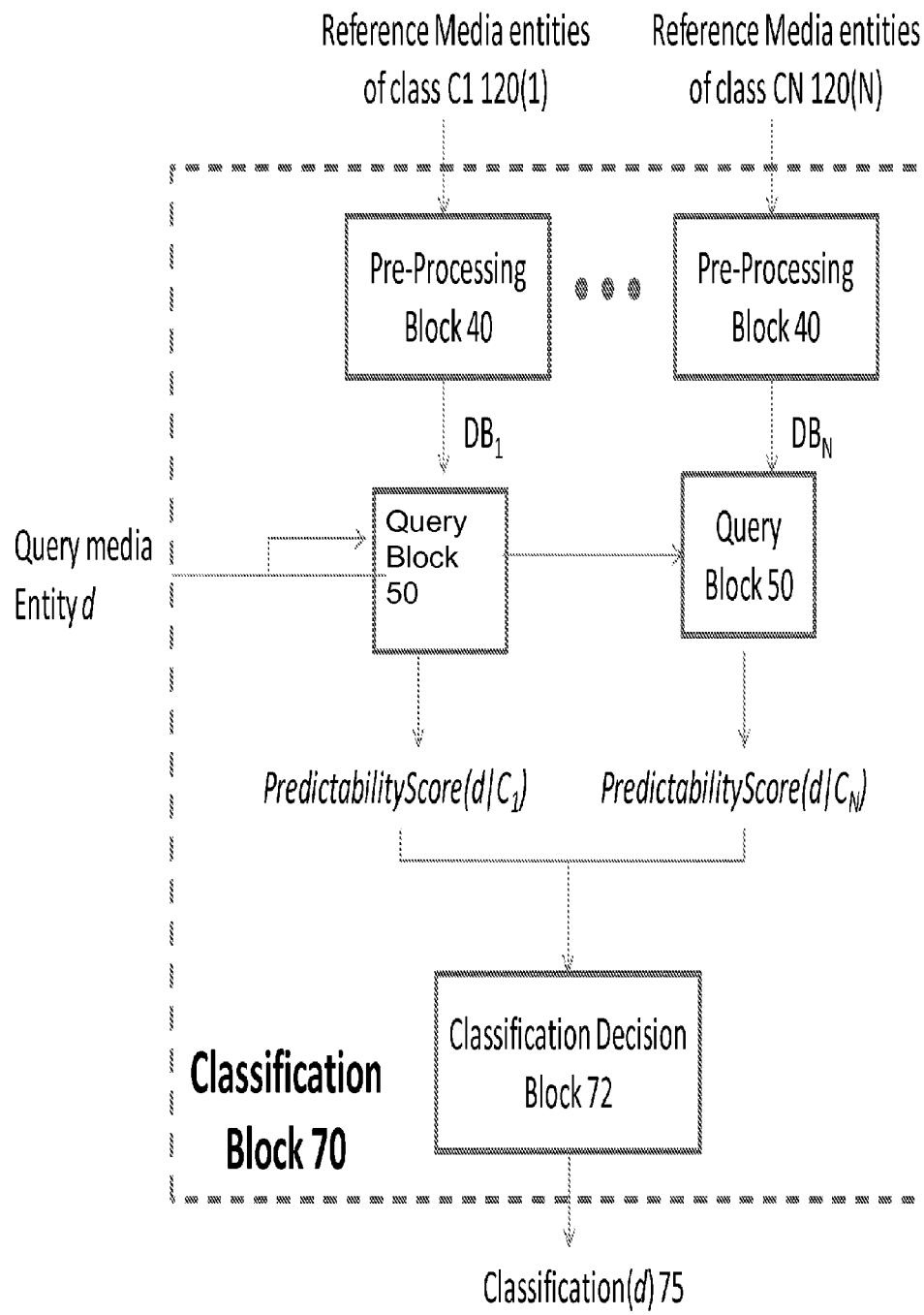
FIG. 7 illustrates a classification block according to an embodiment of the invention.

FIG. 7 illustrates a classification building block 70 according to an embodiment of the invention. The classification building block is also referred to as classification block.

The classification building block is used to classify a media entity into one of several classes. To do so, we collect a set of media entities that relates to each class, construct a media descriptor DB from each reference class, and compare the query media to all of them using the query building block.

The classification block 70 receives reference media entities of each class out of multiple media classes—C1 120(1)-120(N).

A query media entity d 104 and reference media entities of each class are fed to N query blocks 50—each query block receives the query media entity d and one of the reference media entities of a class—separate query blocks receive reference media entities of different classes. Each query block 50 outputs a predictability score of the query media entity given the media entity class. A classification decision block 72 classifies the query media entity to one or these classes base don the predictability scores.

In more details:

For each class $C_i$, an example set of media entities relating to this class is selected.

For each set of entities, a descriptor database $DB_i$ is constructed using the pre-processing block—as was shown in the pre-processing section of the predictability framework.

The predictability PredictabilityScore(d|$C_i$) of the query media entity d given each class is estimated using the query block (as shown in the query section of the predictability framework).

Finally, the predictability scores are entered into the classification decision block, which outputs the classification of d (Note that the classification doesn't necessarily have to be a hard decision on a single class, but it can be the posterior probability of d to belong to each class). The simplest decision rule is setting the classification of d to be the class C for which the predictability score of d given C is the highest. But other decision rules are also possible—for example, computing posterior probabilities (given the prior probabilities of each class). In addition, the distribution of the predictability scores given all (or subset) of the classes can be estimated using a "training" set. (A simple way to do it is using the non-parametric Parzen estimation, as described earlier). With this empirical distribution estimation, the probability of classifying d with each class can now be determined directly from the distribution, providing "Empirically Corrected" probabilities.

The "Detection" Building Block

The classification block can operate as a detection block. Assuming that a certain feature is being searched in a query media stream. One reference media entity class is selected as including the feature as another reference media entity class is selected as not including the feature. The query media entity and these two media entity classes are fed to the classification block that classifies the query media entity as being included in one of these media classes-a s including the feature or not including the feature. It is noted that more than two media classes can be provided and may include different associations with the feature (not just a binary relationship of including or not including the feature).

Figure 10:
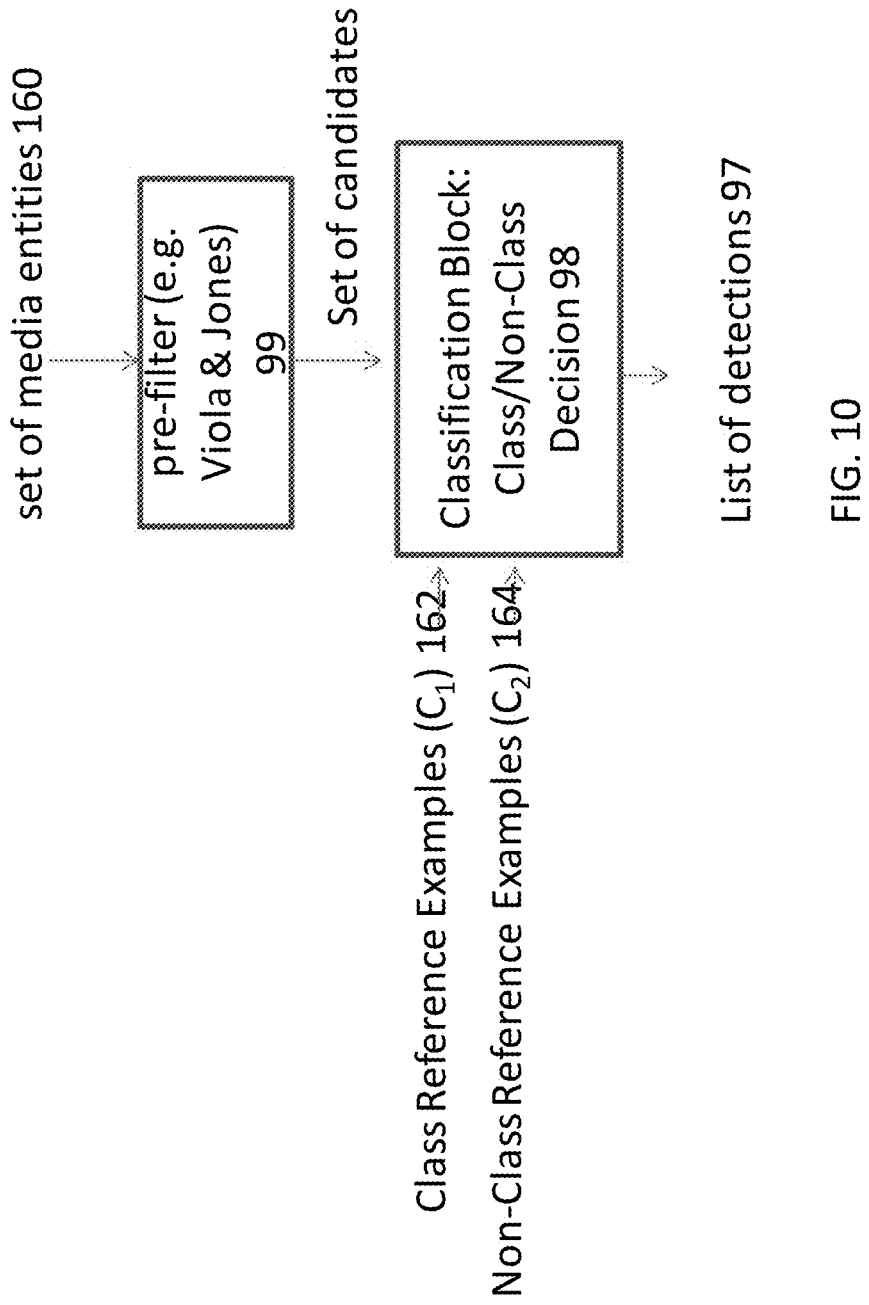
FIG. 10 illustrates a detection block according to an embodiment of the invention.

FIG. 10 illustrates a decision block according to an embodiment of the invention. A set of media entities 160 that is pre-filtered 99 to provide a set of candidates for searching the feature within. The set of candidates and two classes of reference examples 162 and 164 are provided to a classification block 98 that decides whether the feature exists in the candidates. The output is a list of detections 97 that indicates in which candidates the feature appears.

The detection building block is used to detect some pre-defined class (for example—face detection, or a detection of some specific person) inside a set of media entities. The detection building block is actually a special case of the classification building block, in which the two reference classes are the "Class" and the "Non-Class" (for example—"Face"—"Non Face", "Speech"—"Non-Speech"), and the set of queries is all the sub-segments of the media for which we would like to apply the detection—for example, a set of sub-windows in a image.

Since the classification process usually takes too much time to be applied on all sub-segments, a pre-filtering can be applied, choosing only a subset of the segments. For example, the cascade based Viola & Jones method is widely used for object (e.g., face) detection, outputting a set of rectangles for which a face was detected. Yet, it also outputs a large set of erroneous detections, which can be further eliminated by the "Class"—"Non Class" detection block describe herein. See for a schematic description of the detection building block.

The "Clustering" Building Block

The clustering building block is used to cluster a set of media entities into groups. This building block is using the similarity building block described above to compute a similarity measure between pairs of media entities, and then use standard clustering methods to cluster the affinity matrix.

Figure 8:
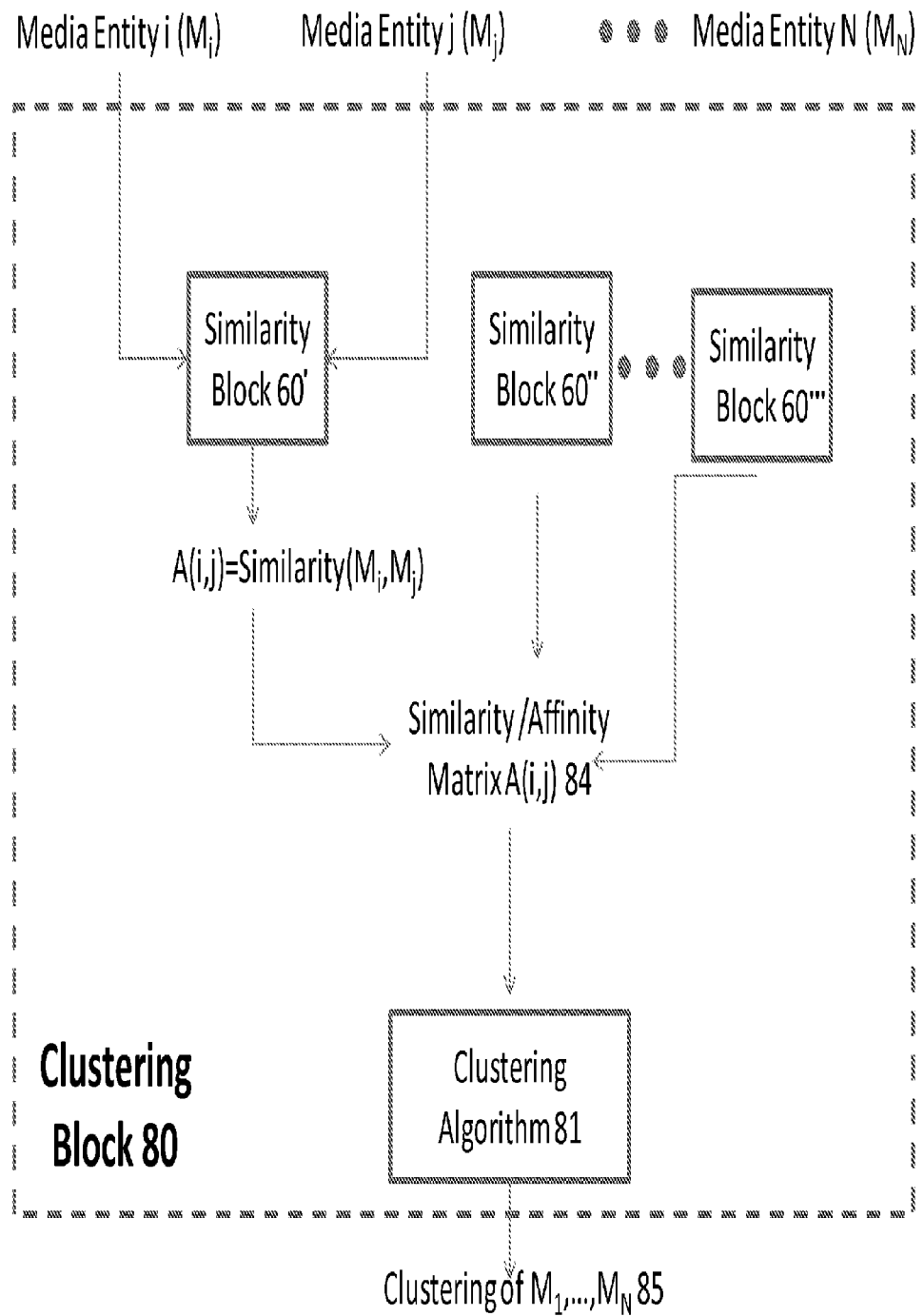
FIG. 8 illustrates a clustering block according to an embodiment of the invention.

FIG. 8 illustrates a clustering block 80 according to an embodiment of the invention.

The clustering block 80 includes multiple similarity blocks 60 that are fed with different media entities. During each iteration the clustering blocks output a similarity score between two media entities. These similarity scores can be arranged to form a similarity/affinity matrix (or any other data structure) that is fed to a clustering algorithm 81 that clusters the media entities based on the similarity scores—clustering M1, . . . , MN 85.

In more details:

For each pair of media entities $M_i$ and $M_j$, the similarity between them is computed using the similarity building block (described above).

A similarity matrix $A_{ij}$ is computed by $A_{ij}$=similarity($M_i$, $M_j$). This similarity matrix forms an Affinity matrix which is a common input for many clustering algorithms.

Finally, doing clustering from a Similarity or an Affinity matrix is well known in the art (For example, Agglomerative hierarchical clustering, spectral clustering (Andrew Y. Ng and Michael I. Jordan and Yair Weiss 2001) or simply merging all pairs for which similarity ($M_i$, $M_j$)>Threshold.

The "Saliensee" building block

Figure 9:
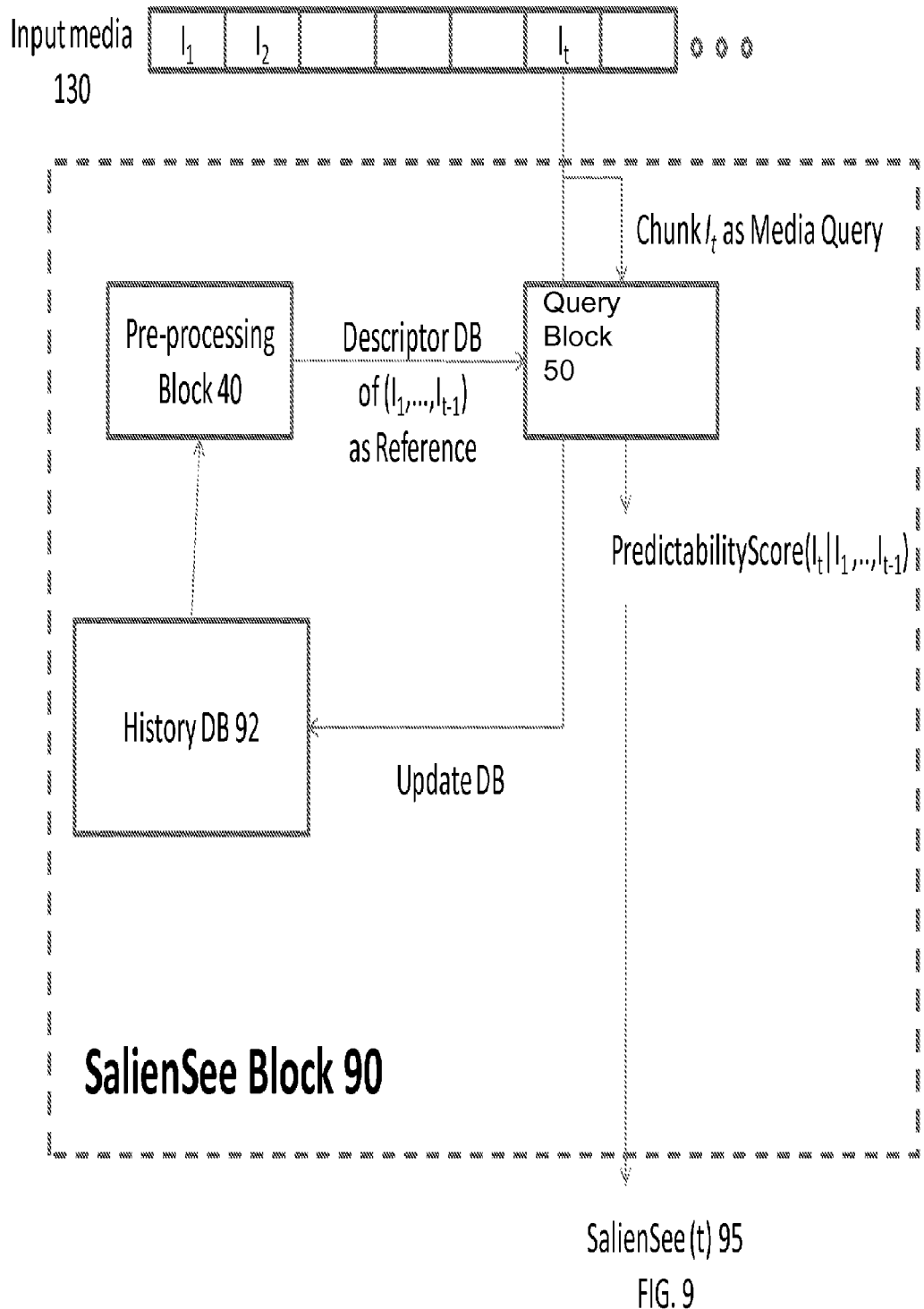
FIG. 9 illustrates a SalienSee block according to an embodiment of the invention.

FIG. 9 illustrates a SalienSee block 90 according to an embodiment of the invention.

The SalienSee block tries to predict a portion of a media entity (It) based on previous media entity portions (I1 . . . It−1) that precede it.

An input media entity 130 that includes multiple media entity portions is fed to the SalienSee block 90 one media entity portion after the other so that the media entity portions can be evaluated in an iterative manner—one after the other.

At point of time t a media entity portion (It) based on previous media entity portions (I1 . . . It−1) that precede it.

Query block 50 receives (as a query media entity) the media entity portion It and receives (as reference descriptor space representative) descriptors space representatives of the previous media entity portions.

The query block 50 calculates a predictability score that may be regarded as a saltiness score 95, The media entity portions are also fed to a database 92. The content of the database are processed by pre-processing block 40.

The proposed method uses a new measure called "SalienSee". It measures the extent by which a point in time in the media is salient in the media. This can also indicate that this point in time is "surprising", "unusual" or "interesting". We say that a media entity has high SalienSee if it cannot be predicted from some reference set of media entities. Let d be some query media entity, and let C denote the reference set of media entities. We define the SalienSee of d with respect to C as the negative log predictability of d given C (i.e. SalienSee(d|C)=−logPredictabilityScore(d|C)). Using this notation, we can say an event is unusual if its SalienSee measure given other events is high.

For instance, the SalienSee measure can capture the moments in video in which the activity becomes boring (which is very common in a personal video)—for example, when someone starts jumping it might be interesting, but the next jumps are getting more and more boring as they are already very predictable from the past. Formally, let I ($t_1$, $t_2$) denote the time segment $t_1$<t<$t_2$ of the video clip d. We say that the video d(t, t+δt) is 'boring' if its SalienSee measure with respect to the past is small, i.e, if SalienSee(d(t,t+δt) |d(t−T,t))<S, where T,δt are some periods of time (e.g. −T is a minute, δt is a second.

Implementing the personal video features above using the building blocks

As shown in the previous sub-section, all the basic building blocks that are used by the proposed method can be directly implemented using the media predictability framework Next, we show how these building blocks (e.g., Recognition, Clustering) can be used to realize the long list of features, presented above, in order to enable comprehensive solution for searching, browsing, editing and production of personal video.

Tagging: Automatic tagging of media entities is achieved by applying the Detection/Recognition building block several times. Some tags are extracted by solving a detection problem. For instance adding a tag "face" whenever the face detector detected a face in a video clip, or a tag "applause" when a sound of clapping hands is detected. Other types of tags are extracted by solving a recognition (or classification) problem. For instance, a specific person-tag is added whenever the face-recognition module classifies a detected face as a specific, previously known face. Another example is classifying a scene to be "living-room scene" out of several possibilities of pre-defined scene location types. The combination of many detection and recognition modules can produce a rich and deep tagging of the media assets, which is valuable for many of the features described below.

The method utilizes at least some of the following tagging: face poses ("frontal", "profile" etc.), specific persons, facial expressions ("smile", "frown" etc.), scene-types ("living-room", "backyard", "seaside" etc.), behavior type ("running", "jumping", "dancing", "clapping-hands" etc.), speech detection, soundtrack segment beat classification (e.g. "fast-beat", "medium-beat", "slow beat"), voice classification ("speech", "shout", "giggle", etc.). Note that the Media Predictability Framework enables a single unified method to handle recognition and detection problems from completely different domains (from behavior recognition to audio classification), simply by supplying examples from the recognized classes (whether video, image or audio examples).

ImportanSee: our "ImportanSee" measure is used to describe the importance or the amount of interest of a video clip for some application—for example, in a video summary we can display only the important parts while omitting the non important ones. In principle, this measure is subjective, and cannot be determined automatically. However, in many cases it can be estimated with no user intervention using attributes such as the attributes listed below:

SalienSee—Very low saliency clips are usually boring and not important. Therefore, we can attribute low importanSee to those clips.

Camera Motion: Camera motion is an important source of information on the intent of the cameraman. A panning of the camera usually indicates that the photographer is either scanning the scene (to get a panorama of the view), or just changing the focus of attention. Video segments that relates to the second option (a wandering camera) can be assigned with a low ImportanSee. A case where the camera is very shaking and not stabilized can also reduce the overall ImportanSee. The camera motion can be estimated using various common methods (e.g. (J. R. Bergen, P. Anandan, K. J. Hanna, and R. Hingorani 1992)).

Camera Zoom: A Camera zoom-in is usually a good indication for high importance (i.e., resulting in high ImportanSee). In many cases, the photographer zooms in on some object of interest to get a close-up view of the subject (or event).

Face close-up: Images or video clips in which faces appear in the scene are usually important. Specifically, a close-up on a face (in a frontal view) will usually indicate a clear intention of the photographer to capture the person (or persons) being photographed, and can serve as a strong cue for high importanSee.

Speech: Speech detection and recognition can help detecting interesting periods in the video. Moreover, laughter (general, or of a child) increases the ImportanSee measure of the corresponding video segment. An excited voice may also be used as a cue for importanSee.

Facial expressions: Facial expressions are a good cue for high ImportanSee. For instance, moments when a person smiles or a child frowns or cries indicates a high ImportanSee.

Given a visual entity d (for example, a video segment), the attributes above can be used to compute intermediate importance scores $s_1, \ldots s_l$ (in our implementation, these scores can be negative. Such scores can be obtained by using direct measurements (e.g, SalienSee measure of a clip), or by some binary predicate using the extracted meta-data (e.g., s=1 if clip includes a 'large face closeup' tag and s=0 otherwise). The final ImportanSee measure is given as a weighted sum of all attribute scores. I.e., ImportanSee(d)=max ($\Sigma_i \alpha_i s_i$, 0), where $\alpha_i$ is the relative weights of each attribute.

Table of content: Table of (visual) content is a hierarchical segmentation of visual entities (video or set of videos and images). This feature can be implemented as a clustering of the various scenes in a video. For instance, by sampling short video chunks (e.g., 1 second of video every 5 seconds of video) and clustering these media chunks (using the clustering building block) will produce a flat or hierarchical table of contents of the video. In addition to this segmentation, each segment is attached with either a textual or visual short description (for example, a representative frame or a short clip). This representative can be selected randomly, or according to its ImportanSee measure.

Intelligent preview and thumbnails: This is a very short (e.g., 5-10 seconds long) summary of the most representative and important portions of the video. This feature can be implemented by simply selecting the time segments of the video with the maximal ImportanSee.

Video links and Associative browsing: This feature facilitates video and image links, which are based on audio-visual and semantic similarity. This feature can be implemented as a combination of using the Tagging feature and the similarity building block: The similarity building block is used to quantify the direct audio-visual similarity between images and video. The Tagging feature is used to quantify the semantic association between media entities—for instance, two videos of birthday parties, two videos of dogs etc. To quantify the semantic similarity, various simple distances can be used between the tag lists of each media entity, such as the number of mutual tags or a weighted sum of the mutual tags, which emphasizes some tags over others. To quantify the overall similarity a (weighted) sum of the semantic and audio-visual similarity can be used to combine the different similarity measures. Links between media entities can be formed for pairs of entities with high enough overall similarity.

Content-based fast forward: In Content-based fast-forward, interesting parts are displayed in a normal speed (or with a small speed-up), while less interesting parts are skipped (or displayed very fast). This can be done automatically using the ImportanSee measure: The speed-up of each video segment d is determined as a function of its ImportanSee, I.e. speedup(d)=F(ImportanSee(d)). Two simple examples for F are F(x)=1/x and the threshold function $$F(x) = \begin{cases} 1 & F(x) > S \\ \infty & F(x) \leq S \end{cases}$$

(which is equivalent to selecting the important video segments).

Automatic Video Editing & Synopsis: The main challenge in automatic video editing is to automatically select the most important sub-clips in the video, which best represent the content of the original video. This selection is an essential stage for most of the features that relates to automatic video editing: creating a video synopsis (or Movie "Trailer"), video production, intelligent thumbnails, etc'. This task is best served by the ImportanSee building block (describe above)—to determine the importance of each sub-clip in the video, and promoting the selection of the most important ones to be used in the edited video. Using the fact that we can compute the ImportanSee measure on any video sub-clip we define a video editing score for a video editing selection of clips $c_1, \ldots, c_n$ from a video v: score($c_1, \ldots, c_n$)=$\Sigma_i$ ImportanSee($c_i$).

Thus we can pose the problem of automatic video editing as an optimization of the editing score above given some constraints (e.g., such that the total length of all selected sub-clips is not longer than one-minute). This is a highly non-continuous function and is best-optimized using stochastic optimization techniques (e.g., Simulated Annealing, Genetic Algorithms) where the score function is used to evaluate the quality of a selection and random selection and mutation (e.g., slightly changing clip starting and ending points) enables discovery of the problem-space during the optimization process.

System

Figure 12:
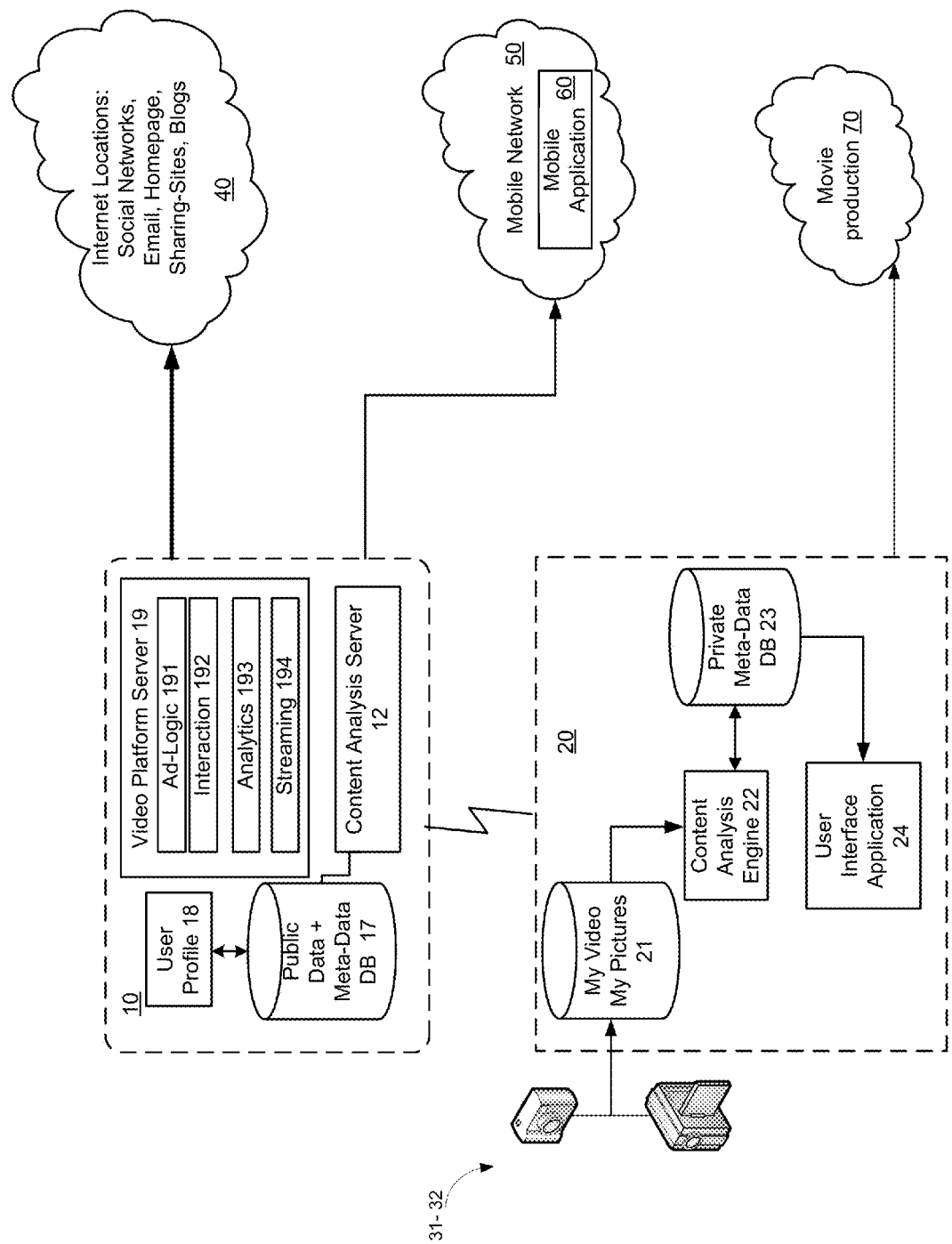
FIG. 12 illustrates a system and its environment according to an embodiment of the invention.

FIG. 12. שגיאה! מקור ההפניה לא נמצא illustrates a system and its environment according to an embodiment of the invention. The system implements any of the methods described above to provide a comprehensive solution for browsing, searching and sharing of personal video.

The system has various components which reside on several sites. The related sites and the components on them are described next.

User Computer 20—The user computer(Desktop, Laptop, Tablet, Media-Center, Pocket PC, Smartphone etc.) may include two databases 21 and 23, content analysis engine 22 and user interface application 24.

The user computer can store a large amount of visual data in general locations such as 'My Video' and 'My Pictures' directories in Microsoft Windows Operation Systems. Most of the data in these locations is raw data and yet personal.

The content analysis engine 22 may process runs in the background (optionally only during the computer idle time) or upon user request. It analyzes the user's visual data (videos and pictures), and extracts meta-data using a work queue.

The work queue is filled by the content analysis engine 22 as well as by the user selection (a user can insert any video or image to the top of the queue).

While the original video and images of the user may remain intact, the content analysis engine 22 may use the private Meta-Data DB 23 to store the extracted meta-data and reuses this meta-data for its own analysis (e.g., extracted visual tags are stored there for future automatic tagging).

In a difference embodiment the content analysis engine 22 is not a software installed on the user computer 20, but rather an internet browser plug-in or a software component (e.g., ActiveX) which enables the user to apply the content analysis engine 22 to run without full software installation (but a plug-in installation). In another embodiment of this system, there is not content analysis engine on the 'User Computer'. Instead, the user can make use of content analysis server software (12) as a service which resides on the interaction server 10.

The user interface application 24 lets the user apply a sub-set of the method capabilities discussed above, thus enabling browsing, searching and sharing of personal video. The sub-set depends on the type of client, license and computer. In one embodiment, this is a standalone client installed on the user computer. In another embodiment, this is a web application which uses an internet browser for running the user interface, which enables running it from any internet browser, without installing software.

Interaction Server

The interaction server 10 hosts several servers which enable users to share personal video and images and broadcast them on various internet locations by embedding them. The 'User Profile' 18 contains various information about the user such as its personal details, a list of accounts in various internet services, a list of friend and family members and usage statistics. The 'Public Data+Meta-Data DB' 17 contains data that the user selected to share from the 'User Computer': relevant meta-data and also video clips, images, etc. Sharing can be limited to various groups—family, friends, everyone etc. The database is also responsible for initiating synchronization with connected 'User Computers' and mobile appliances. The 'Content Analysis Server' 12 is a powerful version of the content analysis engine on the user computer 20 which enables to process a large amount of visual data being uploaded to the site. This enables the user to process video even from a computer that does not have the content analysis engine installed (i.e., SaaS—Software as a Service).

The 'Video Platform Server' 19 performs the actual streaming and interaction with users and visitors that view video and images stored on the 'Interaction server'. It contains the actual 'Streaming' module 194 which is responsible for the actual delivery of the video on time and with the right quality. The 'Interaction' module 192 is responsible for interpreting the user requests (e.g., press on a table of contents element) and communicate it with the 'Streaming' server or the 'Local Player'. The 'Analytics' module 193 is responsible for recording user behavior and response for each video and advertise that was displayed on it (e.g., number of times a video was watched, number of skips, number of times an ad was watched till its end). The 'Ad-Logic' 191 uses information from the 'Analytics' module to choose the best strategy to select an ad for a specific video and user and how to display it. This information is synchronized in real-time with the 'Local Player'. The 'Ad-Logic' module can instruct the 'Local Player' to display an ad in various forms, including: pre-roll, post-roll, banners, floating ads, textual ads, bubble ads, ads embedded as visual objects using the extracted video meta-data (e.g., adding a Coca-Cola bottle on a table).

Internet Locations

Users and visitors can view video and images which users decided to share on various 'Internet Locations' 40 that may include social networks, email services, blogs, MySpace, Gmail, Drupel, Facebook and the like. The actual viewing of video is performed by an embedded player which can be based on various platforms such as Adobe Flash, Microsoft Silverlight, HTML5 etc. The player can be embedded either directly or using a local application (e.g., Facebook application) in various internet locations including: Social Networks (e.g., Facebook, Myspace), Email messages, Homepages, Sharing-Sites (e.g, Flickr, Picasa), Blogging sites and platforms (e.g., Wordpress, Blogger) and Content Management Systems (e.g., Drupal, Wikimedia). Alternatively to embedding a 'Local Player' the user can user an internet link to a dedicated video page on the 'Interaction server'.

Mobile Networks

Users can view and synchronize video via mobile appliances (e.g., cell phones) using the cellular networks 50 or internet networks 40. In cases that the mobile appliance is computationally strong enough (e.g., Pocket-PC, Smartphone) it can be regarded as a 'User Computer'. In other cases it can use a 'Mobile Application' which enables to view media from the 'Interaction server' as well as uploading raw media from the mobile appliance. In this manner the 'Mobile Application' can use the 'Content Analysis Server' in the 'Interaction server' to produce and share video even for appliances with low computational powers. Moreover, the 'Interaction server' can automatically synchronize uploaded content with other connected 'User Computers'.

Movie Production

Users can select to send automatically produced media for further, professional production by human experts. The system proceeds by sending the relevant raw video, the extracted meta-data and the automatically produced video to a professional producer 70 (via internet or via a delivery service using DVDs etc.). After the professional editing is finished, the user receives a final product (e.g., produced DVD) via mail or delivery.

Other Electronic Appliances

In other embodiments, the system is implemented on 'Other Electronic Appliances' with do not utilize general CPUs or without enough computational power. In these cases, parts of the software modules described in user computer are implemented in embedded form (ASIC, FPGA, DSP etc.).

Figure 13:
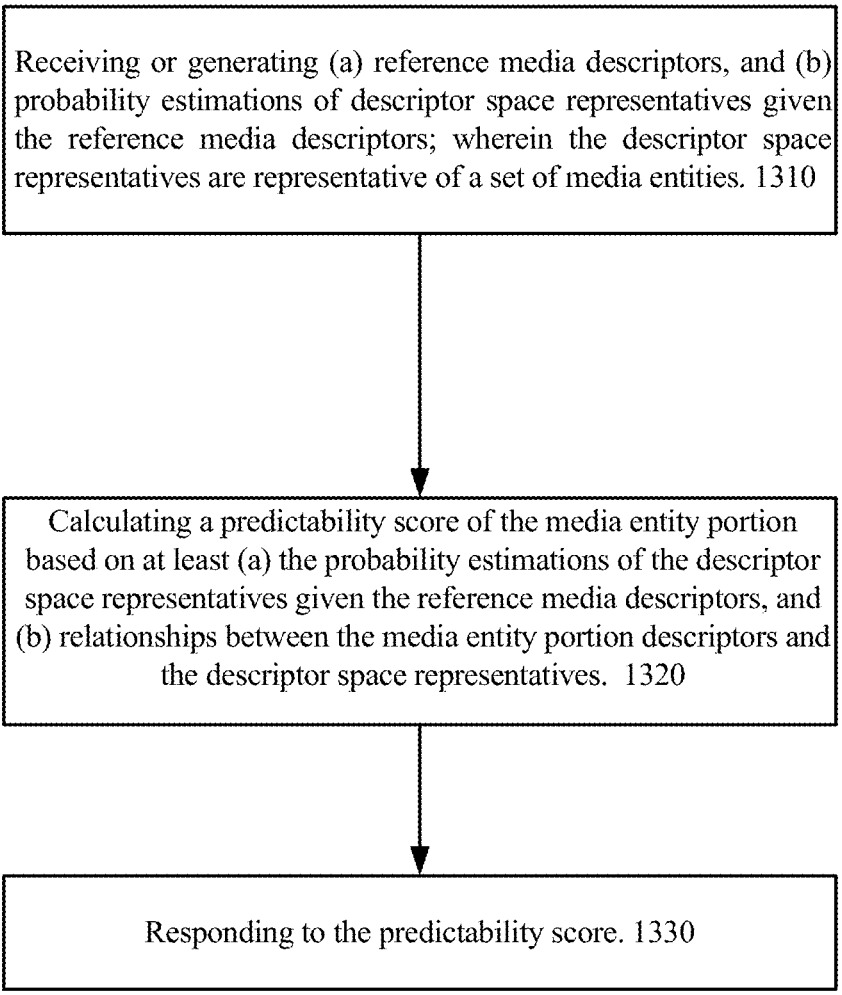
FIGS. 13-19, 20A-20C, 25, 28, 33 and 35 illustrate various methods according to various embodiments of the invention.

FIG. 13 illustrates method 1300 according to an embodiment of the invention. Method 1300 is for determining a predictability of a media entity portion.

Method 1300 starts by stage 1310 of receiving or generating (a) reference media descriptors, and (b) probability estimations of descriptor space representatives given the reference media descriptors; wherein the descriptor space representatives are representative of a set of media entities.

Stage 1310 is followed by stage 1320 of calculating a predictability score of the media entity portion based on at least (a) the probability estimations of the descriptor space representatives given the reference media descriptors, and (b) relationships between the media entity portion descriptors and the descriptor space representatives.

Stage 1320 may be followed by stage 1330 of responding to the predictability score.

Stages 1310-1330 can be repeated multiple times on multiple media entity portions.

Stage 1320 may include at least one of the following: (a) calculating distances between descriptors of the media entity and the descriptor space representatives; (b) calculating a weighted sum of probability estimations of the descriptor space representatives, wherein weights applied for the weighted sum are determined according to distances between descriptors of the media entity portion and descriptor space representatives; (c) generating the probability estimations given the reference media descriptors; wherein the generating comprises calculating, for each descriptor space representative, a Parzen estimation of a probability of the descriptor space representative given the reference media descriptors.

According to an embodiment of the invention method 1300 may be applied on different portions of a media entity in order to locate media portions of interest. Thus, stage 1320 may include calculating the predictability of the media entity portion based on reference media descriptors that represent media entity portions that precede the media entity portion and belong to a same media entity as the media entity portion. Repeating stage 1310 and 1320 on multiple portions of the media entity can result in calculating the predictability of multiple media entity portions of the media entity and detecting media entity portions of interest. Stage 1330 may include generating a representation of the media entity from the media entity portions of interest.

According to an embodiment of the importance of a media entity portion can be determined based on additional factors. Thus, stage 1320 can be augmented to include defining a media entity portion as a media entity portion of interest based on the predictability of the media entity portion and on at least one out of a detection of a camera motion, a detection of a camera zoom or a detection of a face close-up.

Figure 14:
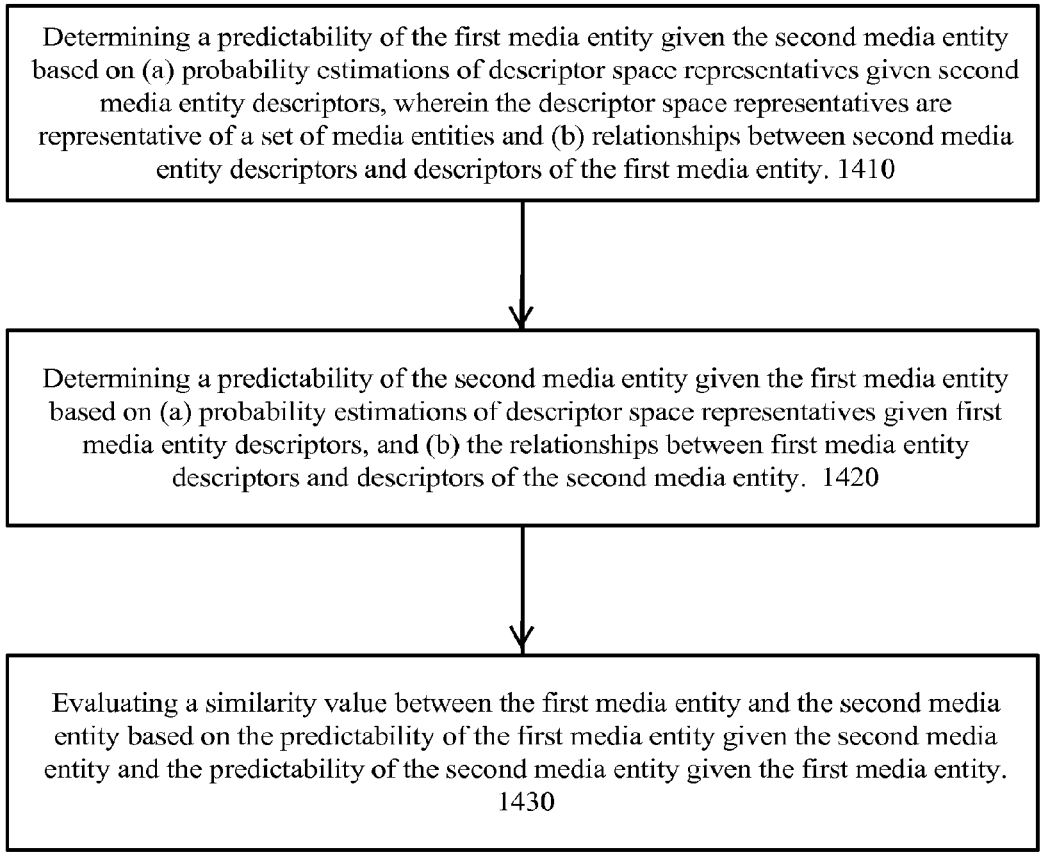

FIG. 14 illustrates method 1400 according to an embodiment of the invention. Method 1400 is for evaluating a relationship between a first media entity and a second media entity.

Method 1400 starts by stage 1410 of determining a predictability of the first media entity given the second media entity based on (a) probability estimations of descriptor space representatives given second media entity descriptors, wherein the descriptor space representatives are representative of a set of media entities and (b) relationships between second media entity descriptors and descriptors of the first media entity.

Stage 1410 is followed by stage 1420 of determining a predictability of the second media entity given the first media entity based on (a) probability estimations of descriptor space representatives given first media entity descriptors, and (b) the relationships between first media entity descriptors and descriptors of the second media entity.

Stage 1420 is followed by stage 1430 of evaluating a similarity value between the first media entity and the second media entity based on the predictability of the first media entity given the second media entity and the predictability of the second media entity given the first media entity.

Stage 1400 may be repeated multiple times, on multiple media entity portions. For example, it may include evaluating the relationships between multiple first media entities and multiple second media entities based on a predictability of each first media entity given the multiple second media entities and a predictability of each second media entity given the first media entity.

Method 1400 can be used for clustering—by evaluating the similarity value of a media entity to a cluster of media entities. Thus, method 1400 can include clustering first and second media entities based on the relationships between the multiple first media entities and the multiple second media entities.

Figure 15:
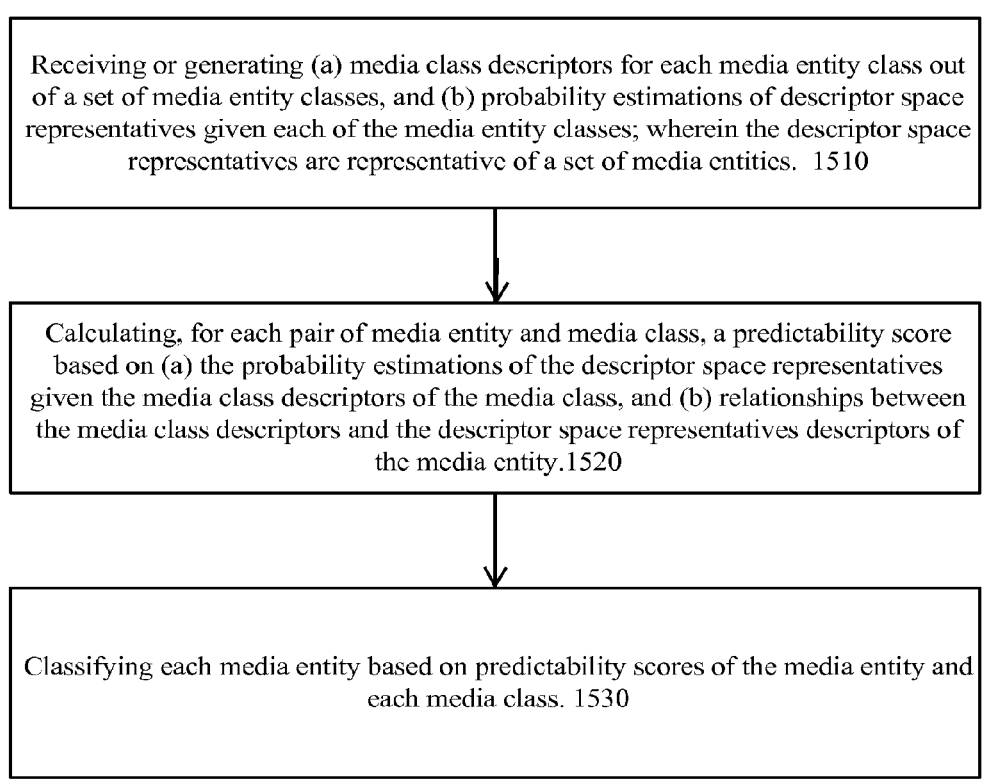

FIG. 15 illustrates method 1500 according to an embodiment of the invention. Method 1500 is for classifying media entities.

Method 1500 starts by stage 1510 of receiving or generating (a) media class descriptors for each media entity class out of a set of media entity classes, and (b) probability estimations of descriptor space representatives given each of the media entity classes; wherein the descriptor space representatives are representative of a set of media entities.

Stage 1510 is followed by stage 1520 of calculating, for each pair of media entity and media class, a predictability score based on (a) the probability estimations of the descriptor space representatives given the media class descriptors of the media class, and (b) relationships between the media class descriptors and the descriptor space representatives descriptors of the media entity.

Stage 1520 is followed by stage 1530 of classifying each media entity based on predictability scores of the media entity and each media class.

Figure 16:
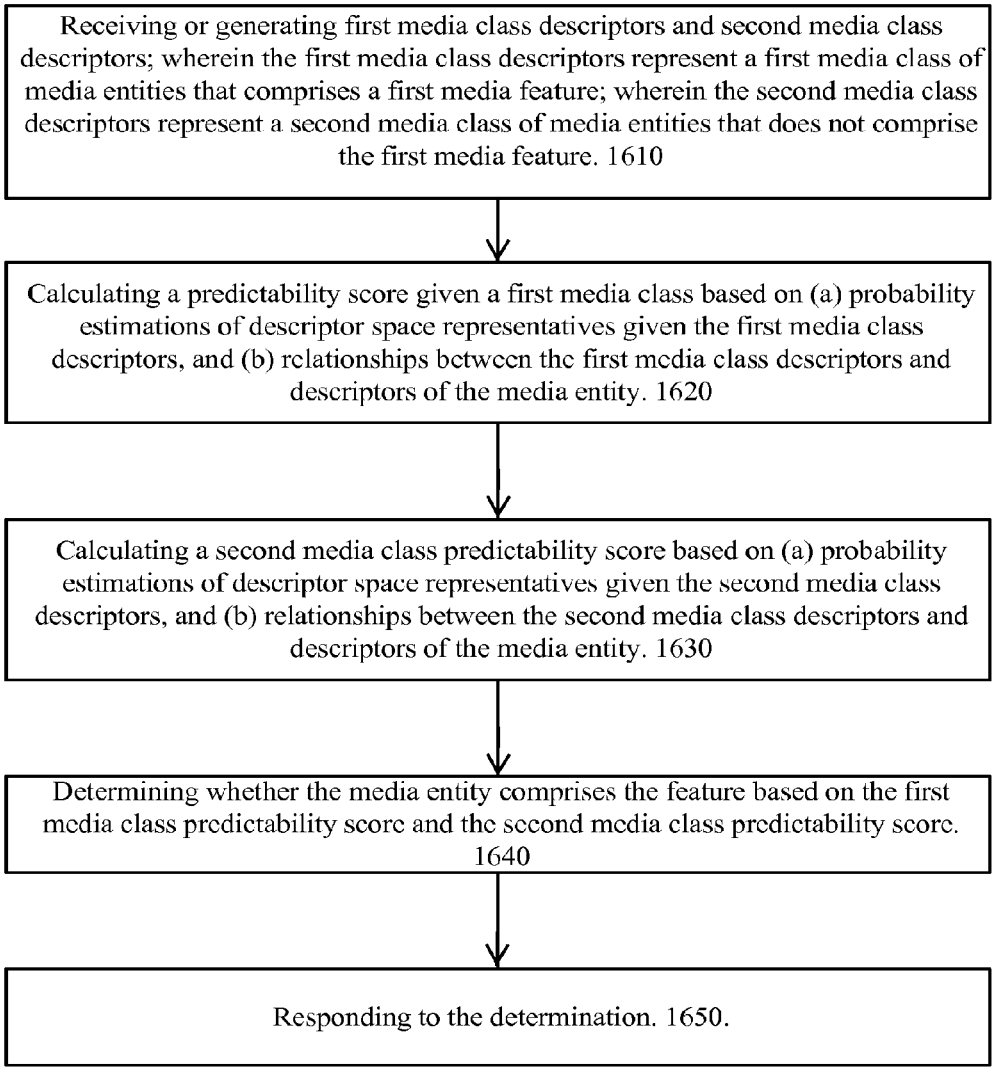

FIG. 16 illustrates method 1600 according to an embodiment of the invention. Method 1600 is for searching for a feature in a media entity.

Method 1600 starts by stage 1610 of receiving or generating first media class descriptors and second media class descriptors; wherein the first media class descriptors represent a first media class of media entities that comprises a first media feature; wherein the second media class descriptors represent a second media class of media entities that does not comprise the first media feature.

Stage 1610 is followed by stage 1620 of calculating a predictability score given a first media class based on (a) probability estimations of descriptor space representatives given the first media class descriptors, and (b) relationships between the first media class descriptors and descriptors of the media entity.

Stage 1620 is followed by stage 1630 of calculating a second media class predictability score based on (a) probability estimations of descriptor space representatives given the second media class descriptors, and (b) relationships between the second media class descriptors and descriptors of the media entity.

Stage 1630 is followed by stage 1640 of determining whether the media entity comprises the feature based on the first media class predictability score and the second media class predictability score.

Stage 1640 can be followed by stage 1650 of responding to the determination. For example, stage 1650 may include detecting media entities of interest in response to a detection of the feature.

Stage 1600 can be repeated in order to detect a feature in multiple media entities by repeating, for each media entity stages 1610-1650.

The feature can be a face but this is not necessarily so.

Figure 17:
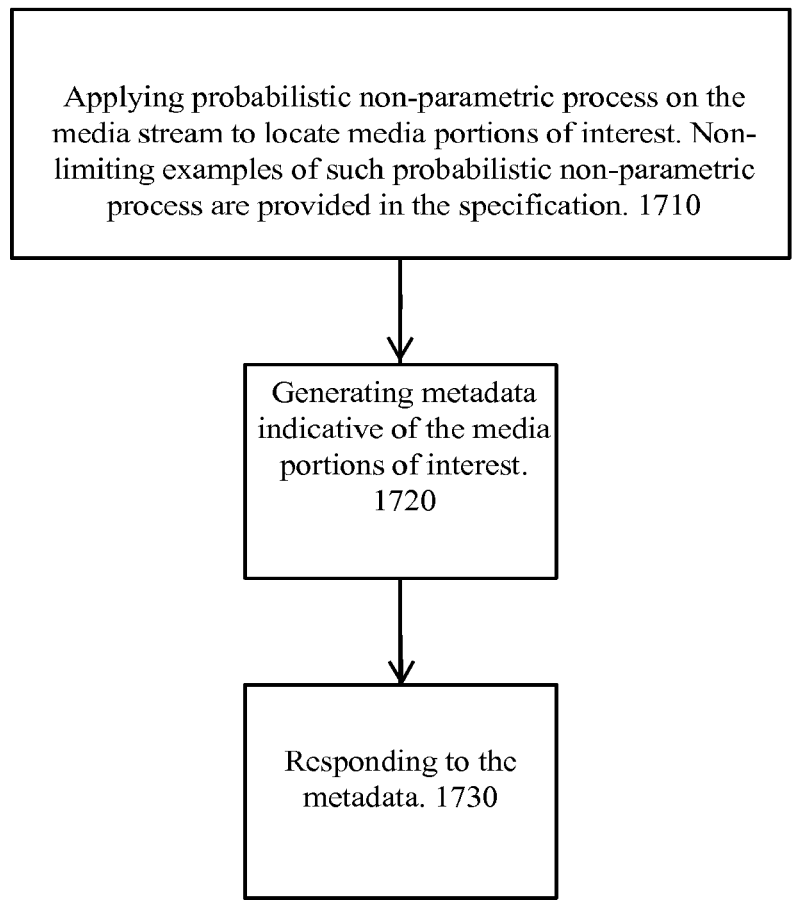

FIG. 17 illustrates method 1700 according to an embodiment of the invention. Method 1700 is for processing media streams.

Method 1700 starts by stage 1710 of applying probabilistic non-parametric process on the media stream to locate media portions of interest. Non-limiting examples of such probabilistic non-parametric process are provided in the specification.

A non-parametric probability estimation is an estimation that does not rely on data relating to predefined (or known in advance) probability distribution, but derive probability estimations directly from the (sample) data.

Stage 1710 may include detecting media portions of interest in response to at least one additional parameter out of: (a) a detection of a change of focal length of a camera that acquires the media; (b) a detection of a motion of the camera; (c) a detection of a face; (d) a detection of predefined sounds; (e) a detection of laughter; (f) a detection of predefined facial expressions; (g) a detection of an excited voice, and (h) detection of predefined behavior Stage 1710 is followed by stage 1720 of generating metadata indicative of the media portions of interest.

Stage 1720 may include adding tags to the media portions of interest.

Stage 1720 is followed by stage 1730 of responding to the metadata.

Stage 1730 may include at least one of the following: (a) generating a representation of the media stream from the media portions of interest; (b) generating a trick play media stream that comprises the media portions of interest; (c) finding media portions of interest that are similar to each other; (d) tagging media portions of interest that are similar to each other; and (e) editing the media stream based on the media portions of interest.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium that stores instructions that cause a computerized system to:
    capture at least one image of a scene using a capturing device of a mobile device;
    automatically analyze the at least one captured image to yield analysis result by a computer processor;
    automatically suggest to a user to capture at least one additional image of said scene, based on the analysis result, and according to predefined criteria;
    capture the at least one additional image of said scene only if instructed by the user within temporal proximity to the automatic suggestion;
    receive from the user preferences related to a specific captured image, selected out of the at least one captured image and the at least one additional captured image; and
    process at least one of the captured images in response to the user preferences.

2. The non-transitory computer readable medium according to claim 1, that stores instructions that cause the computerized system to display the captured image to the user; and to receive from the user the preferences in response to the display of the captured image.

3. The non-transitory computer readable medium according to claim 1, that stores instructions that cause the computerized system to display information about the captured image to the user; and to receive from the user the preferences in response to the display of the information.

4. The non-transitory computer readable medium according to claim 1, that stores instructions that cause the computerized system to receive the preferences during a capturing of the captured image.

5. The non-transitory computer readable medium according to claim 1, that stores instructions that cause the computerized system to process speech of the user that is sensed in proximity to the capturing of the captured image to extract the preferences.

6. The non-transitory computer readable medium according to claim 5, wherein the speech does not include instructions aimed to the mobile device.

7. The non-transitory computer readable medium according to claim 1, that stores instructions that cause the computerized system to process computerized system movements made in proximity to the capturing of the captured image to extract the user preferences.

8. The non-transitory computer readable medium according to claim 1, that stores instructions that cause the computerized system to detect gestures made by the user to extract the user preferences.

9. The non-transitory computer readable medium according to claim 1, that stores instructions that cause the computerized system to suggest capturing at least one additional image of a person if an amount of captured images in which the person appears is below a predetermined threshold.

10. The non-transitory computer readable medium according to claim 1, that stores instructions that cause the computerized system to suggest capturing at least one additional image if an amount of captured images is below a predetermined threshold.

11. The non-transitory computer readable medium according to claim 1, that stores instructions that cause the computerized system to suggest capturing at least one additional image if at least one of the captured images is of a quality that is below a predetermined threshold.

12. The non-transitory computer readable medium according to claim 1, that stores instructions that cause the computerized system to suggest capturing at least one additional image if at least one of the captured images is out of focus.

13. The non-transitory computer readable medium according to claim 1, that stores instructions that cause the computerized system to suggest capturing at least one additional image if at least one of the captured images comprises a partial image of a person and lacks a full image of the person.

14. The non-transitory computer readable medium according to claim 1, that stores instructions that cause the computerized system to suggest capturing at least one additional image to be processed and provide a panoramic view of a scenery, only responsive to automatic detection of a panoramic capturing of the scene by the user.

15. The non-transitory computer readable medium according to claim 14, that stores instructions that cause the computerized system to display instructions about an optimal manner to obtain the panoramic view.

16. The non-transitory computer readable medium according to claim 1, that stores instructions that cause the computerized system to obtain user preferences from the user by allowing the user to mark objects in the captured image.

* * * * *